(12) United States Patent
Cupala et al.

(10) Patent No.: US 11,962,427 B2
(45) Date of Patent: Apr. 16, 2024

(54) AUTO-GENERATED OBJECT FOR IMPROMPTU COLLABORATION

(71) Applicant: Microsoft Technology Licensing, LLC, Redmond, WA (US)

(72) Inventors: Shiraz J. Cupala, Snohomish, WA (US); Eric Hull, Seattle, WA (US); Kevin Daniel Morrison, Arlington, MA (US); Julia Foran, Kirkland, WA (US); James Paul Kardos, Jr., Sammamish, WA (US); Szymon Madejczyk, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/179,186

(22) Filed: Feb. 18, 2021

(65) Prior Publication Data

US 2022/0263675 A1 Aug. 18, 2022

(51) Int. Cl.
*H04L 12/18* (2006.01)
*G06Q 10/10* (2023.01)
*G06Q 10/1093* (2023.01)
*H04L 65/401* (2022.01)

(52) U.S. Cl.
CPC ....... *H04L 12/1818* (2013.01); *G06Q 10/103* (2013.01); *G06Q 10/1095* (2013.01); *H04L 65/4015* (2013.01)

(58) Field of Classification Search
CPC ............. H04L 12/1818; H04L 65/4015; H04L 65/405; H04L 12/1822; G06Q 10/103; G06Q 10/1095; G06Q 10/101
See application file for complete search history.

(56) References Cited

U.S. PATENT DOCUMENTS

| | | |
|---|---|---|
| 6,952,660 B1 | 10/2005 | Matheson |
| 7,386,535 B1 | 6/2008 | Kalucha et al. |
| 8,769,012 B1 | 7/2014 | Shah et al. |
| 9,983,759 B1 | 5/2018 | Dhawan et al. |
| 11,030,585 B2 * | 6/2021 | Nelson ............... G06Q 10/1095 |

(Continued)

OTHER PUBLICATIONS

"International Search Report and Written Opinion Issued in PCT Application No. PCT/US22/013810", dated Mar. 25, 2022, 12 Pages.

(Continued)

*Primary Examiner* — Nam T Tran

(57) ABSTRACT

Traditionally, meetings are widely utilized in business and personal communications, whether in-person and/or virtual. Organizing such meetings typically involves multiple exchanges of content and messages between users before, during, and after the meeting. In some cases, meetings may occur impromptu and may result in inefficient and unproductive collaboration. A collaboration object configured to enable users to dynamically collaborate before, during, and after a meeting is provided. In aspects, the collaboration object links content generated before, during, and after the meeting in a single location and provides functionality for concurrent multi-user interaction and synchronization of the content across applications. The collaboration object may be available from a variety of application platforms, enabling and persisting real-time editing and collaboration before, during and after the meeting.

20 Claims, 37 Drawing Sheets

(56) References Cited

U.S. PATENT DOCUMENTS

| | | | |
|---|---|---|---|
| 11,240,278 | B1 | 2/2022 | Wang et al. |
| 2003/0036941 | A1 | 2/2003 | Leska et al. |
| 2003/0135565 | A1* | 7/2003 | Estrada .................. G06Q 10/10 709/206 |
| 2005/0097440 | A1 | 5/2005 | Lusk et al. |
| 2006/0010197 | A1* | 1/2006 | Ovenden ............. H04L 12/1822 709/204 |
| 2006/0026502 | A1 | 2/2006 | Dutta |
| 2006/0242154 | A1 | 10/2006 | Rawat et al. |
| 2006/0242639 | A1 | 10/2006 | Manion et al. |
| 2009/0083637 | A1* | 3/2009 | Skakkebaek ........... G06Q 10/10 715/751 |
| 2011/0010332 | A1 | 1/2011 | Vasudevan et al. |
| 2011/0045323 | A1* | 2/2011 | Hamilton ............. G06Q 10/103 709/204 |
| 2011/0302506 | A1 | 12/2011 | Noyes et al. |
| 2013/0191896 | A1 | 7/2013 | Adderly et al. |
| 2014/0066044 | A1 | 3/2014 | Ramnani et al. |
| 2014/0082522 | A1* | 3/2014 | Gunderson ........... G06F 3/0481 715/753 |
| 2014/0129639 | A1 | 5/2014 | Burge |
| 2014/0280463 | A1* | 9/2014 | Hunter .................. G06F 40/166 709/203 |
| 2015/0135094 | A1 | 5/2015 | Donneau-golencer et al. |
| 2015/0149929 | A1 | 5/2015 | Shepherd et al. |
| 2015/0156153 | A1 | 6/2015 | Deselaers et al. |
| 2017/0076046 | A1* | 3/2017 | Barnes .................... G06F 40/40 |
| 2017/0163752 | A1 | 6/2017 | Kaledhonkar et al. |
| 2017/0279859 | A1 | 9/2017 | Pogorelik |
| 2017/0364866 | A1 | 12/2017 | Steplyk et al. |
| 2018/0131731 | A1* | 5/2018 | Jones .................. H04L 65/1059 |
| 2018/0203577 | A1* | 7/2018 | Astavans ............... H04N 7/152 |
| 2018/0260790 | A1 | 9/2018 | Connolly et al. |
| 2018/0336520 | A1 | 11/2018 | Davis et al. |
| 2018/0337963 | A1* | 11/2018 | Faulkner ............... H04L 65/403 |
| 2019/0065450 | A1 | 2/2019 | Bhogal et al. |
| 2019/0108492 | A1 | 4/2019 | Nelson et al. |
| 2020/0076634 | A1 | 3/2020 | Akolkar et al. |
| 2021/0241865 | A1* | 8/2021 | Bhattacharya ....... G06Q 10/067 |
| 2022/0261760 | A1 | 8/2022 | Cupala et al. |

OTHER PUBLICATIONS

"International Search Report and Written Opinion Issued in PCT Application No. PCT/US22/013812", dated Mar. 28, 2022, 12 Pages.

"Final Office Action Issued in U.S. Appl. No. 17/179,151", Mailed Date: Apr. 3, 2023, 26 Pages.

"Non Final Office Action Issued in U.S. Appl. No. 17/179,151", Mailed Date: Dec. 22, 2022, 23 Pages.

Bendel, "WatchMyPhone-Providing Developer Support for Shared user Interface Objects in Collaborative Mobile Applications", In Proceedings of the IEEE International Conference on Pervasive Computing and Communications Workshops, Mar. 19, 2012, pp. 166-171.

"International Search Report and Written Opinion Issued in PCT Application No. PCT/US22/013810", Mailed Date: Mar. 25, 2022, 12 Pages.

"International Search Report and Written Opinion Issued in PCT Application No. PCT/US22/013812", Mailed Date: Mar. 29, 2022, 12 Pages.

"Notice of Allowance Issued in U.S. Appl. No. 17/179,151", Mailed Date: Jul. 31, 2023, 16 Pages.

\* cited by examiner

Figure 2A:
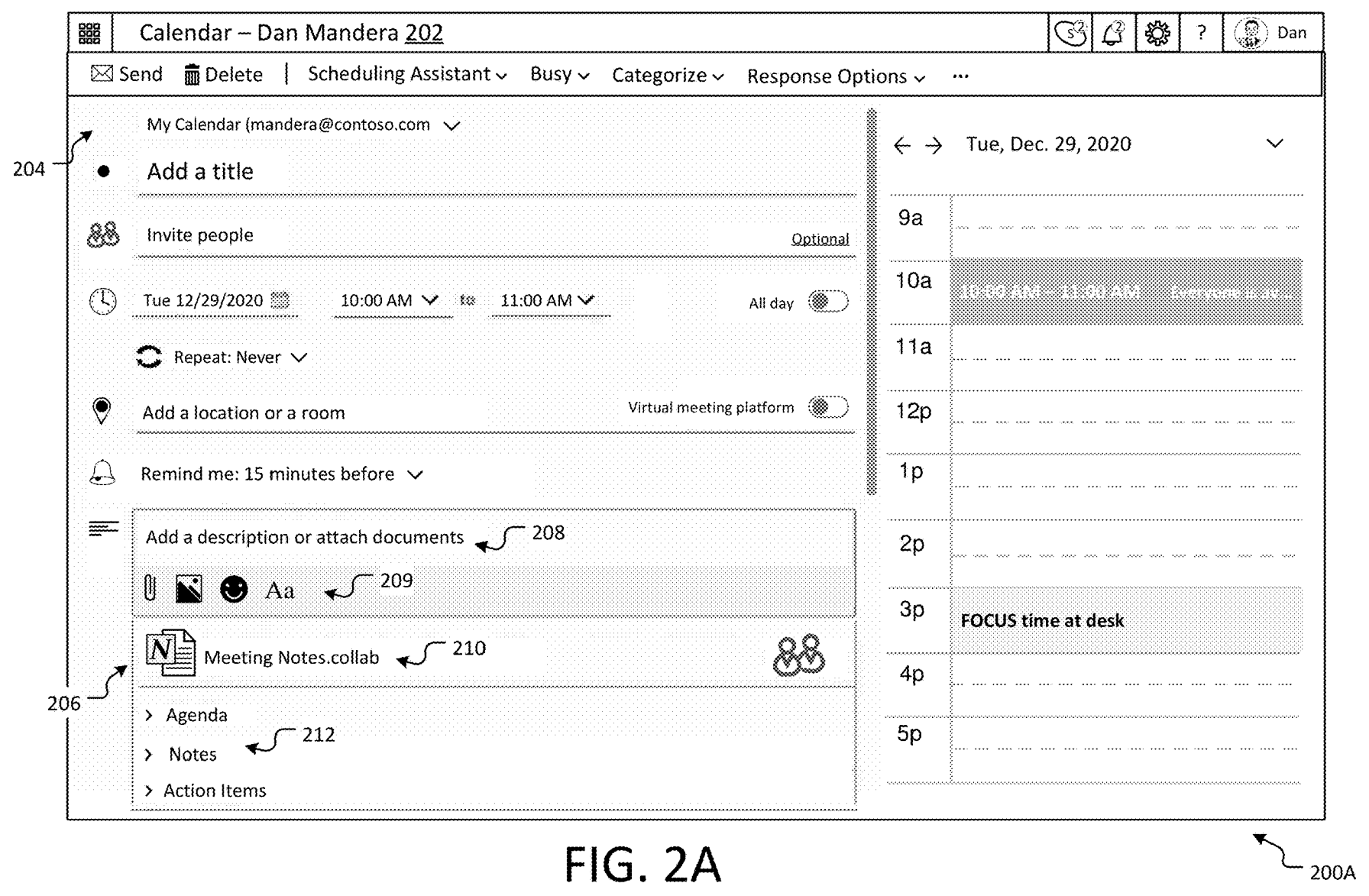

Calendar – Dan Mandera 202

☒ Send  🗑 Delete  |  Scheduling Assistant ⌄  Busy ⌄  Categorize ⌄  Response Options ⌄  ⋯

● Add a title

👥 Invite people  My Calendar (mandera@contoso.com) ⌄

🕐 Tue 12/29/2020 📅  10:00 AM ⌄  to  11:00 AM ⌄  ⬤ All day  Optional

🔄 Repeat: Never ⌄

👁 Add a location or a room  ⬤ Virtual meeting platform

🔔 Remind me: 15 minutes before ⌄

☰ Add a description or attach documents — 208

📎 🖼 😊 Aa — 209

📄 Meeting Notes.collab — 210

> Agenda
> Notes — 212
> Action Items

↑ 206

↑ 204

Tue, Dec. 29, 2020  ← →

9a
10a
11a
12p
1p
2p
3p  FOCUS time at desk
4p
5p

Calendar – Beth Davis 902

Send | Delete | Scheduling Assistant ∨ | Busy ∨ | Categorize ∨ | Response Options ∨

My Calendar (mandera@contoso.com) ∨

Call re: presentation to corporate — 930

1 415 324 8254; 1 415 555 1212 — 916A-B

10/10/2021   10:00 AM ∨  to  11:00 AM ∨ — 932

Remind me: 15 minutes before ∨

Sales Analysis.pptx — 940

Add a description or attach documents — 934

Aa — 936

> Agenda
> Notes — 938
> Action Items

Optional

Oct 10, 2021

9a
10a
11a
12p
1p — FOCUS time at desk
2p
3p
4p
5p

AUTO-GENERATED OBJECT FOR IMPROMPTU COLLABORATION

BACKGROUND

Meetings, whether in-person and/or virtual, are widely utilized in business and personal communications. Organizing such meetings typically involves multiple exchanges of content and messages between users before, during, and after the meeting. In some cases, meetings may occur impromptu or ad hoc, increasing the potential for unproductive or wasted time due to lack of planning and organization. However, even pre-scheduled meetings fall prey to disorganization or miscommunication regarding agenda items, participant roles, time allotments, and the like. For pre-scheduled meetings, for example, an organizer may send a sample agenda, suggested presenters, documents, and the like, via a message (e.g., an email or a chat message) to multiple invitees. The invitees and the meeting organizer may then communicate via a message thread (or threads) in which users may exchange multiple messages regarding suggested agenda or action items, notes or suggestions, new or revised documents, and the like. The meeting organizer and the attendees must then sift through multiple messages to collate information for an organized discussion during the meeting. Not only so, but whether or not a meeting is pre-scheduled, attendees often maintain separate notetaking during the meeting, which may result in disparate impressions and objectives both during and after the meeting. As a result, collaboration between users before, during, and after a meeting is often inefficient and unproductive.

It is with respect to these and other general considerations that embodiments have been described. Also, although relatively specific problems have been discussed, it should be understood that the embodiments should not be limited to solving the specific problems identified in the background.

SUMMARY

In accordance with examples of the present disclosure, a persistent collaboration object may be configured to enable users to dynamically collaborate before, during, and after a meeting. The collaboration object may provide a single location for creating a meeting request and a meeting agenda; attaching meeting documents, links, apps, recordings, whiteboard sessions, transcripts, and the like; collaborating and co-authoring content; providing an entry point for joining the meeting; and the like.

The methods and systems described herein provide for generating a collaboration object to persistently capture content and collaboration related to meetings. Once generated, the collaboration object may comprise a portable interface having functionality for concurrent multi-user interaction with the content. A "meeting" may be pre-scheduled or may occur as a result of impromptu collaboration between users. In a first aspect, a pre-scheduled meeting may be defined by an organizer via a meeting request or invitation. In aspects, the meeting request may automatically be populated with an object template for generating a collaboration object. The object template may be in the form of a structured framework including meeting components for receiving and organizing meeting content, including an agenda component, a note component, and an action item component, for instance. Once the meeting invitation is sent to invitees, the organizer and invitees may collaborate on the collaboration object persistently and in real-time before, during, and after the meeting. For instance, in addition to receiving user input into data fields of the meeting components (e.g., agenda items, notes, action items), any content discussed or shared before, during, or after the meeting may automatically be associated with the collaboration object. Such content may include, for example, presentations, word processing documents, spreadsheets, images, videos, hyperlinks, linked applications, whiteboard sessions, and the like.

In a second aspect, an impromptu collaboration among users may be detected and a collaboration object may automatically be generated. Impromptu collaboration may involve phone calls (e.g., IP-based calls), chat threads, email threads, channel conversations, and the like. For instance, data indicative of a call between users or a series of communications within a channel or chat thread may be detected. In response to detecting the collaboration, a collaboration object may automatically be generated and linked to the collaboration, e.g., within a group channel of a collaborative platform. Similar to the above example, the collaboration object may comprise a structured framework for receiving content input such as agenda items, notes, action items, and the like. Content may also be attached to the collaboration object, such as presentations, documents, spreadsheets, images, videos, and the like. In addition to receiving user input and/or attachment, any content discussed or shared during the collaboration may automatically be associated with the collaboration object, e.g., hyperlinks, whiteboard sessions, mind maps, and the like. In this way, although the meeting was not pre-scheduled, users are able to quickly organize the discussion by inputting agenda items, notes, and action items into the common collaboration object. After the meeting, users are able to continue to add content and collaborate.

In aspects, whether a meeting was pre-scheduled or impromptu, the collaboration object may be made available across multiple applications, including a collaborative meeting platform, a calendar/messaging application, a planner application, a notebook application, and the like. During either pre-scheduled or impromptu meetings, additional applications or application functionality may be made available for collaboration, such as a chat board, recording capability, whiteboard application, graphics, mind maps, etc. After the meeting, an overall summary or digest of meeting content may be compiled and automatically associated with the collaboration object, including recordings, transcripts, one or more whiteboard sessions, an attendance list, and the like. The collaboration object may be persisted such that all of the associated content and collaboration for the meeting is available thereafter from a single location.

In an example, a system comprising at least one processing unit and at least one memory storing computer-executable instructions that, when executed by the at least one processor, cause the at least one processor to perform operations. The operations include collecting data to detect an intention to collaborate. The operations further include automatically generating a prompt for scheduling a collaboration and, in response to a selection, automatically generating a meeting invitation comprising a collaboration object. Additionally, the operations include receiving content to the collaboration object from a first user, where the collaboration object provides functionality for concurrent multi-user interaction with the content, and causing the meeting invitation including the collaboration object to be sent to at least a second user. The operations also include causing the collaboration object to be automatically updated at a first device associated with the first user at substantially the same time as a change to the content is received at a second device associated with the second user.

In another example, a method for generating a collaboration object is provided. The method includes detecting an impromptu collaboration between at least two users and automatically launching a collaborative interface including a collaboration object, where the collaboration object provides functionality for concurrent multi-user interaction. The method further includes receiving user input to the collaboration object by a first participant at a first user device and automatically causing the user input to the collaboration object to be reflected in near real-time at a second user device associated with a second participant. Additionally, the method includes detecting content shared by the second participant during the collaboration and automatically causing the shared content to be reflected in near real-time in the collaboration object across at least the collaborative interface and a second application. The method also includes persisting the collaboration object to enable concurrent multi-user interaction with the collaboration object after the collaboration.

In yet another example, a computer storage medium is provided. The computer storage medium stores computer-executable instructions that when executed cause at least one processor to perform operations. The operations include detecting an impromptu collaboration between at least two users and automatically launching a first application including a collaboration object, where the collaboration object comprises functionality for concurrent multi-user interaction. The operations further include detecting content shared by a participant via a second application during the collaboration and automatically causing the shared content to be reflected in near real-time in the collaboration object across at least the first application and the second application. Additionally, the operations include persisting the collaboration object to enable concurrent multi-user interaction with the collaboration object via at least the first application and the second application after the collaboration.

Any of the one or more above aspects in combination with any other of the one or more aspects. Any of the one or more aspects as described herein.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIGS. 2A-D depict a user interface of a calendar/messaging application for generating a collaboration object, in accordance with examples of the present disclosure.

FIGS. 9A-E depict different user interfaces of different applications for identifying and implementing a user objective to schedule a call, in accordance with examples of the present disclosure.

DETAILED DESCRIPTION

Figure 1:
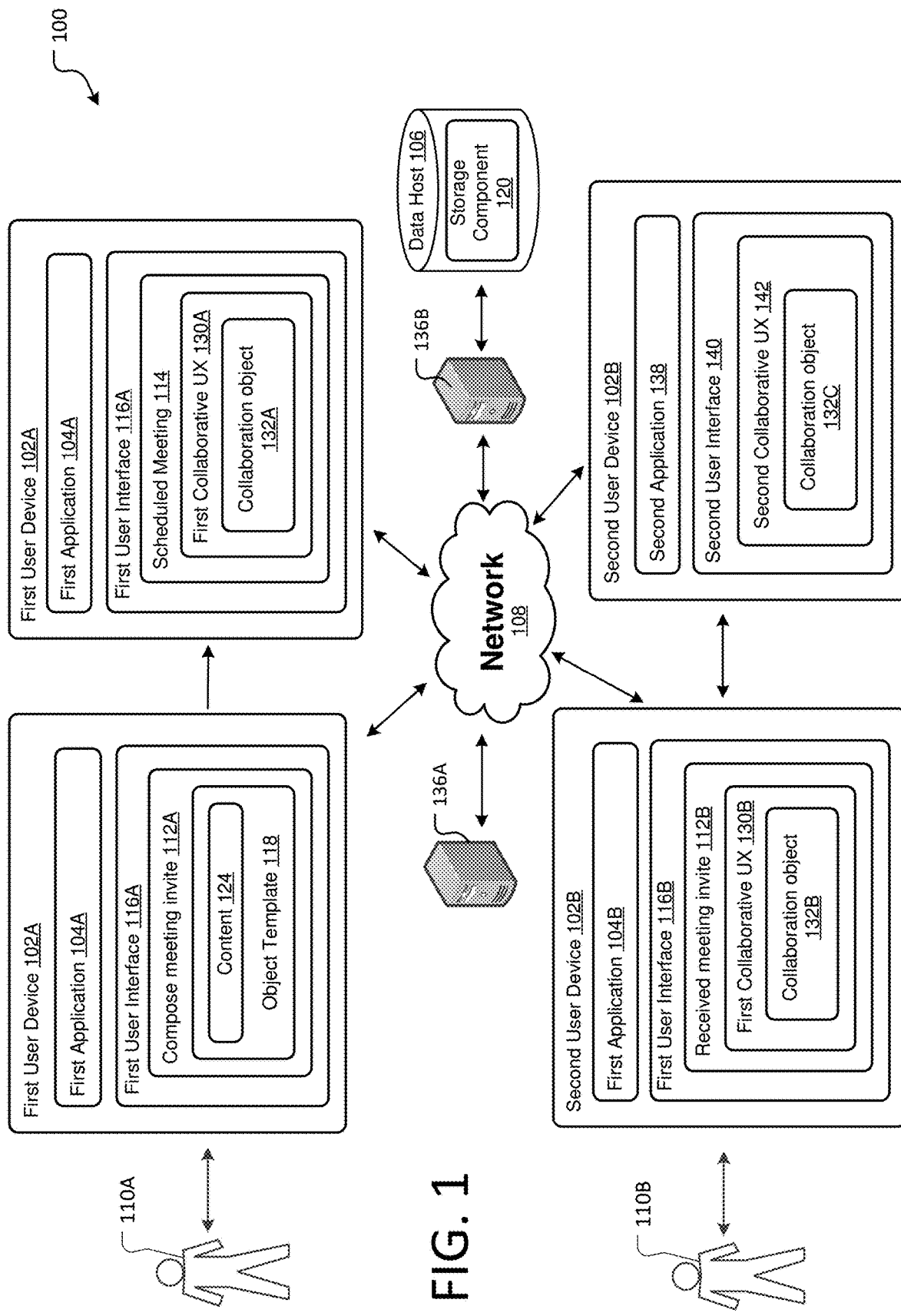
FIG. 1 is a block diagram of a system for implementing a collaboration object associated with one or more collaborative user experiences (UXs), in accordance with an embodiment of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Traditionally, meetings are widely utilized in business and personal communications, whether in-person and/or virtual. Organizing such meetings typically involves multiple exchanges of content and messages between users before, during, and after the meeting. In some cases, meetings may occur impromptu or ad hoc, increasing the potential for unproductive or wasted time due to lack of planning and organization. However, even pre-scheduled meetings fall prey to disorganization or miscommunication regarding agenda items, participant roles, time allotments, and the like. For pre-scheduled meetings, for example, an organizer may send a sample agenda, suggested presenters, documents, and the like, via a message (e.g., an email or a chat message) to multiple invitees before the meeting. The invitees and the meeting organizer may then communicate via a message thread (or threads) in which users may exchange multiple messages regarding suggested agenda or action items, notes or suggestions, new or revised documents, and the like. The meeting organizer and the attendees must then sift through multiple messages to collate information for an organized discussion during the meeting. Not only so, but whether or not a meeting is pre-scheduled, attendees often maintain separate notetaking during the meeting, which may result in disparate impressions and objectives both during and after the meeting. As a result, collaboration between users before, during, and after a meeting is often inefficient and unproductive.

A collaboration object configured to enable users to dynamically collaborate before, during, and after a meeting is provided. In aspects, the collaboration object links content generated before, during, and after the meeting in a single location, where content may broadly include linked apps (e.g., third-party apps such as Trello™, Salesforce™, etc.), linked content (e.g., YouTube videos, websites, webpages, shared documents, etc.), static content (e.g., attached documents, presentations, images, videos, etc.), created content (e.g., meeting recordings, whiteboard sessions, etc.), dynamic content (e.g., collaboration-enabled notebook documents, agendas, notes, etc.), text content (e.g., chat threads, call transcripts, etc.), and the like. The collaboration object may be available from a variety of application platforms, enabling and persisting real-time editing and collaboration before, during and after the meeting.

In aspects, dynamic content may refer to content that is collaboration enabled and static content may refer to content that is not collaboration enabled. Edits (e.g., additions, deletions, changes) to collaboration-enabled content may be reflected in near real-time across user systems. For example, while an edit is being made to dynamic content on one user system, the edit may be reflected at substantially (or nearly) the same time on another user system. "Near" real-time (or substantially real-time) may account for a minimal delay associated with transmission and synchronization of changes due to resource availability, processing speeds, network bandwidth, and the like. In contrast, edits to static content are not reflected in near real-time across user systems. This is not to be confused with the nature of the content itself, however. For instance, a video may be referred to herein as "static content" if the video is not collaboration enabled, regardless of whether the video could be referred to as dynamic in other contexts.

It should be appreciated that although, for exemplary purposes, described embodiments generally relate to messaging applications, e.g., such as email applications, chat applications, collaborative platforms, and the like, the present methods and systems are not so limited. For example, interactive components described herein may be used to provide collaborative experiences in applications other than messaging applications, such as word processing applications, spreadsheet applications, notebook applications, presentation applications, instant messaging or chat applications, social networking platforms, and the like.

FIG. 1 is a block diagram of a system for implementing a collaboration object associated with one or more collaborative user experiences (UXs), in accordance with an embodiment of the present disclosure.

In particular, FIG. 1 illustrates an overview of an example system 100 through which an object template 118 may be automatically included in a meeting invite 112 being composed via a first user interface 116A associated with a first application 104A (e.g., a calendar/messaging application). In aspects, a meeting organizer (e.g., user 110A) may add content 124 to the object template 118, where content 124 may include documents, agenda items, action items, notes, or the like. A collaboration object 132 may be generated based on the object template 118 including content 124. Collaboration object 132 may comprise a portable interface having functionality for concurrent multi-user interaction with the content 124. Content 124 associated with collaboration object 132 may be updated by one or more users via the first application 104 or at least a second application 138 in a collaborative environment.

The collaboration object 132 may be associated with metadata for generating one or more collaborative user experiences (UXs), e.g., first collaborative UX 130 and second collaborative UX 142. A collaborative UX may customize the portable interface and functionality of the collaboration object 132 for a particular hosting application, e.g., the first application 104 and/or the second application 138. In aspects, while first collaborative UX 130 and second collaborative UX 142 may exhibit similar functionality for supporting collaborative user interactions, first collaborative UX 130 may be customized so as to exhibit a similar look and/or feel (e.g., theming, color scheme, layout, design elements, etc.) to first user interface 116 associated with first application 104 and second collaborative UX 142 may exhibit a similar look and/or feel to second user interface 140 associated with second application 138. That is, the first collaborative UX 130 may appear to be native to the first application 104 and second collaborative UX 142 may appear to be native to the second application 138. In aspects, the first collaborative UX 130 may be different from the second collaborative UX 142, e.g., based on different functionality, theming, color scheme, layout, design elements, and the like.

In aspects, interactions with other users and/or the collaboration object 132 via the one or more collaborative UXs may occur before, during and/or after a meeting associated with the collaboration object 132. Such interactions may involve concurrent editing of content 124, instant messaging (e.g., chatting) regarding the meeting and/or the content 124, a virtual meeting regarding content 124 (e.g., hosted by a second application), and the like. User interactions with collaboration object 132 may be received and synchronized across the collaborative UX 130 and collaborative UX 142 in near real-time, for example. That is, regardless of the application used to access the collaboration object 132, a current state of content 124 may be provided. As noted above, content 124 may be updated before, during, or after an associated meeting. In aspects, updating content 124 may involve editing, adding, deleting, or otherwise changing the content 124. For example, updating content 124 may include associating (e.g., attaching or linking) additional content with collaboration object 132, e.g., a recording of the virtual meeting, a transcript of the recording, content created during the meeting (e.g., a whiteboard session), a meeting recap, and the like. Updating content 124 may also include concurrent editing of content 124 before, during, or after the meeting, such as by adding to a chat thread, or editing agenda items, notes, action items, and the like. In still further aspects, individual portions of content 124 may be shared and collaborated on. That is, the agenda may be shared in a chat thread and any updates to the agenda items by participants may be reflected not only in the chat thread, but in an agenda section of the collaboration object 132 across collaborative UXs for each hosting application.

The system 100 may include a plurality of user devices 102A-B configured to run or otherwise execute first application 104A-B and/or second application 138. The user devices 102A-B may include, but are not limited to, laptops, tablets, desktop computers, wearable devices, smartphones, and the like. The first application 104A-B and second application 138 ("hosting applications") may include applications having messaging functionality, such as email applications, chat applications, calendaring applications, collaborative platforms (e.g., including virtual meeting functionality), instant messengers, and the like, and/or may include other types of applications, such as notebook applications. Non-limiting examples of first application 104 and/or second application 138 include Microsoft Outlook™, Gmail™, Microsoft Teams™, Google Hangouts™, Facebook Messenger™, Microsoft Office™ suite, Microsoft 365™, Google Drive™, and the like. In some examples, the first application 104A-B and second application 138 may include web applications, such as but not limited to Microsoft Outlook Web Access™ (OWA) or Gmail™ web applications, where such first application 104A-B and second application 138 may run or otherwise execute instructions on servers in the cloud via web browsers. In some examples, the first application 104A-B and second application 138 may additionally or alternatively include native client applications residing on the user devices 102A-B.

The plurality of user devices 102A-B may be communicatively coupled to one or more servers 136A-B and/or a data host 106 associated with one or more storage components 120 via a communication network 108. In aspects servers 136A-B may comprise a single server 136 (e.g., associated with multiple virtual servers) or multiple servers 136, such as a server farm or multiple server farms. The servers 136A-B may perform the same or different processes. For example, one server 136A may evaluate host first application 104A-B and/or second application 138 and another server 136B may interact with data host 106 to manage the one or more data storage components 120. In another example, a single server 136 may perform multiple of the processes above. A storage component 120 may be, for example, a file in a user drive that may be associated with the user 110A (e.g., meeting organizer) on data host 106. Alternatively, a storage component 120 may comprise any suitable data structure or partitioned memory other than a file for storing data associated with generating one or more collaborative UXs (e.g., first collaborative UX 130 and/or second collaborative UX 142).

Communication network 108 may enable communication between the first application 104A-B, servers 136A-B, and data host 106, as well as communication between different ones of the first application 104A-B and second application 138. The communication network 108 may be a wide area network (WAN) such as the Internet, a local area network (LAN), or any other suitable type of communication network. Additionally or alternatively, communication network 108 may operate over distributed systems (e.g., cloud-based computing systems), where application functionality, memory, data storage and retrieval, and various processing functions may be operated remotely from each other over a distributed system, such as the Internet or an intranet. In some embodiments, communication network 108 may be a single communication network or may be made up of multiple different communication networks. Non-limiting examples of data host 106 include Microsoft SharePoint™, Microsoft OneDrive™, Google Drive™, Amazon Web Services™ (AWS), and DropBox.™ In some embodiments, the data host 106 may be shared and accessible by at least first application 104A-B in a suitable manner other than via the communication network 108. In some examples, the data host 106 may be included in or directly coupled to user devices 102A-B, and may be locally accessibly by first application 104A-B and/or second application 138 executing on the user devices 102A-B, or first application 104A-B and/or second application 138 executing on user devices 102A-B may access the data host 106 by way of the communication network 108.

The first application 104A-B and second application 138 may allow users 110A-B associated with user devices 102A-B to communicate via messages (e.g., email messages, text messages, instant messages), virtual meetings involving video and/or audio, or otherwise interact, over the communication network 108. In one embodiment, first application 104A may be configured to receive content 124 to an object template 118 associated with a compose meeting invite 112A (e.g., a meeting invitation prior to sending). As described above, collaboration object 132 may be generated based on the object template 118 including content 124. In aspects, the collaboration object 132 may comprise a portable interface having functionality for concurrent multi-user interaction with the content 124. The collaboration object 132 may also be associated with metadata for generating one or more collaborative user experiences (UXs), e.g., first collaborative UX 130 and second collaborative UX 142. The metadata may include information for retrieving content 124 (e.g., stored within a storage component 120 on data host 106) and for rendering the first collaborative UX 130, such as a code pointer to custom code for generating the first collaborative UX 130 and a load pointer to a code loader for ingesting the metadata and loading the first collaborative UX 130, for example. Similarly, the metadata may include information for rendering the second collaborative UX 142, such as a code pointer to custom code for generating the second collaborative UX 142 and a load pointer to a code loader for ingesting the metadata and loading the second collaborative UX 142. In aspects, the metadata may provide information for customizing the first collaborative UX 130 for the first application 104A-B and customizing the second collaborative UX 142 for the second application 138.

In aspects, based on the metadata, first application 104A associated with first user 110A (meeting organizer) may be configured to automatically convert object template 118 (including content 124) into first collaborative UX 130A (including collaboration object 132A) within the compose meeting invite 112A (e.g., prior to sending). After sending the meeting invite 112A, first collaborative UX 130A may also be reflected within a scheduled meeting 114 on a calendar of first user 110A. Similarly, after sending meeting invite 122A, first application 104B associated with second user 110B (recipient or attendee) may be configured to render a first collaborative UX 130B within received meeting invite 112B, whether or not the second user 110B "accepts" the meeting invite 112B to schedule a meeting on a calendar associated with the second user 110B. In aspects, first collaborative UXs 130A-B may be considered "in-line" within the context of first application 104A-B such that users 110A-B need not navigate away from first application 104A-B to interactive with other users and/or collaboration object 132A-B.

In some aspects, compose meeting invite 112A may be sent in a message (e.g., an email or chat message) from first user 110A (sender, meeting organizer) to second user 110B (recipient, attendee). The first user 110A may interact with the collaboration object 132A via collaborative UX 130A within the meeting invite 112A and/or the scheduled meeting 114. Additionally, first user 110A may interact with collaborative UX 130A within the sent message associated with meeting invite 112A. Similarly, second user 110B may interact with the collaboration object 132B via collaborative UX 130B within the received meeting invite 112B associated with a received message. In aspects, second user 110B is also able to interact with the collaboration object 132B via collaborative UX 130B within a scheduled meeting in a calendar of the second user 110B (not shown). In this example, users 110A-B may collaborate via collaborative UX 130A-B without exchanging further messages and without navigating away from the first application 104A-B (e.g., host application such as a calendar/messaging application).

In other aspects, metadata associated with the collaboration object 132 may also provide information for rendering collaborative UXs in the contexts of applications other than calendar/messaging applications (e.g., second application 138). The second application 138 may comprise, for example, a collaborative platform (e.g., Microsoft Teams™, Zoom™, conferencing platform, WebEx™, conferencing platform, Slack™, Google Hangouts™, etc.), a productivity application (e.g., OneNote™), and the like. In this case, in addition to accessing the collaboration object 132 via collaborative UX 130 customized for first application 104A-B, the first user 110A and/or the second user 110B may access the collaboration object 132 via collaborative UX 142 customized for the second application 138.

In some embodiments, the first collaborative UX 130 and/or collaborative UX 142 may be configured to receive one or more changes to content 124 of the collaboration object 132 from a user (e.g., first user 110A or second user 110B). The received change may then be communicated to server 136B and/or directly to data host 106. The data associated with the collaboration object 132 (e.g., content 124) in storage component 120 (e.g., a file in memory) may be updated in near real-time with the received change. Further, the updated data may be synchronized across the first collaborative UX 130A in scheduled meeting 114 and/or a sent message comprising meeting invite 112A, the first collaborative UX 130B associated with received message invite 112B, and/or the second collaborative UX 142 associated with second application 138. In this way, both the meeting organizer and one or more recipients (e.g., attendees) are able to collaborate in near real-time before the meeting. Additionally or alternatively, first user 110A and second user 110B are able to collaborate regarding collaboration object 132 during the meeting (e.g., via a collaborative platform) or after the meeting (e.g., via a notebook application). In aspects, while first application 104 may be a calendar/messaging application, second application 138 may be a collaborative platform, a planner application and/or a productivity application (such as a notebook application). In aspects, users 110A-B may collaborate in near real-time before, during, and/or after the meeting via either first collaborative UX 130 associated with the first application 104 and/or the second collaborative UX 142 associated with the second application 138. In an example, "near" real-time may account for any minimal time associated with receiving a change, transmitting the change to data host 106, updating the data in storage component 120, and synchronizing the updated data on the first collaborative UXs 130A-B and second collaborative UX 142 via the communication network 108, for example.

As should be appreciated, while only a first application 104 and a second application 138 are described, the users 110A-B may collaborate via additional applications provided such applications support a collaborative UX. In aspects, an application configured to support a collaborative UX may be configured to consume the metadata associated with the collaboration object 132 (e.g., associated with a meeting invite) and to render a collaborative UX (either within a calendar/messaging application or another application). Additionally, while only two users are described, any number of users (e.g., at least one meeting organizers and one or more meeting attendees) may collaborate via different collaborative UXs customized for different applications.

As should be appreciated, since updates to content 124 associated with collaboration object 132 are synchronized across first collaborative UXs 130A-B and/or second collaborative UX 142, the meeting organizer and one or more recipients (who may or may not attend the meeting) are able to collaborate in near real-time from within different applications before, during or after the meeting. Accordingly, the most current collaborative data associated with collaboration object 132 may be displayed to each user, which may be accessed via different collaborative UXs associated with different applications. In this way, one user (e.g., recipient) may be accessing the collaboration object 132B via a first application 104B (e.g., within a received message invite 112B) while another user (e.g., meeting organizer or another recipient) may be accessing the collaboration object 132C via a second application 138 (e.g., notebook application or collaborative platform). Any changes made by either the recipient via collaborative UX 130B or the sender/other recipient via collaborative UX 142 may be visible, in near real-time, to the other user(s).

It should be appreciated that although first application 104A is generally described herein as being used by a meeting organizer to compose and send a meeting invite, and first application 104B is generally described herein as being used by a recipient/attendee to view the received meeting invite, the first application 104A-B can generally be used to compose, send, and receive meeting invitations with collaborative UXs associated with a collaboration object. The first application 104A may generally be the same as or similar to first application 104B (e.g., first application 104A-B may be a calendar/messaging application such as Outlook Web Access (OWA) executing on both first and second user devices 102A-B) and second application 138 may generally be a different application that supports a collaborative UX (e.g., a collaborative platform such as Microsoft Teams™, or a web-based productivity application such as Microsoft OneNote™).

As should be appreciated, the various systems, devices, applications, features, etc., described with respect to FIG. 1 are not intended to limit the system 100 to being performed by the particular applications and features described. Accordingly, additional configurations may be used to practice the methods and systems herein and/or features and applications described may be excluded without departing from the methods and systems disclosed herein.

FIGS. 2A-D depict a user interface of a calendar/messaging application for generating a collaboration object, in accordance with examples of the present disclosure. In aspects, the calendar/messaging application depicted in FIGS. 2A-D may be the same as or similar to the first application 104A-B depicted in FIG. 1.

FIG. 2A depicts a user interface 200A of a calendar/messaging application for receiving an indication to compose a meeting invitation. The user interface 200A of the calendar/messaging application depicts a calendar interface associated with a first user 202 (e.g., Dan Mandera). As illustrated, first user 202 is composing a meeting invitation based on meeting invitation template 204. The meeting invitation template 204 comprises one or more input fields and/or selections for receiving parameters associated with a proposed meeting. For instance, the meeting invitation template 204 may comprise a title field, an attendee field, a time/date field, a location field, a reminder selection, a collaborative platform selection, and a meeting repeat selection, and the like.

The meeting invitation template 204 may further comprise an object template 206. Object template 206 may include a description field 208 for inputting a meeting description and tool bar 209 having controls for attaching documents and/or images, adjusting text formatting, and the like. Additionally, a notebook document 210 may automatically be generated and associated with the object template 206. In aspects, at least portions of notebook document 210 may be enabled for collaboration (e.g., dynamic content). That is, notebook document 210 may be configured to enable multiple users to concurrently edit or collaborate on notebook document 210. Notebook document 210 is associated with a pseudo file extension, "collab," to identify it as a collaborative document. In this case, since a meeting title has not yet been entered by first user 202, notebook document 210 displays a generic file title, "Meeting Notes." As illustrated, the object template 206 is further prepopulated with content categories 212 that may be associated with a meeting, such as an agenda, notes, and action items. In aspects, the content categories 212 may be collaboration enabled and configured with fields for receiving content items (e.g., specific agenda items, notes, action items) associated with the proposed meeting.

Figure 2B:
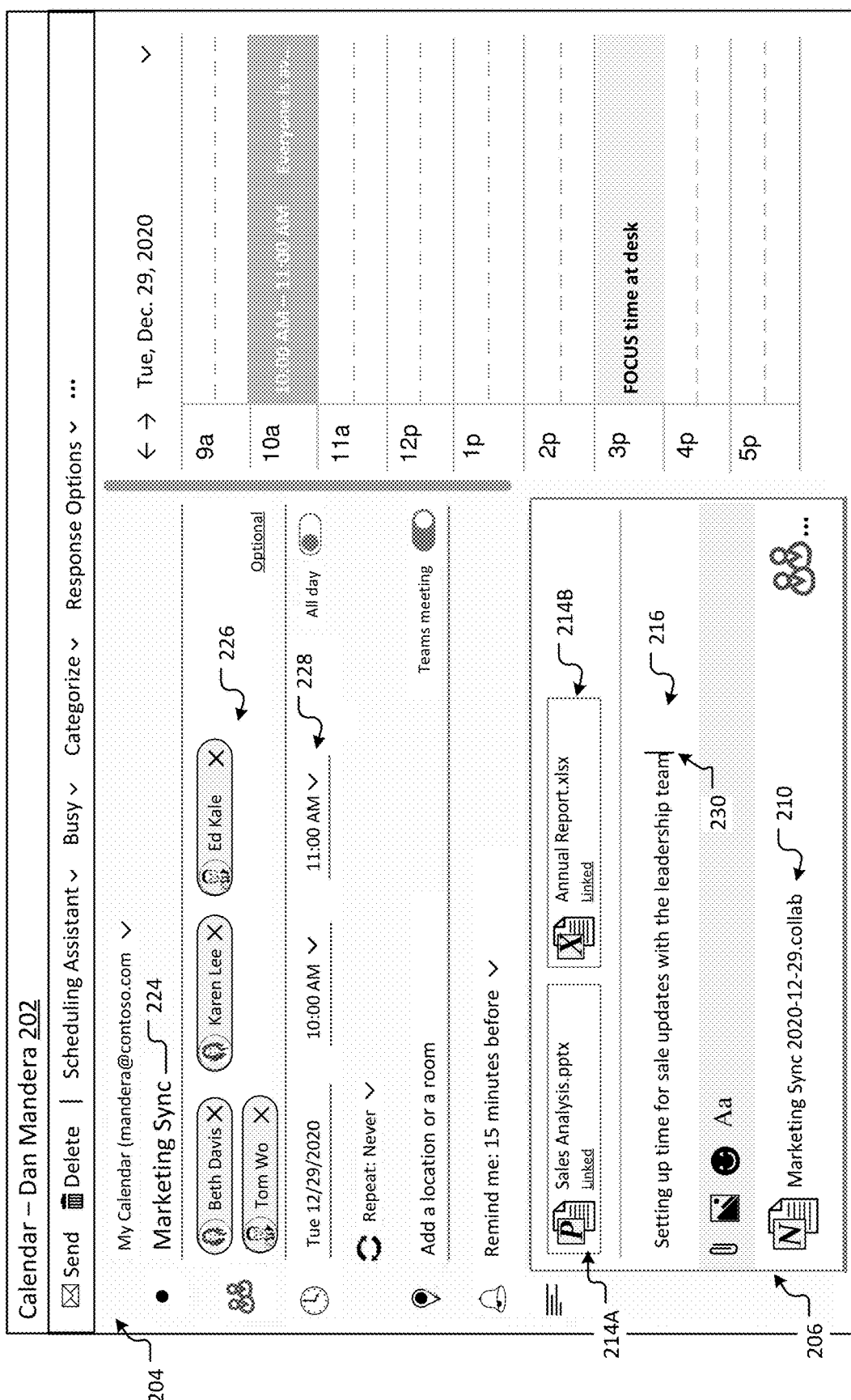

FIG. 2B depicts a user interface 200B of a calendar/messaging application for receiving parameters in a meeting invitation template and content in an object template, in accordance with examples of the present disclosure.

Similar to FIG. 2A, FIG. 2B illustrates user interface 200B of a calendar/messaging application. As illustrated, first user 202 has entered parameters into meeting invitation template 204. For instance, first user 202 has input a meeting title 224 ("Marketing Sync") for the proposed meeting and has input invitees 226, including Beth Davis, Karen Lee, Ed Kale, and Tom Wo. A collaborative platform for a virtual meeting has been selected (e.g., "Teams meeting") and date/time 228 ("Tues 12/29/2020" from "10:00 AM to 11:00") has been entered.

Additionally, first user 202 has added content to the object template 206. For example, documents 214A-B have been attached, including a presentation document 214A and a spreadsheet document 214B. A meeting description 216 is shown as being partially entered, as illustrated by cursor 230 at the end of the input text. Notebook document 210 has also been populated with a file title ("Marketing Sync 2020-12-29") corresponding the meeting title and the date of the proposed meeting. In aspects, notebook document 210 maintains the generic "collab" file extension, indicating that the notebook document 210 is collaboration enabled. That is, the notebook document 210 is configured to support concurrent editing and/or collaboration by a plurality of users. In this example, object template 206 is not fully visible in user interface 200B.

Figure 2C:
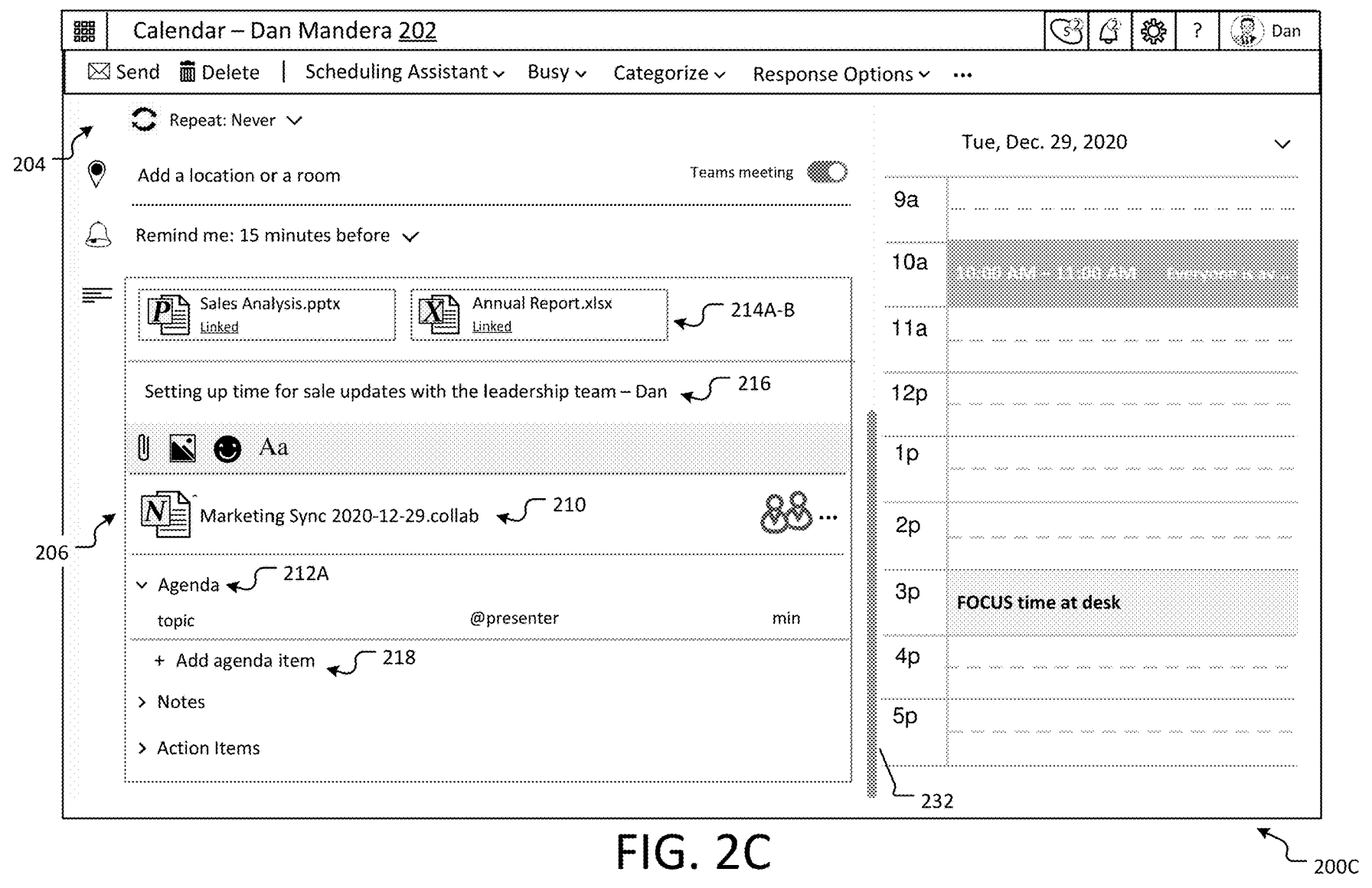

FIG. 2C depicts a user interface 200C of a calendar/messaging application for receiving content in an object template, in accordance with examples of the present disclosure.

In this example, as indicated by navigation bar 232 located toward a lower edge of user interface 200C, object template 206 is more fully displayed. Object template 206 comprises a completed meeting description 216 and agenda category 212A has been expanded to display preformatted entry fields 218 for inputting agenda items. The entry fields 218 may comprise items associated with an agenda, such as a topic, presenter designation, and presentation period. An agenda item may be added by selecting "+Add agenda item" and inputting the topic, presenter, and allotted time, for example.

Figure 2D:
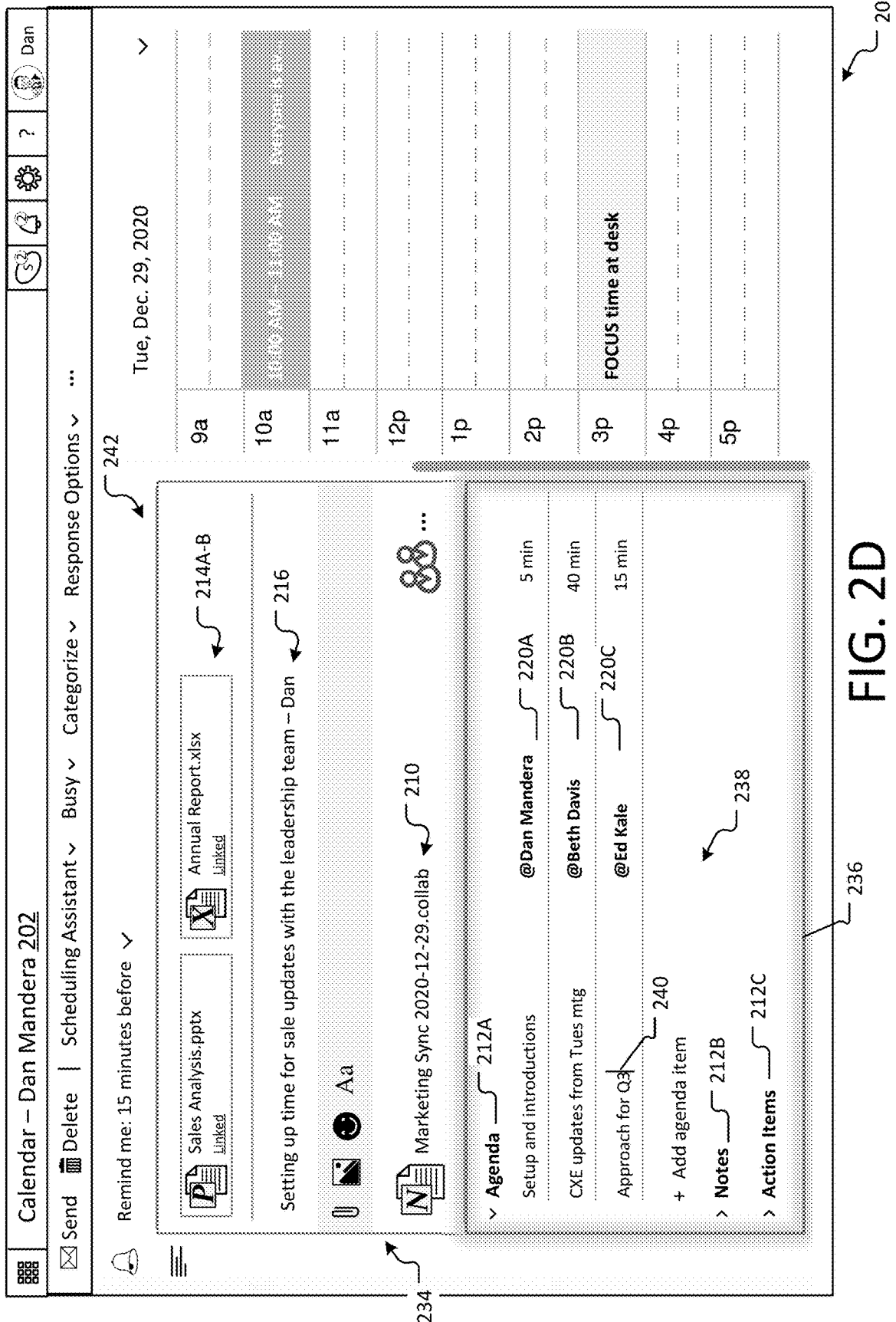

FIG. 2D depicts a user interface 200D of a calendar/messaging application including a meeting invitation with a collaboration object, in accordance with examples of the present disclosure.

As illustrated by FIGS. 2A-D, as first user 202 composes a meeting invitation for a proposed meeting via a calendar/messaging application, a meeting invitation template and an object template are progressively populated with various data. In general, a meeting invitation template is populated with meeting parameters and an object template is populated or associated with various content. As illustrated, content may comprise a meeting description 216, attached documents 214A-B, collaborative notebook document 210, content categories 212A-C, and agenda items 220A-C. When a meeting organizer has finished entering content associated with a particular meeting in an object template, the meeting invitation may be saved or sent to one or more invitees and the object template may be converted to an "collaboration object" (e.g., collaboration object 234) within the meeting invitation. The collaboration object 234 may comprise content and a portable interface (e.g., interface 236) having functionality for concurrent multi-user interaction with the content from different applications and/or user devices.

Once a meeting invitation is saved or sent by a meeting organizer (e.g., first user 202), the meeting organizer may access the collaboration object 234 from a calendar of the meeting organizer (shown), from a sent folder of a messaging application (not shown), and/or from one or more other collaboration-enabled applications (e.g., a planner application, a notebook application, a collaborative platform, etc.) (not shown). Similarly, the collaboration object 234 may be accessed by the one or more invitees from within the received meeting invitation, from a calendar, and/or from other collaboration-enabled applications. In aspects, changes made to a collaboration object by the meeting organizer and/or the one or more invitees may be reflected for each of the other users within each of the various collaboration-enabled applications. If the changes are made by one user while other users are concurrently accessing the collaboration object, the changes may be synchronized across applications and user devices in near real-time such that the other users are able to view the changes as they are being made to the collaboration object.

As illustrated by user interface 200D, first user 202 has saved the meeting invitation to a calendar and the object template has been converted into collaboration object 234. In aspects, collaboration object 234 comprises an interface 236 (highlighted by shading). Content updated within interface 236 may be reflected in near real-time across applications and user devices. For example, first user 202 may open a notebook application, open a notebook document for a meeting entitled "Marketing Sync," and input additional content into the interface of the collaboration object in the notebook document (not shown). As illustrated by FIG. 2D, as first user 202 types a third agenda item 220C in the notebook application (not shown), the third agenda item 220C may be reflected in near real-time (illustrated by cursor 240) in the calendar of first user 202 (shown).

In aspects, collaboration object 234 may be associated with both dynamic content and static content. Dynamic content (e.g., dynamic content 238 within interface 234) may be content that is configured for concurrent editing, access, and/or collaboration by multiple users. Static content may be content that is associated with (or attached to)

collaboration object 234 (e.g., attached documents 214A-B) but that is not collaboration enabled. That is, while attached documents 214A-B may be accessed (e.g., opened) from the collaboration object 234, changes to documents 214A-B made by one user may not be reflected in documents 214A-B accessed by another user, for instance.

In some aspects, collaborative notebook document 210 may not be included with dynamic content 238 within interface 236. That is, while notebook document 210 may be collaboration enabled, the collaborative content of notebook document 210 may be accessed via a user interface associated with a notebook application (not shown) rather than via interface 236. Even so, collaborative content within notebook document 210 that corresponds to dynamic content 238 may be edited from either the notebook interface or interface 236. In this way, any updates received to corresponding content via the notebook interface (not shown) are reflected in the dynamic content 238. Similarly, if dynamic content 238 is edited within interface 236, updates to the corresponding content are reflected within the notebook document 210.

As described above, metadata may be associated with a collaboration object. The metadata may comprise instructions or pointers for generating one or more collaborative user experiences (UXs) customized for one or more applications. A collaborative UX may customize the portable interface and functionality of the collaboration object for a particular application. As illustrated in FIG. 2D, collaboration object 234 is provided with a collaborative UX 242 customized for a calendar/messaging application. That is, the collaborative UX 242 may be customized so as to exhibit a similar look and/or feel (e.g., theming, color scheme, layout, design elements, etc.) to interface 200D of a calendaring/messaging application.

Upon completing the meeting invitation, first user 202 (e.g., meeting organizer) may send the meeting invitation including the collaboration object 234 and associated metadata to one or more recipients (e.g., invitees, attendees) via the calendar/messaging application (e.g., within an email message).

As should be appreciated, the various user interfaces, methods, devices, applications, features, etc., described with respect to FIGS. 2A-D are not intended to limit the user interface 200 to the particular features described. Accordingly, additional configurations may be used to practice the methods and systems herein and/or features and applications described may be excluded without departing from the methods and systems disclosed herein.

Figure 3A:
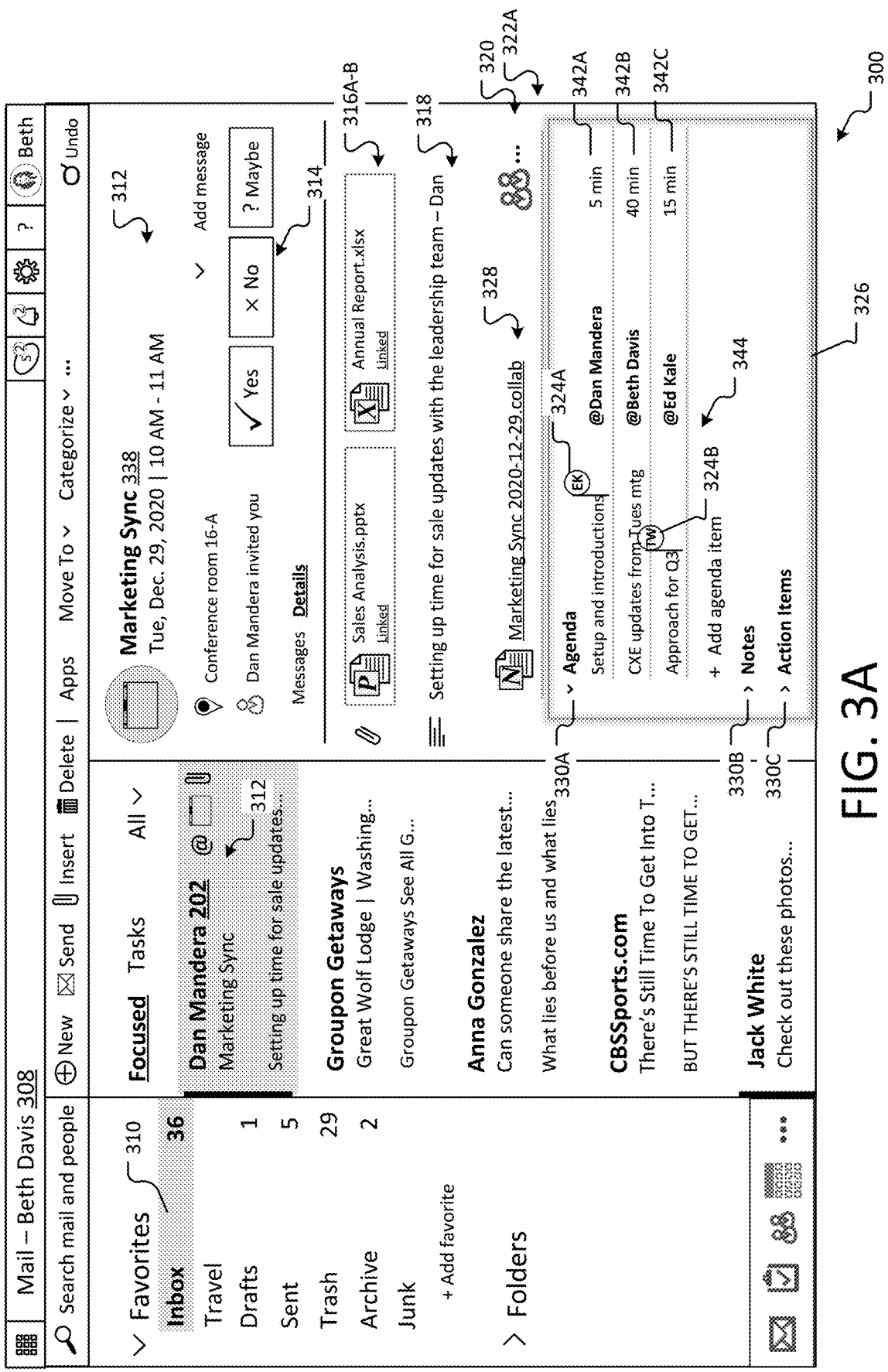
FIGS. 3A-C depict user interfaces of different applications that provide a collaboration object for enabling users to collaborate before a meeting, in accordance with examples of the present disclosure.
Figure 3B:
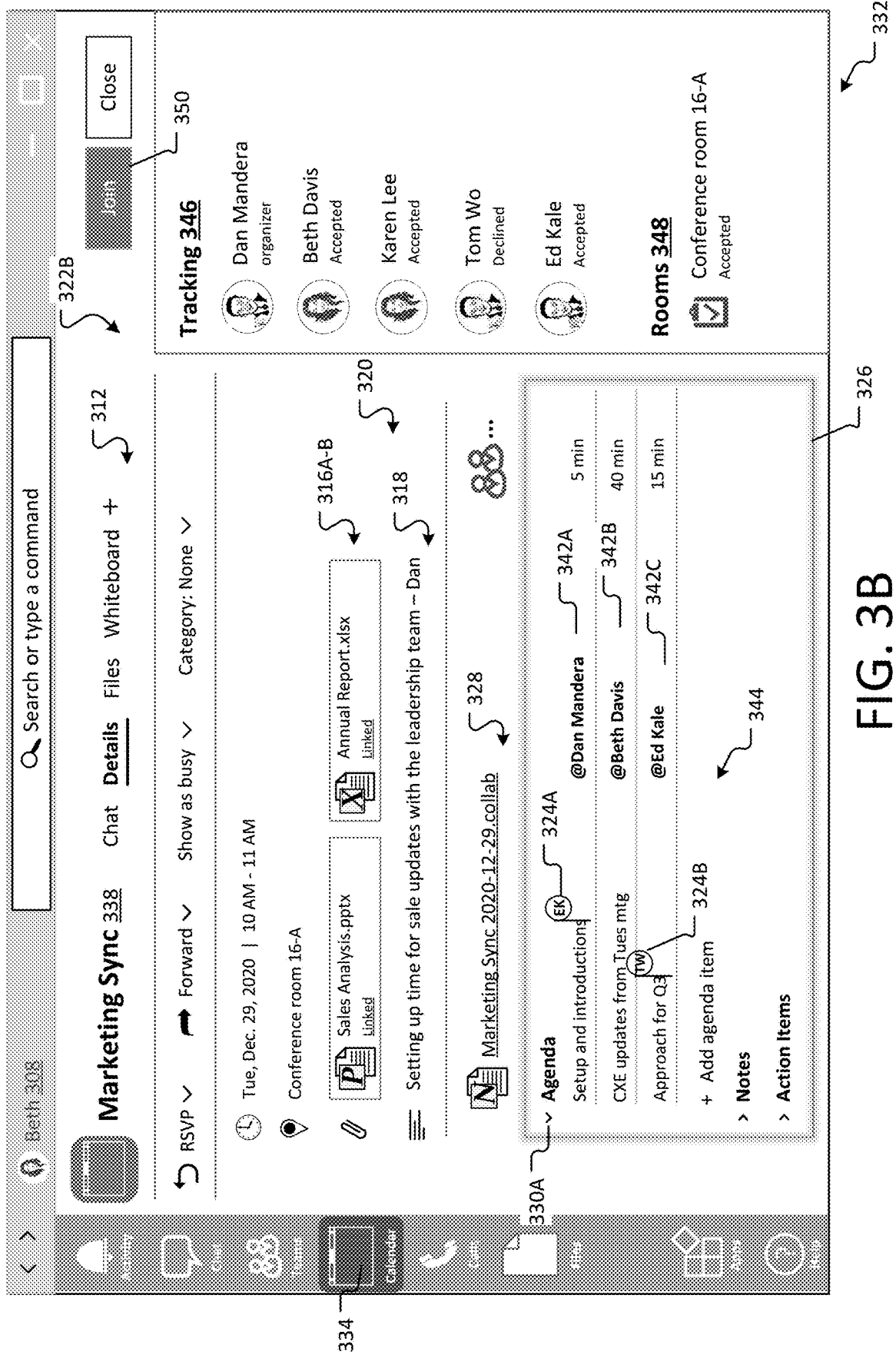
Figure 3C:
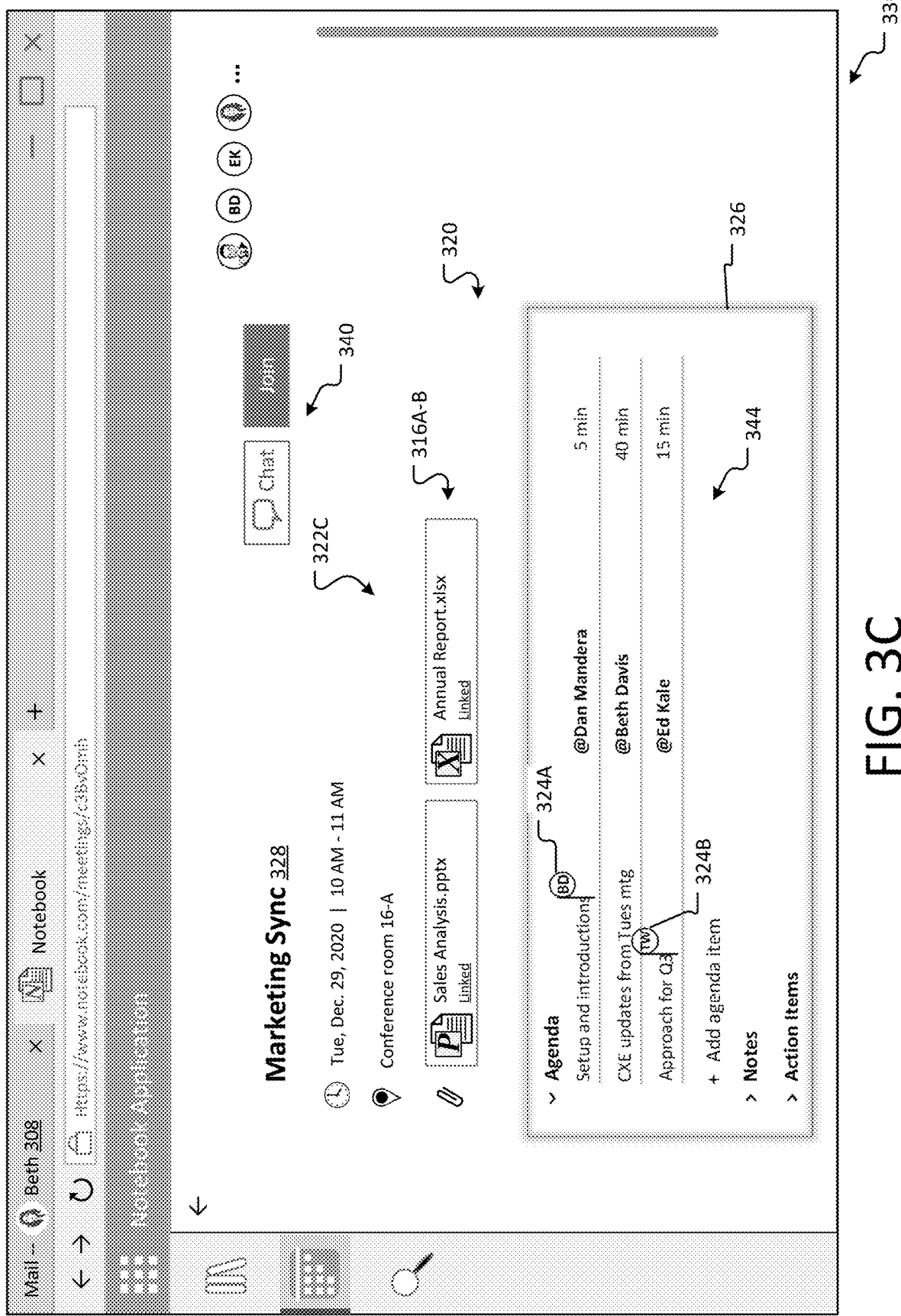

FIGS. 3A-C depict user interfaces of different applications that provide a collaboration object for enabling users to collaborate before a meeting, in accordance with examples of the present disclosure.

FIG. 3A depicts a user interface 300 of a calendar/messaging application associated with a second user 308. In aspects, second user 308 (e.g., "Beth Davis") is a recipient (or invitee) of a meeting invitation 312 from the first user 202.

The user interface 300 of the calendar/messaging application depicts an inbox 310 of second user 308. As illustrated, meeting invitation 312 is received as a message and displays a number of parameters associated with proposed meeting 338 (entitled "Marketing Sync"), including a date/time and a location. From meeting invitation 312, second user 308 may accept, decline, or respond tentative to the proposed meeting 338 using controls 314. Additionally, meeting invitation 312 includes a collaboration object 320 corresponding to collaboration object 234 of FIG. 2D.

Collaboration object 320 comprises attached documents 316A-B, meeting description 318, collaborative notebook document 328, and interface 326 (identified by shaded boundary) including dynamic content 344.

In aspects, when meeting invitation 312 is received, the calendar/messaging application of second user 308 may retrieve metadata associated with collaboration object 320. The metadata may enable the calendar/messaging application to follow pointers to custom code and a code loader for rendering collaborative UX 322A. In aspects, the custom code may specific to a particular interface or application, enabling collaborative UX 322A to be customized for a calendar/messaging application. In further aspects, the metadata may provide a pointer or other reference for retrieving the dynamic content 344 from storage (e.g., associated with a data host). The dynamic content 344, in at least some examples, may be synchronized across different applications and different user devices such that the dynamic content 344 retrieved from storage reflects any updates in near real-time.

As discussed above, a collaborative UX may customize the portable interface and functionality of a collaboration object for concurrent multi-user access, editing, sharing, attaching, and/or collaborating regarding content. Here, while user interface 300 is associated with a calendar/messaging application of second user 308 ("Beth Davis"), interface 236 within meeting invitation 312 illustrates at least two other users accessing the dynamic content 344. For instance, a user 324A ("EK") and a user 324B ("TW") are shown concurrently editing agenda items 342A and 342B, respectively. Similarly, although not shown, second user 308 may also edit dynamic content 344 via interface 236 and such edits would be reflected in collaboration objects associated with at least users 324A-B. As should be appreciated, when a collaboration object 320 is provided within a meeting invitation, the meeting organizer and one or more invitees are able to collaborate before a pre-scheduled meeting regarding associated content (such as attached documents, an agenda, notes, actions items, and the like).

FIG. 3B depicts a user interface 332 of a collaborative platform associated with second user 308. In aspects, user interface 332 displays a calendar tab 334 associated with meeting 338.

As illustrated, user interface 332 displays the meeting invitation 312 received by second user 308. As with FIG. 3A, meeting invitation 312 displays a number of parameters associated with the proposed meeting 338 (entitled "Marketing Sync"), including a date/time and a location. Additionally, meeting invitation 312 includes collaboration object 320 associated with attached documents 316A-B, meeting description 318, collaborative notebook document 328, and interface 326 including dynamic content 344.

Similar to FIG. 3A, the collaborative platform may retrieve metadata associated with collaboration object 320. The metadata may enable the collaborative platform to follow pointers to custom code and a code loader for rendering the collaborative UX 322B. In aspects, custom code may enable collaborative UX 322B to be customized for the collaborative platform. Here, although the meeting invitation 312 is provided in a different interface (e.g., user interface 332) associated with a different application (e.g., collaborative platform), collaborative UX 322B may be similar to collaborative UX 322A, but may include a different layout and/or functionality customized for the collaborative platform. For instance, collaborative UX 322B may include an expanded tracking panel 346 for meeting attendance and/or a "join" control 350 for joining the pre-scheduled meeting from the collaborative platform. Collaborative UX 322B also provides information for meeting room scheduling under rooms header 348. Here again, interface 326 of the collaboration object 320 displayed in interface 332 of the collaborative platform shows users 324A-B accessing the dynamic content 344 at a same or similar time as displayed in interface 300 of the calendar/messaging application illustrated in FIG. 3A.

FIG. 3C depicts a user interface 336 of a notebook application associated with second user 308. In aspects, the notebook document 328 associated with a pre-scheduled meeting is displayed in user interface 336.

In this case, notebook document 328 is entitled, "Marketing Sync," and includes information regarding a pre-scheduled meeting (e.g., meeting 338 of FIG. 3A). However, collaborative UX 322C is different from collaborative UX 322A (customized for a calendar/messaging application) and collaborative UX 322B (customized for a collaborative platform). Here, while notebook document 328 includes a date/time and a location for the meeting, a meeting description (e.g., meeting description 318 of FIG. 3A) is not provided. Additionally, collaborative UX 322C provides controls 340 for joining the meeting or chatting about the meeting. As with collaborative UXs 322A-B, collaborative UX 322C includes collaboration object 320 with attached documents 316A-B, interface 326, and dynamic content 344. Here again, users 324A-B are illustrated accessing the dynamic content 344 at a same or similar time as illustrated by FIGS. 3A-B. Since a corresponding notebook document 328 is open, the notebook document 328 is not shown as attached to the collaboration object 320 (see FIGS. 3A-3B).

As shown by FIGS. 3A-C, invitees are able to collaborate before a proposed meeting based on a collaboration object received via a meeting invitation.

As should be appreciated, the various user interfaces, methods, devices, applications, features, etc., described with respect to FIGS. 3A-C are not intended to limit the user interfaces to the particular features described. Accordingly, additional configurations may be used to practice the methods and systems herein and/or features and applications described may be excluded without departing from the methods and systems disclosed herein.

FIGS. 4A-G depict user interfaces of different applications that provide a collaboration object for enabling users to collaborate during a meeting, in accordance with examples of the present disclosure.

Figure 4A:
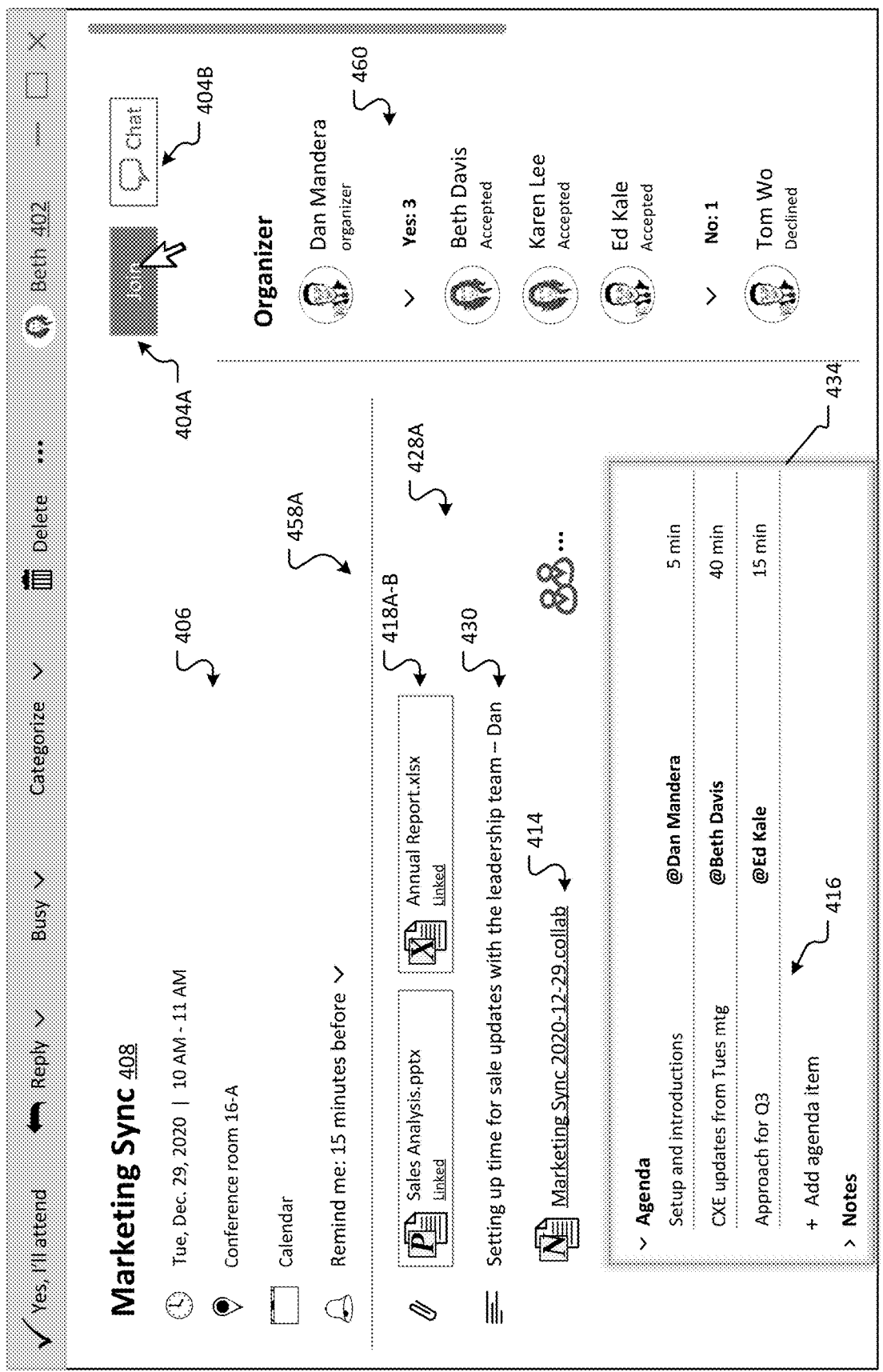
FIGS. 4A-G depict user interfaces of different applications that provide a collaboration object for enabling users to collaborate during a meeting, in accordance with examples of the present disclosure.

FIG. 4A depicts a user interface 400 of a calendar/messaging application associated with a second user 402 (e.g., invitee) displaying a meeting invitation 406. Similar to meeting invitation 312, meeting invitation 406 includes information regarding a meeting 408, such as a date/time and a location. Additionally, meeting invitation 406 includes collaboration object 428A, including attached documents 418A-B, a meeting description 430, a collaborative notebook document 414, and dynamic content 416 associated with an interface 434. Collaboration object 428A is provided in a collaborative UX 458A customized for the calendar/messaging application. Collaborative UX 458A comprises an attendance tracker 460 and a control 404A for joining the meeting 408 and a control 404B for chatting regarding meeting 408. In aspects, in response to selecting join control 404A, a collaborative platform may be launched enabling the second user 402 to virtually join meeting 408.

Figure 4B:
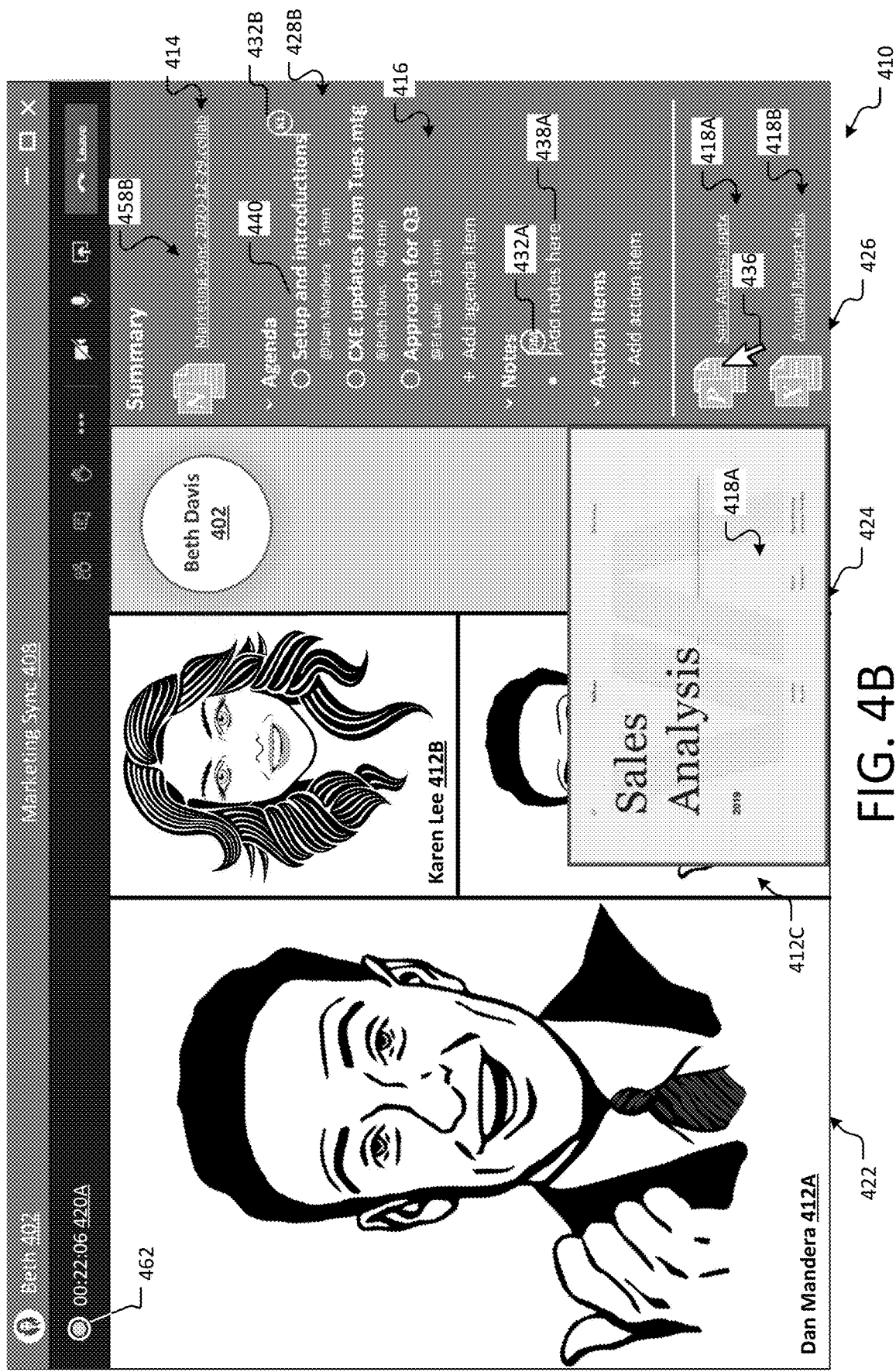

FIG. 4B depicts a user interface 410 of a collaborative platform associated with second user 402 displaying a first time capture 420A (e.g., 00:22:06) during virtual meeting 408.

As shown, attendees 412A-C and icon representing second user 402 are displayed in a main pane 422 and a first page of document 418A is provided in an overlay pane 424 of user interface 410. According to functionality of the collaborative platform, a recording 462 of virtual meeting 408 has been initiated. Here, collaboration object 428B is provided in side pane 426 via collaborative UX 458B, which is customized for the collaborative platform. For instance, the layout and background of collaborative UX 458B are customized according to a theme and/or color scheme of the collaborative platform. In aspects, collaboration object 428B within user interface 410 of the collaborative platform is similar to collaboration object 428A within meeting invitation 406 of the calendar/messaging application of FIG. 4A.

In particular, collaboration object 428B includes attached documents 418A-B, collaborative notebook document 414, and dynamic content 416. However, collaboration object 428B does not include meeting description 430 provided by collaboration object 428A; nor does collaboration object 428B explicitly show an interface (e.g., interface 434) for interacting with dynamic content 416. Even so, dynamic content 416 is enabled for concurrent multi-user interaction during meeting 408. As illustrated by user 432A, who is editing dynamic content 416, collaboration object 428B is collaboration enabled within the side pane 426 of user interface 410. In particular, first user 432A ("DM"), corresponding to attendee 412A ("Dan Mandera"), is in the process of editing dynamic content 416 to add a first note 438A to the note category during meeting 408; and third user 432B ("KT"), corresponding to attendee 412B ("Karen Lee"), is accessing a first agenda item 440 of the agenda category.

As further illustrated by FIG. 4B, when attached document 418A is selected 436, the first page of document 418A is rendered in overlay pane 424. In this way, content associated with a collaboration object within a meeting invitation (e.g., collaboration object 428A) can be available for collaboration and editing before a meeting (as discussed with reference to FIGS. 3A-3C) and can be available during the meeting (such as collaboration object 428B within a different application) to facilitate sharing attached content (e.g., application 418A), taking notes, adding action items, and the like. In this way, everything associated with a particular meeting can be found in one place (e.g., the collaboration object) and can be accessed by the meeting organizer and the invitees before, during, and after the meeting (even in cases in which an invitee is unable to attend the meeting).

Figure 4C:
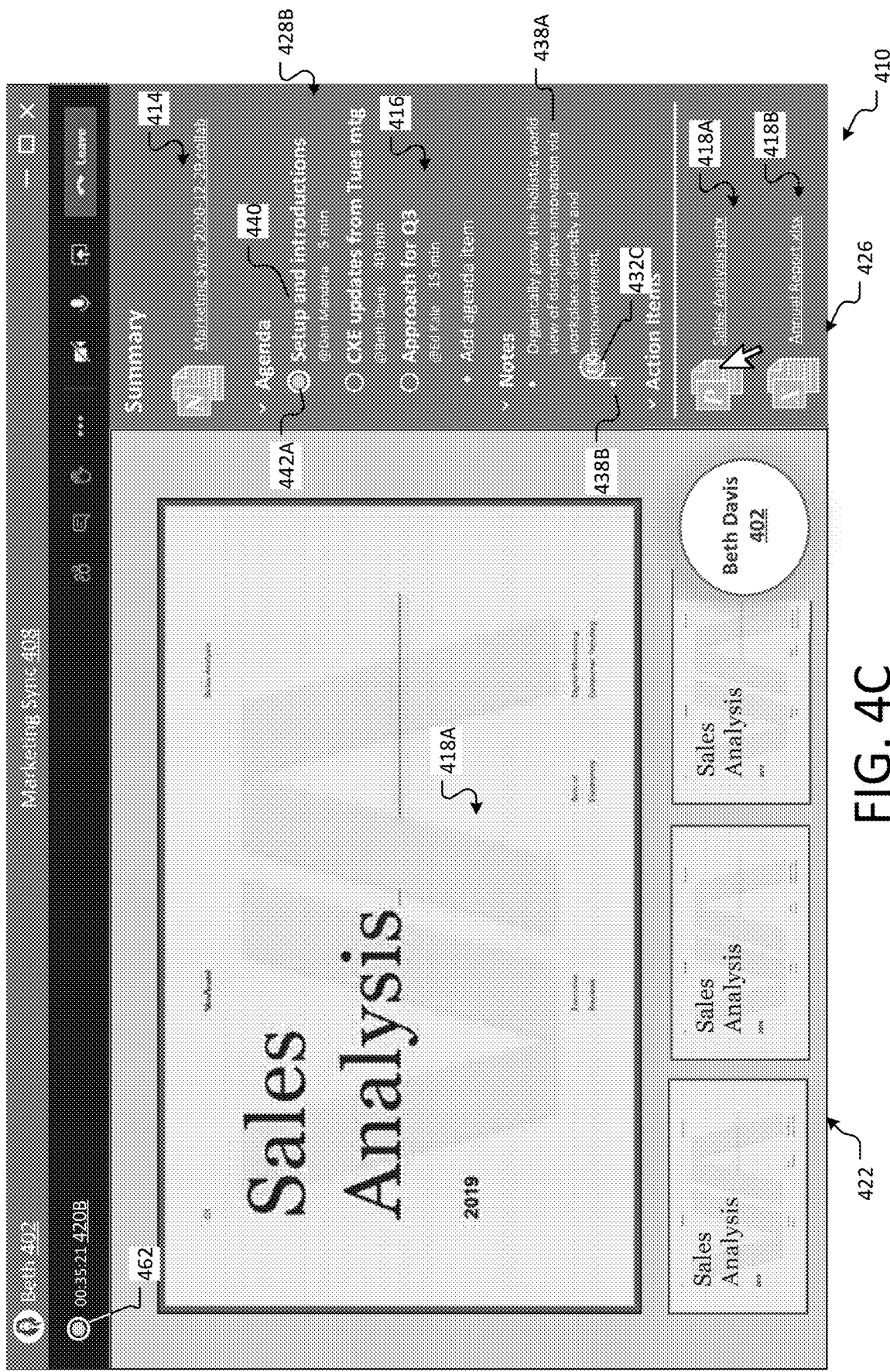

FIG. 4C depicts user interface 410 of the collaborative platform associated with second user 402 displaying a second time capture 420B (e.g., 00:35:21) during virtual meeting 408.

In this case, the first page of document 418A is shared in the main pane 422 of user interface 410 and collaboration object 428B remains in the side pane 426 of user interface 410. According to functionality of the collaborative platform, the recording 462 of virtual meeting 408 continues.

As with FIG. 4B, collaboration object 428B includes attached documents 418A-B, collaborative notebook document 414, and dynamic content 416. However, at the second time capture 420B during meeting 408, first agenda item 440 is identified as completed 442A, first note 438A has been added, and fourth user 432C ("EK") is in the process of adding a second note 438B to the note category. As should be appreciated, making collaboration object 428B available during the meeting 408 (even within a different application) has facilitated sharing attached content (e.g., application 418A), adding notes 438A and 438B, and indicating a progress of meeting 408 with respect to the agenda, for instance.

Figure 4D:
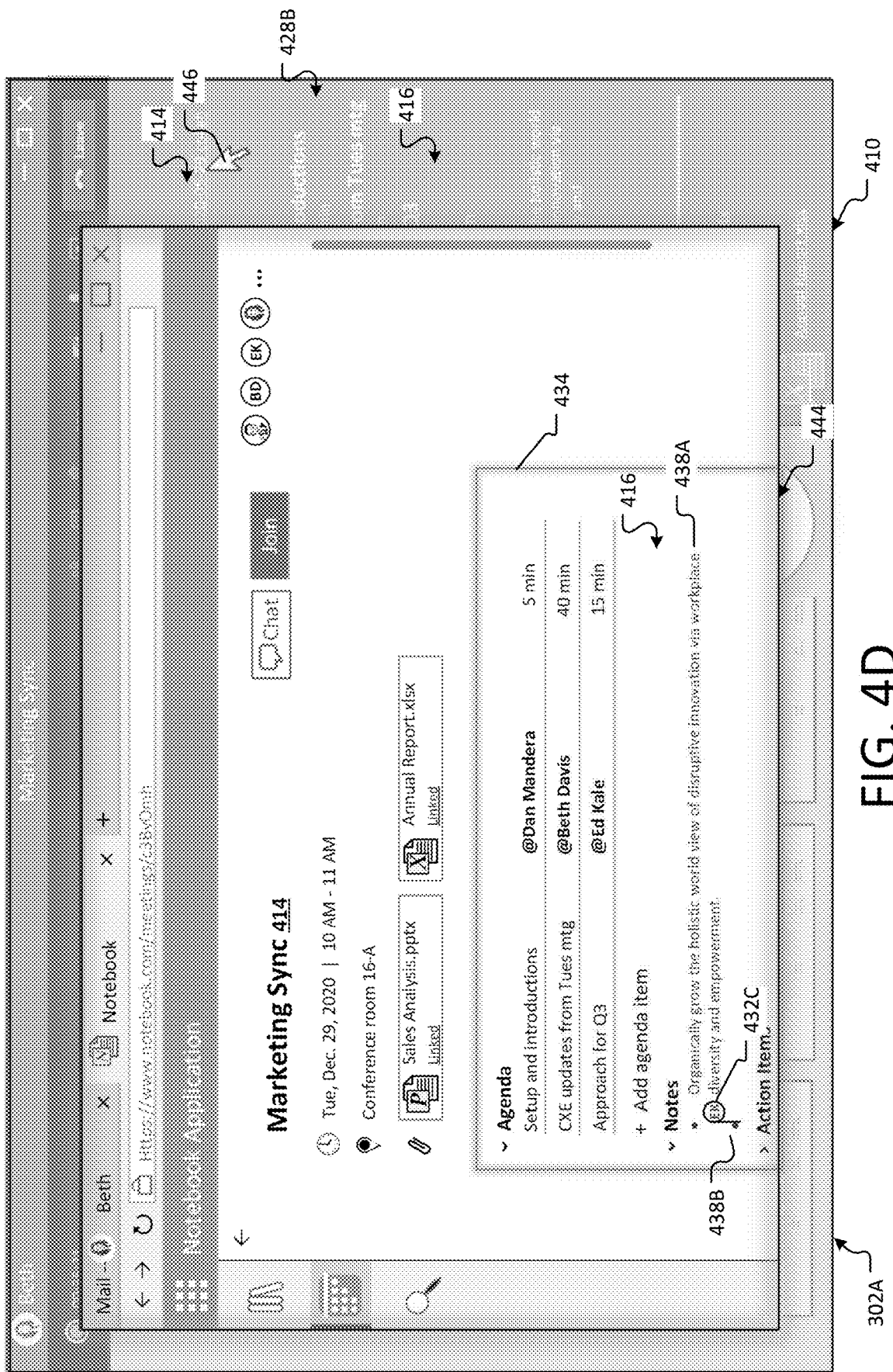

FIG. 4D depicts a user interface 444 of a notebook application displaying collaborative notebook document 414 overlaying user interface 410 of the collaborative platform. In aspects, the user interface 444 may also be associated with the second time capture 420B (e.g., 00:35:21) during virtual meeting 408.

As illustrated, a selection 446 of collaborative notebook document 414 within collaboration object 428B of interface 410 may launch collaborative notebook document 414 within overlay user interface 444. As can be seen, dynamic content 416 associated with collaboration object 428B corresponds to dynamic content 416 within collaborative notebook document 414. Similarly, as can be seen, edits to the dynamic content 416 received to collaboration object 428B within user interface 410 at the second time capture 420B are reflected in collaborative notebook document 414 within user interface 444. That is, first note 438A has been added and fourth user 432C ("EK") is in the process of adding a second note 438B to the note category.

Figure 4E:
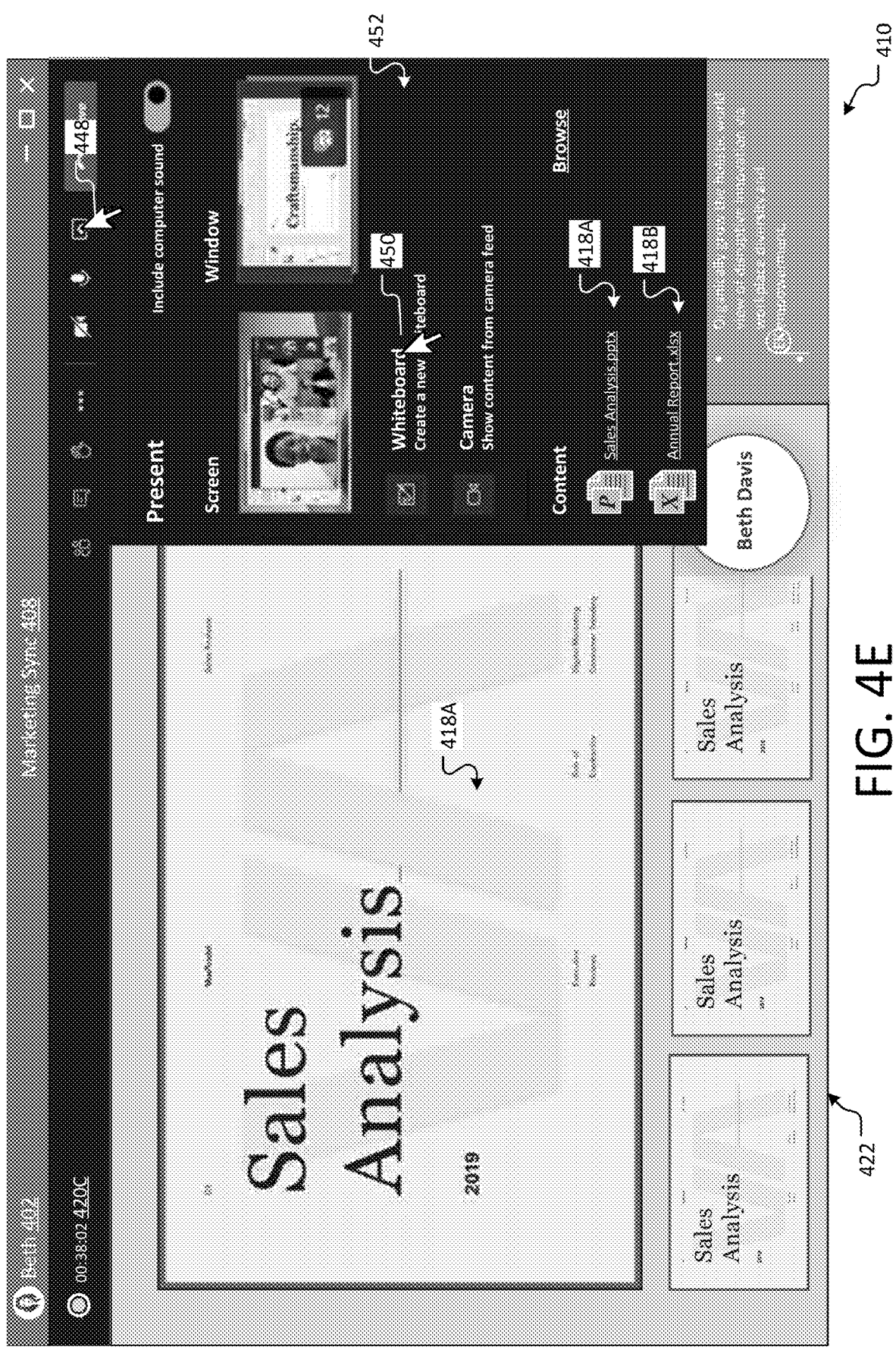

FIG. 4E depicts user interface 410 of the collaborative platform associated with second user 402 displaying a third time capture 420C (e.g., 00:38:02) during virtual meeting 408.

As with FIG. 4C, the first page of document 418A is shared in the main pane 422 of user interface 410. In this case, selection 448 provides a drop-down menu 452 for presenting (e.g., sharing) content in the virtual meeting 408. The drop-down menu 452 displays various options for presenting, as well as additional applications for selection, such as whiteboard application 450. Drop-down menu 452 also provides documents 418A-B for selection and sharing.

Figure 4F:
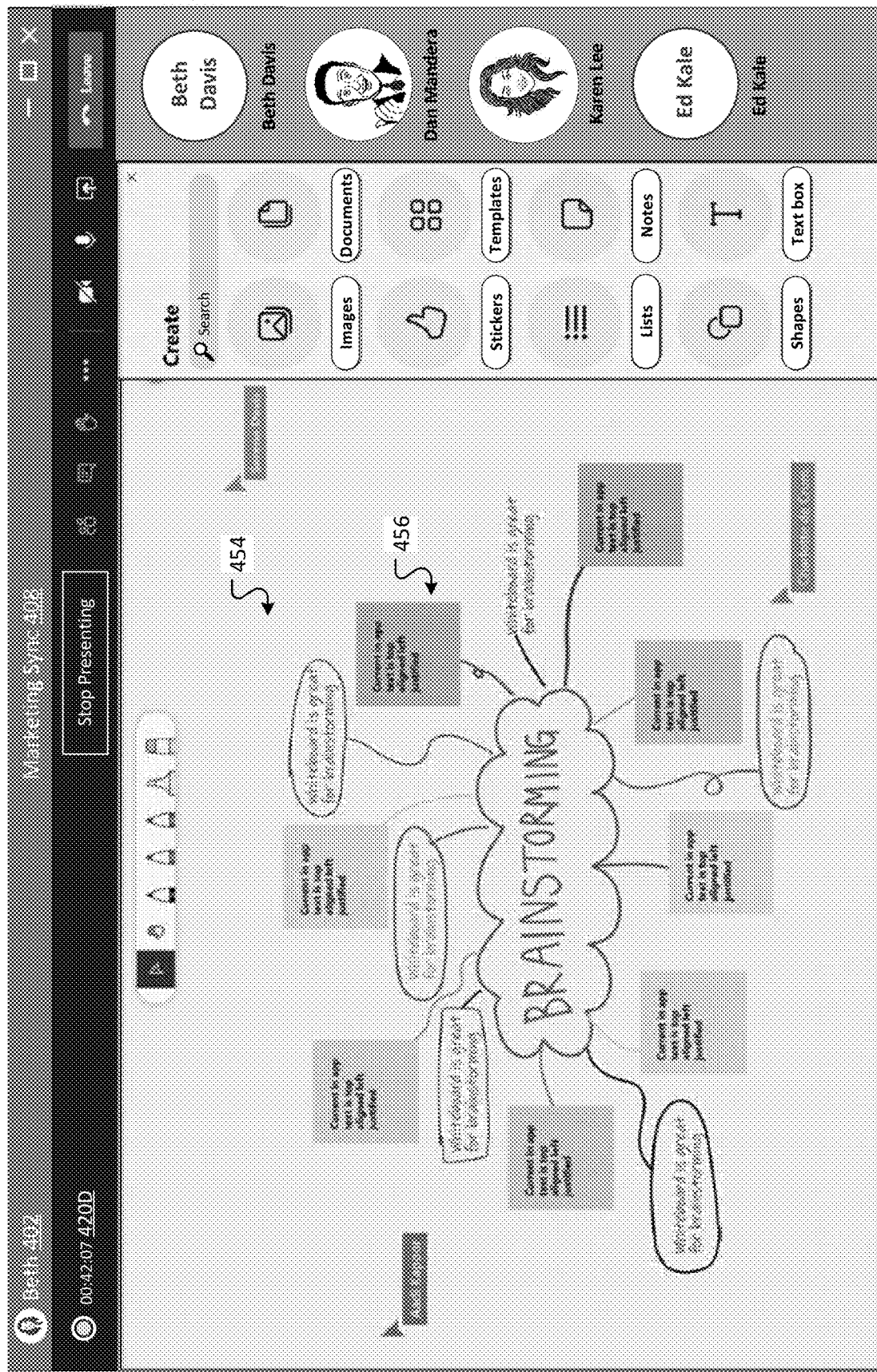

FIG. 4F depicts user interface 410 of the collaborative platform associated with second user 402 displaying a fourth time capture 420D (e.g., 00:42:07) during virtual meeting 408.

As illustrated, whiteboard application 450 has been selected from drop-down menu 452 and a whiteboard session 454 has been launched in main pane 422 of user interface 410. As illustrated, results of brainstorming 456 were captured in the whiteboard session 454 during meeting 408 between second user 402 and attendees 412A-D (see FIG. 4B).

Figure 4G:
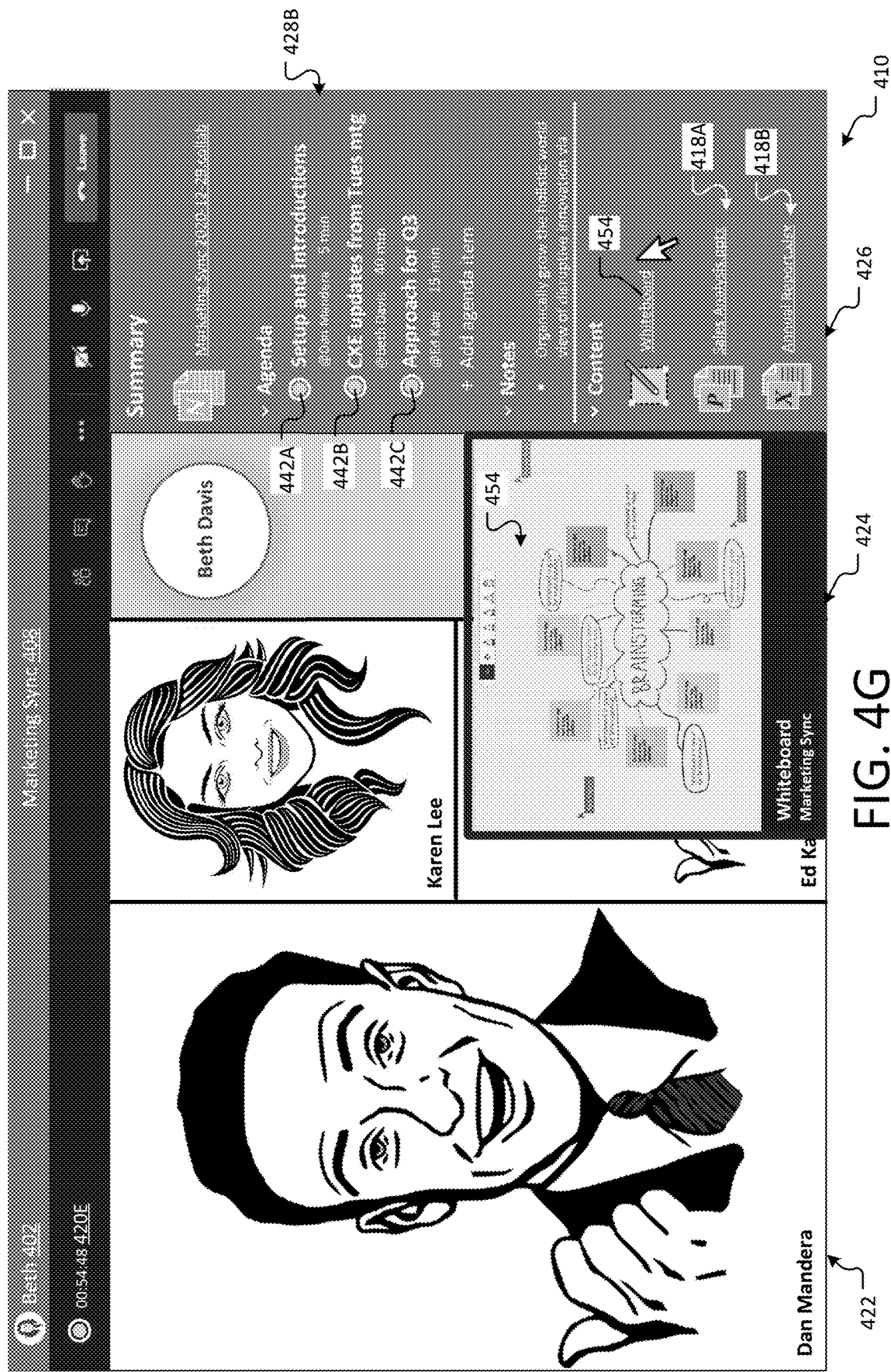

FIG. 4G depicts a user interface 410 of a collaborative platform associated with second user 402 displaying a fifth time capture 420E (e.g., 00:54:48) during virtual meeting 408.

As shown, attendees 412A-C and icon representing second user 402 are displayed in main pane 422 of user interface 410. Further, collaboration object 428B is provided in side pane 426 and whiteboard session 454 is provided in overlay pane 424 of user interface 410. Collaboration object 428B has been updated to show each of the three agenda items as completed 442A-C and whiteboard session 454 has been added to the content attached to collaboration object 428B (e.g., documents 418A-B).

Figure 5A:
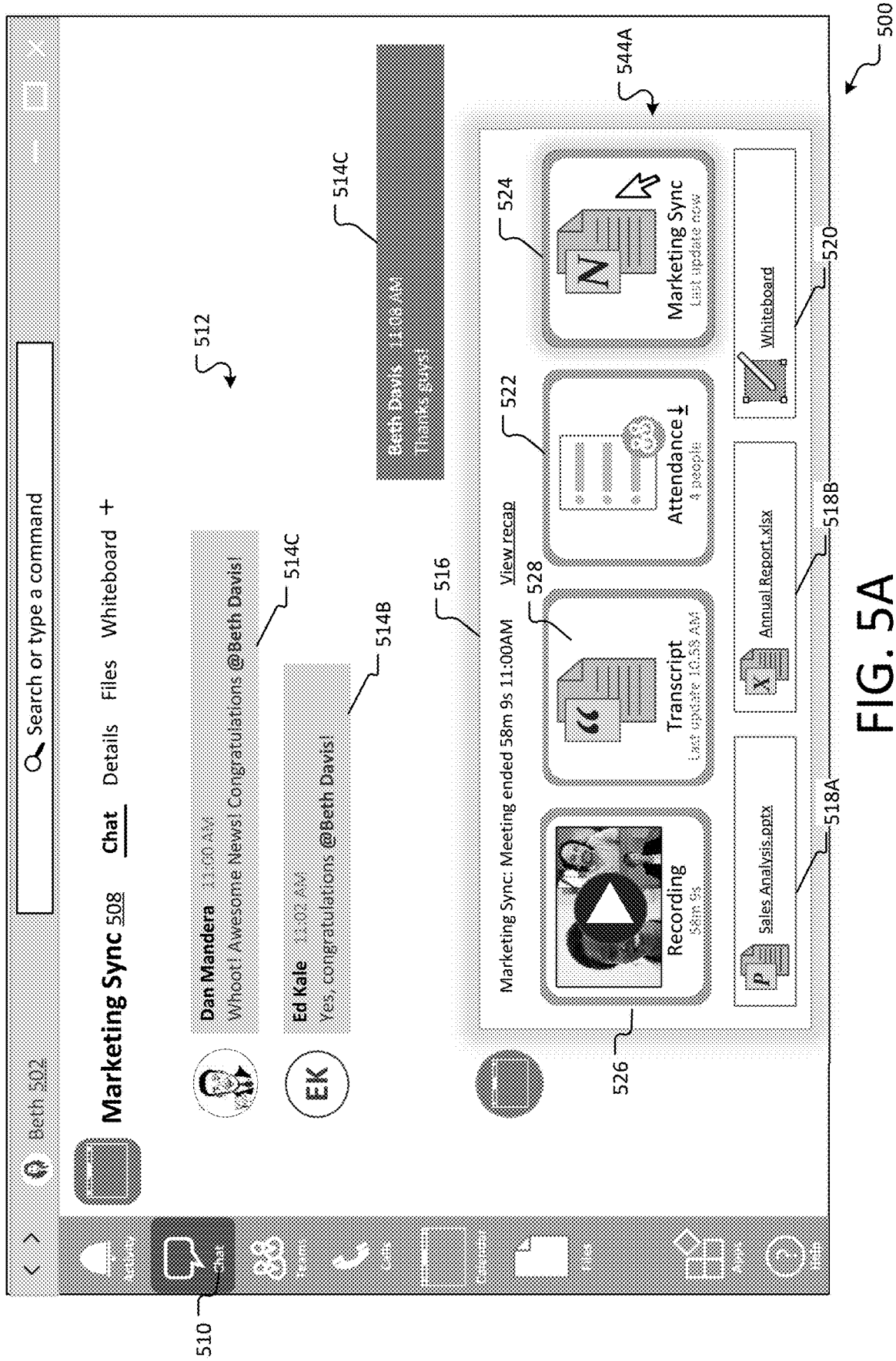
FIGS. 5A-B depict user interfaces of different applications that provide a collaboration object for enabling users to collaborate after a meeting, in accordance with examples of the present disclosure.
Figure 5B:
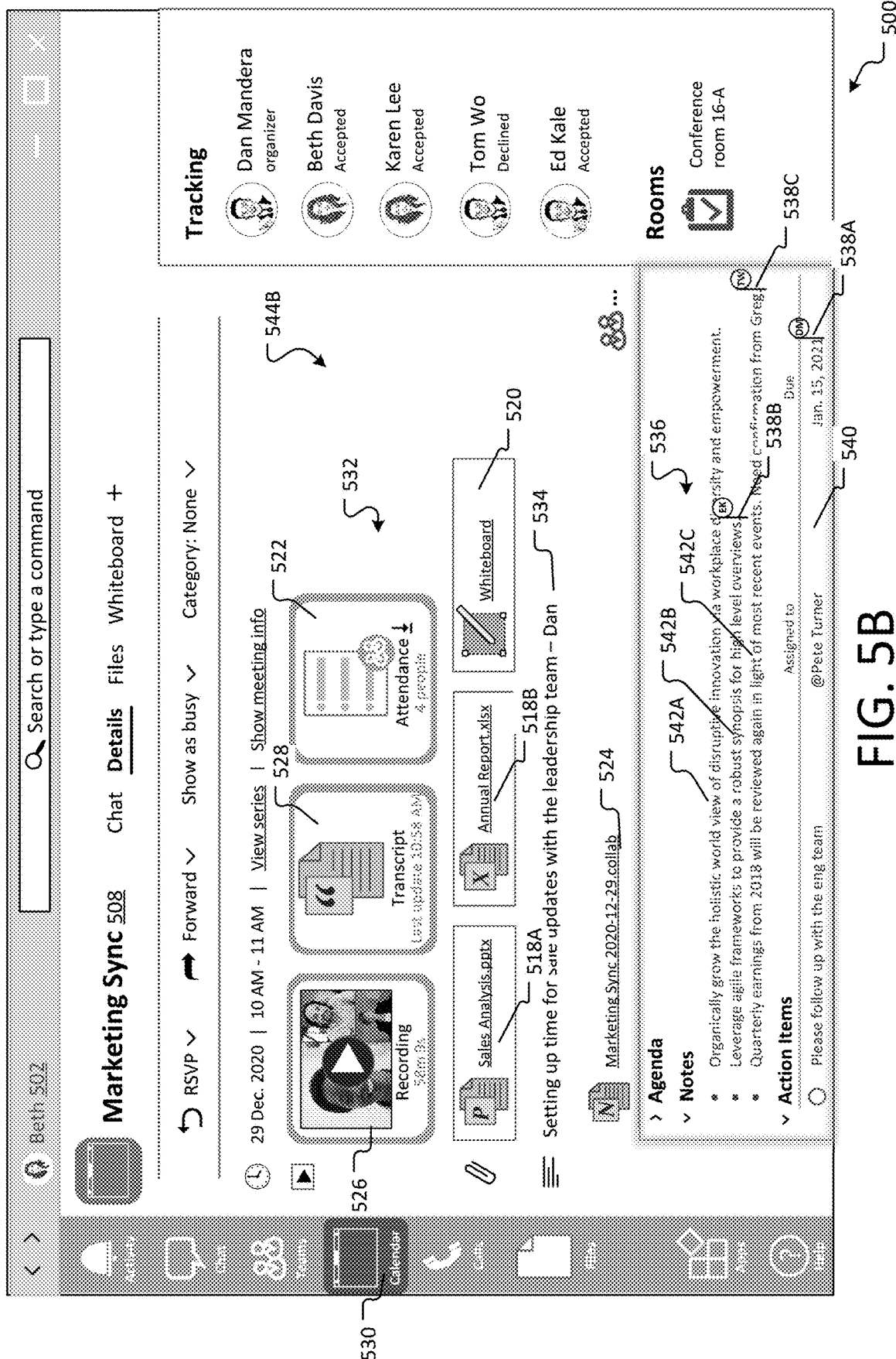

FIGS. 5A-B depict user interfaces of different applications that provide a collaboration object for enabling users to collaborate after a meeting, in accordance with examples of the present disclosure.

FIG. 5A depicts a user interface 500 of a collaborative platform associated with second user 502. In aspects, user interface 500 of the collaborative platform displays a chat tab 510 associated with meeting 508. In this case, the chat thread 512 involves invitees of meeting 508 (whether or not they attended). In addition to chats 514A-C of chat thread 512, a collaboration object 516 has been delivered to the chat thread 512.

Collaboration object 516 may be similar to the collaboration objects described with respect to FIGS. 2A-4G above; however, since meeting 508 has already occurred, collaboration object 516 includes at least some additional content. For instance, collaboration object 516 includes a recording 526 of meeting 508, a transcript 528 of meeting 508, and an attendance 522 for the meeting 508. As with previously-described collaboration objects, collaboration object 516 includes collaborative notebook document 524 and documents 518A-B. Additionally, the whiteboard session 520 captured during meeting 508 has been attached as content. Collaboration object 516 may further be provided via a collaborative UX 544A, which is customized or suitable for inclusion in a chat thread. For example, the collaboration object 516 may be provided with a compact layout where content may be accessed by selecting various thumbnail previews of the content. For example, upon selecting a thumbnail preview for collaborative notebook document 524, dynamic content regarding the meeting (e.g., dynamic content 416 of FIGS. 4A-D) may be accessed and updated (e.g., an action item may be marked complete).

In some cases, a meeting recording and transcript, and any content shared during the meeting, may automatically be linked to the collaboration object. In further aspects, one or more items of content may be permission protected. For instance, some content may be available only to attendees whereas other content may be available to all invitees (whether or not they attended). Such permissions may be manually assigned (e.g., by the meeting organizer) or may be automatically assigned (e.g., based on attendance, membership in a group, organizational title or role, and the like). As should be appreciated, by associating content and collaboration associated with a meeting 508 in the collaboration object 516, the meeting organizer and invitees (whether or not they were able to attend) may continue to collaborate after the meeting. Moreover, with everything in one place, users are able to easily and efficiently access content and information associated with meeting 508.

FIG. 5B depicts a user interface 500 of a collaborative platform associated with second user 502. In aspects, user interface 500 of the collaborative platform displays a calendar tab 530 associated with meeting 508.

As illustrated, user interface 500 displays a collaboration object 532 via collaborative UX 544B. Collaboration object 532 may be similar to collaboration object 516; however, collaborative UX 544B is customized such that collaboration object 532 has a different layout and is expanded to display additional content. For example, similar to collaboration object 516, collaboration object 532 may include recording 526, transcript 528, and an attendance 522 for the meeting 508. Additionally, collaboration object 532 may include attached documents 518A-B, meeting description 534, collaborative notebook document 524, and whiteboard session 520 captured during meeting 508.

In this case, collaboration object 532 may be expanded within collaborative UX 544B to provide dynamic content 536, which may include updates following meeting 508. For instance, first user 538A ("DM") (corresponding to first user 432A) has added action item 540; fourth user 538B ("EK") (corresponding to fourth user 432C) has completed second note 542B; and fifth user 538C ("TW") (who declined meeting 508) has completed third note 542C. As illustrated, the first user, fourth user and fifth user are editing dynamic content 536 substantially concurrently, as indicated by cursors representing where each user is editing. In this case, users are able to continue collaboration regarding meeting 508 after the meeting is over by updating collaboration object 532.

As should be appreciated, collaboration objects 516 and 532 have been described in an example of a chat tab and a calendar tab of a collaborative platform; however, corresponding collaboration objects associated with meeting 508 may be synchronized across all applications supporting the meeting 508, such as a calendar/messaging application, a notebook application, a planner application, and the like. In fact, collaboration objects provided across a plurality of applications (such as the applications described herein and any other applications supporting collaboration) may enable a meeting organizer and one or more invitees to collaborate at any time before, during, or after a meeting.

Figure 6A:
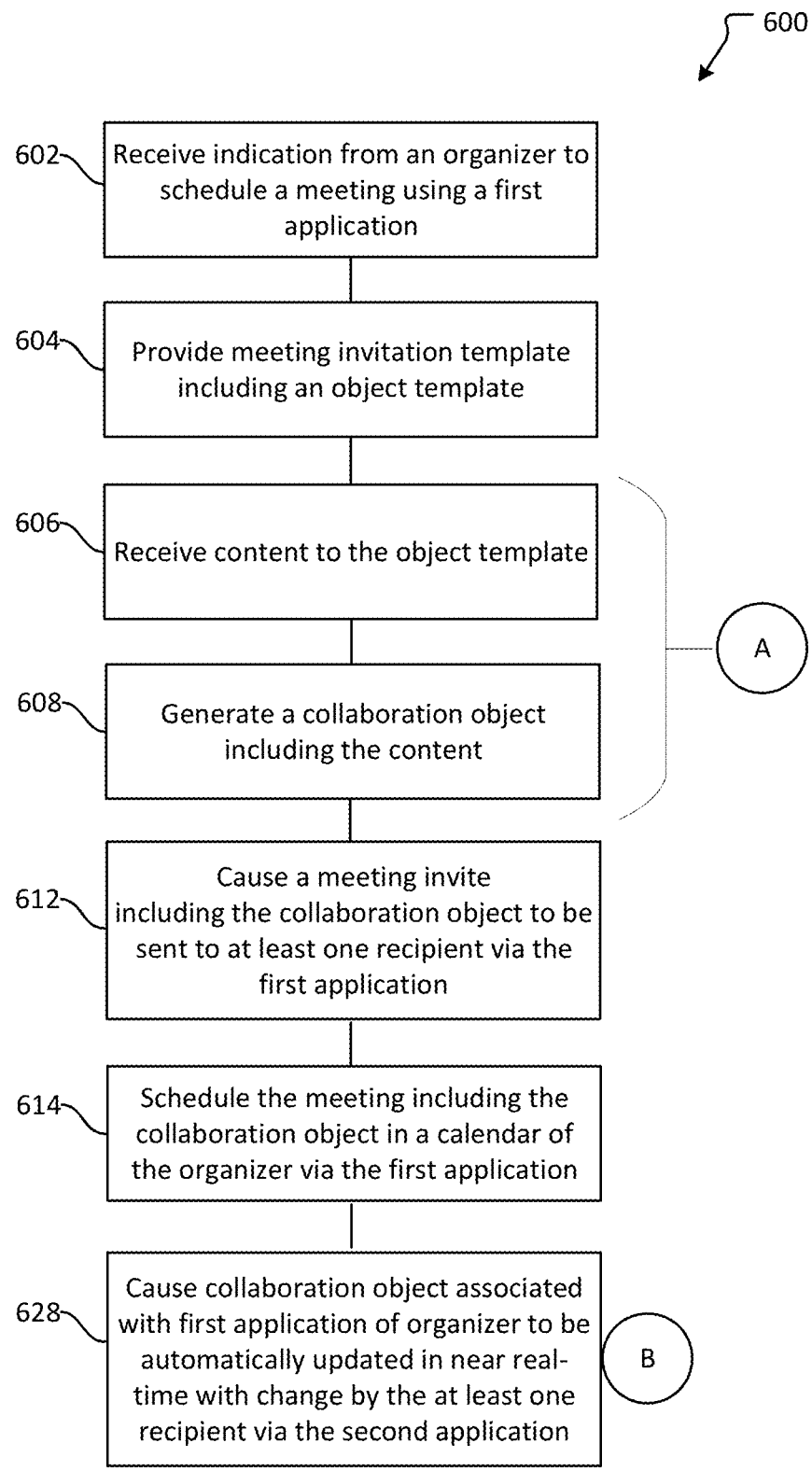
FIGS. 6A-C illustrate an example method for generating and utilizing a collaboration object, in accordance with aspects of the present disclosure.
Figure 6B:
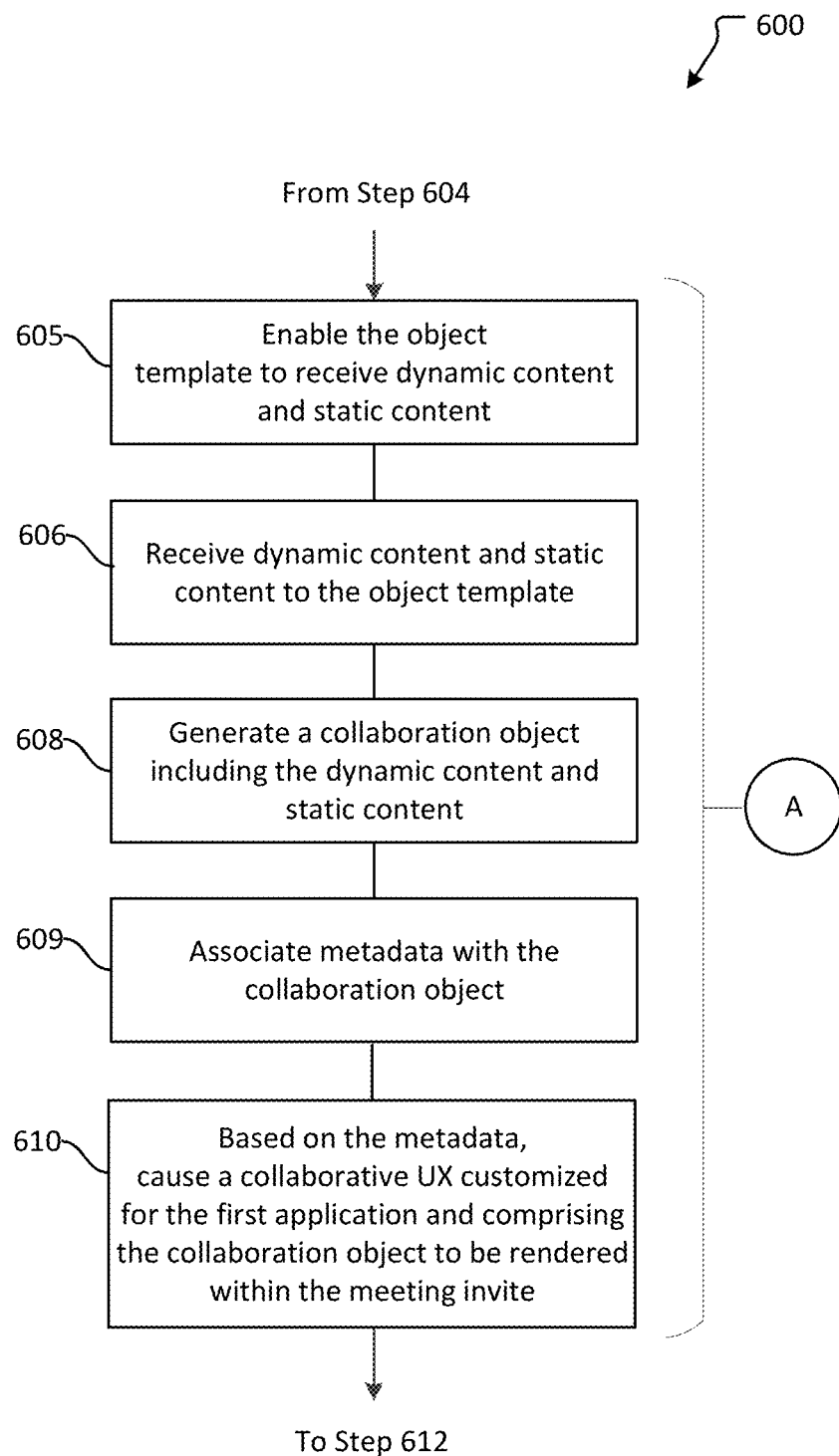
Figure 6C:
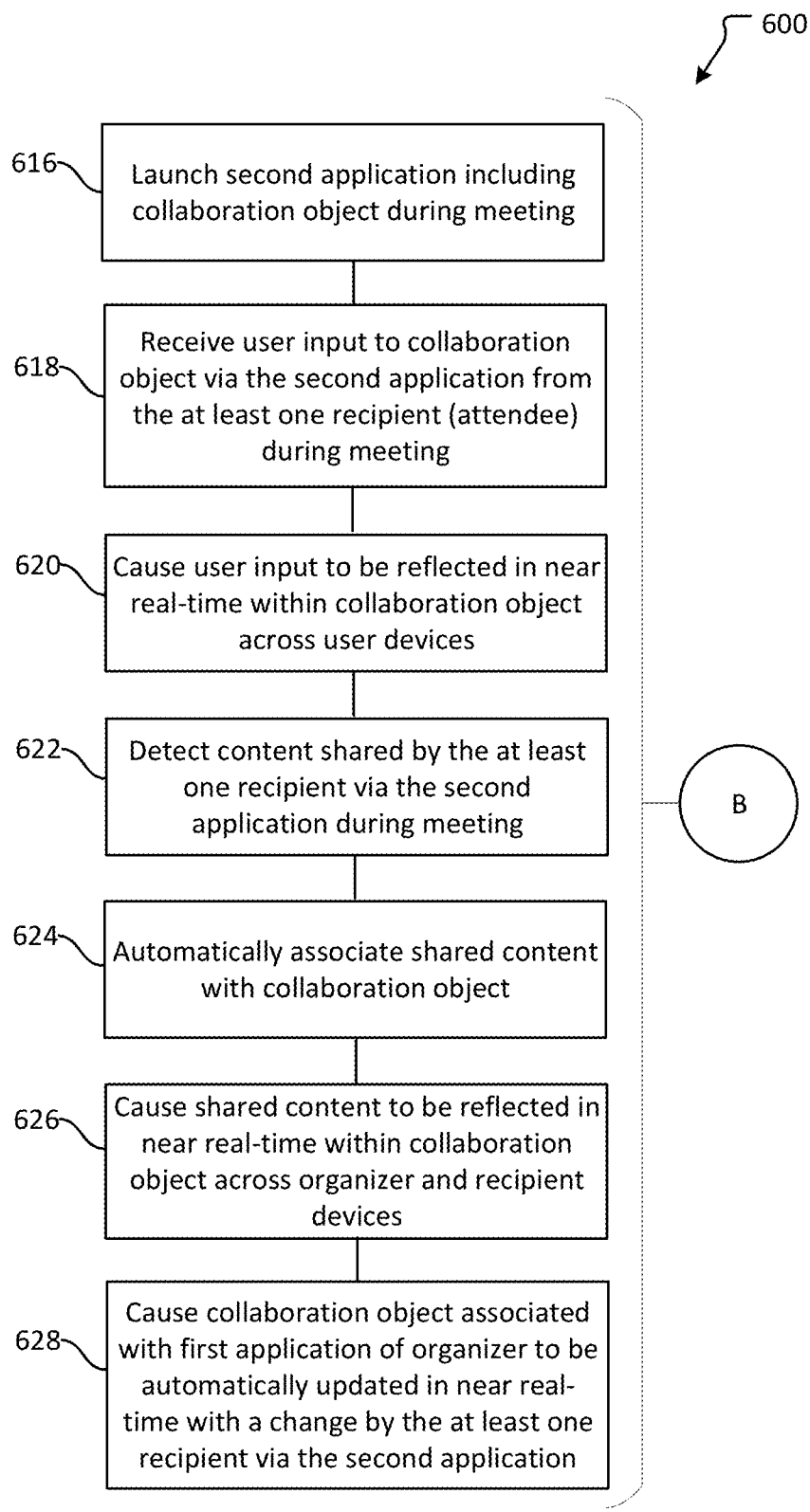

FIGS. 6A-C illustrate an example method for generating and utilizing a collaboration object, in accordance with aspects of the present disclosure.

A general order of the operations for the method 600 is shown in FIGS. 6A-C. The method 600 may include more or fewer steps and/or may progress in a different order of steps from those shown in FIGS. 6A-C. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, user interfaces, modules, software, data structures, data characteristic representations, signaling diagrams, methods, etc., described in conjunction with FIGS. 1-5B and 7A-14B.

At receive operation 602, an indication to schedule a meeting is received via a first application. In aspects, the indication to schedule the meeting may correspond to an organizer initiating a meeting invitation template for scheduling a meeting with one or more invitees via a calendar/messaging application.

At provide operation 604, a meeting invitation template including an object template may be provided. In aspects, a meeting invitation template for scheduling a meeting via a calendar/messaging application may be provided with an object template. An object template may include a predetermined structure for accepting content, such as fields for receiving meeting descriptions, a tool bar having controls for attaching documents and/or images, adjusting text formatting, and the like. Additionally, a collaborative notebook document may automatically be generated and associated with the object template. The object template may further be prepopulated with content categories that may be associated with a meeting, such as an agenda, notes, and action items. In aspects, the content categories may be collaboration enabled and configured with fields for receiving content items (e.g., specific agenda items, notes, action items) associated with the proposed meeting. In aspects, "collaboration enabled" refers to content enabled to support concurrent editing and/or collaboration by a plurality of users.

At receive content operation 606, content may be received to the object template. For instance, such content may include input such as a meeting description, attached documents or images, and an associated collaborative notebook document. Additionally, the content may include content input to dynamic content categories such as agenda items, notes, action items, and the like.

At generate operation 608, a collaboration object including the received content may be generated. For instance, when a meeting organizer has finished entering content associated with a particular meeting into the object template and the meeting organizer either saves or sends the meeting invitation, the object template may be converted to an "collaboration object" within the meeting invitation. In aspects, a collaboration object may result from an object template that is populated with content.

At cause operation 612, a meeting invitation including the collaboration object may be caused to be sent to at least one recipient (e.g., invitee). In aspects, the meeting invitation may be sent to the at least one recipient in a message via the first application (e.g., a calendar/messaging application).

At schedule operation 614, a meeting may be scheduled in a calendar of the organizer via the first application. In aspects, the meeting may be scheduled in the organizer's calendar when the meeting invitation including the collaboration object is sent to the at least one recipient. In other aspects, the meeting may be scheduled in the organizer's calendar when the meeting invitation including the collaboration object is saved, whether or not the organizer has initiated sending the meeting invitation. In aspects, the meeting is scheduled based on the meeting invitation and includes the collaboration object and any associated content.

At update operation 628, the collaboration object associated with the scheduled meeting provided by the first application of the organizer may automatically be updated at substantially the same time as changes are made to the collaboration object by the at least one recipient via the second application. In aspects, a change may be received as input to dynamic content when the at least one recipient accesses the collaboration object via a second application before, during, or after the meeting. In other aspects, a change may be content shared by the at least one recipient via the second application before, during, or after the meeting. The second application may be a collaborative platform, a notebook application, a planner application, or the like, for accessing the meeting associated with the meeting invitation generated by the first application. In aspects, the collaboration object may be updated across user devices and applications regardless of the application through which the change is received.

In aspects, receive content operation 606 and generate operation 608 are detailed further with respect to FIG. 6B (as indicated by "A") and update operation 628 is detailed further with respect to FIG. 6C (as indicated by "B").

FIG. 6B illustrates an example method for generating and utilizing a collaboration object further detailing receive content operation 606 and generate operation 608 of FIG. 6A, in accordance with aspects of the present disclosure.

At enable operation 605, which may follow provide operation 604, the object template may be enabled for receiving dynamic content and static content. For instance, as noted above, the object template may include a predetermined structure for accepting content, including attached content (e.g., documents, images, whiteboard sessions, recordings, transcripts, and the like) and dynamic content (e.g., collaboration-enabled dynamic content, such as a collaborative notebook document or dynamic content categories within the object template). In aspects, dynamic content refers to content enabled to support concurrent multi-user interactions (e.g., adding, editing, deleting, and the like) that are synchronized across applications and/or user systems in near real-time. Static content may be content that is associated with (or attached to) a collaboration object (e.g., attached or shared documents, images, whiteboard sessions, recordings, transcripts, and the like) but that is not collaboration enabled. That is, while attached documents may be accessed (e.g., opened) from the collaboration object, changes to the documents made by one user are not reflected in the same documents accessed by another user, for instance. While static content itself may not be collaboration-enabled, the attachment (or sharing or linking) of the content to a collaboration object may be reflected in near real-time across each application and each user system.

At receive content operation 606, content may be received to the object template. For instance, such content may include static content (e.g., attached documents, images, whiteboard sessions, recordings, transcripts, and the like) and dynamic content (e.g., a collaborative notebook document or content input to dynamic content categories within the object template, such as agenda items, notes, action items, and the like).

At generate operation 608, a collaboration object including the received content may be generated. For instance, when a meeting organizer has finished entering content associated with a particular meeting into the object template, and the meeting organizer either saves or sends the meeting invitation, the object template may be converted to an "collaboration object" within the meeting invitation. In aspects, the generated collaboration object may comprise the dynamic content and the static content received to the object template.

At associate operation 609, metadata may be associated with the collaboration object. The metadata may include information for retrieving content (e.g., stored within a storage component on data host) and for rendering a collaborative user experience (UX), such as pointers to custom code for generating the collaborative UX and a code loader for ingesting the metadata and loading the collaborative UX, for example. A collaborative UX may customize the portable interface and/or functionality of the collaboration object for a particular application. For example, a collaborative UX may be customized so as to exhibit a similar look and/or feel (e.g., theming, color scheme, layout, design elements, etc.) to an interface associated with an application.

At render operation 610, based on the metadata, a collaborative UX associated with the collaboration object may be rendered within the meeting invitation. In aspects, the metadata may enable a first application (e.g., a calendar/messaging application) to follow pointers to custom code and a code loader for rendering the collaborative UX. In aspects, the custom code may specific to a particular interface or application, enabling collaborative UX to be customized for the first application. In further aspects, the metadata may provide a pointer or other reference for retrieving the dynamic content from storage (e.g., associated with a data host). The dynamic content, in at least some examples, may be synchronized across different applications and different user devices such that the dynamic content retrieved from storage reflects any updates in near real-time.

FIG. 6C illustrates an example method for generating and utilizing a collaboration object further detailing update operation 628 of FIG. 6A, in accordance with aspects of the present disclosure.

At launch operation 616, a second application may be launched during the meeting associated with the meeting invitation. In an example, the second application may be a collaborative platform for hosting the meeting. In some aspects, the second application may provide video functionality such that the organizer and the at least one recipient (e.g., attendee) may view one another during the meeting. In other examples, the second application may be a collaboration-enabled notebook application, a planner application, or a task application accessed by the at least one recipient during the meeting. Regardless of the type of collaboration-enabled application, the collaboration object may be available via the second application during the meeting. In some aspects, the collaboration object may be provided via a collaborative UX customized for the second application.

At receive input operation 618, input to the collaboration object by the at least one recipient may be received. For instance, the recipient may input content into dynamic content categories associated with the collaboration object, such as an agenda item, a note, or an action item.

At reflect operation 620, the input received from the at least one recipient may be reflected in near real-time across user devices. For example, the input of the agenda item, note, or action item may be reflected in the collaboration object on the device of at least the organizer and any other recipients. The input may be reflected across the user devices at substantially (or nearly) the same time as it is received by the at least one recipient. In some cases, where the second application is hosting the meeting, the input may be reflected in the collaboration object provided by the second application during the meeting. In other cases, where the second application is a collaboration enabled notebook application, planner application, or task application, for example, the input may still be reflected in near real-time in the collaboration object provided by a third application hosting the meeting. That is, regardless of the application that receives the input to the collaboration object, the input may be reflected across the other collaboration-enabled applications and user devices accessing the collaboration object.

At detect operation 622, the at least one recipient may share content via the second application during the meeting. Sharing content may involve sharing a presentation (e.g., via the video capabilities of the second application) with the meeting participants. Sharing content may also include examples such as sharing a link to content (e.g., to a video or website) within a chat thread or otherwise during the meeting. In aspects, the second application may detect the content being shared by the at least one recipient.

At associate operation 624, the shared content may be automatically associated (e.g., linked or attached) to the collaboration object. For example, if a presentation is shared during the meeting, the presentation may automatically be associated with the collaboration object (e.g., as a link or an attachment). In another example, if a link to content is shared during the meeting, the link may be associated with collaboration object. In yet another example, when a link to content is shared, the link may be followed and the content may be retrieved and associated with the collaboration object.

At reflect operation 626, the content shared by the at least one recipient may be reflected in near real-time across user devices. For example, the shared content may be reflected in the collaboration object on the device of at least the organizer and any other recipients. The content may be reflected across the user devices at substantially (or nearly) the same time as it is shared by the at least one recipient. In some cases, where the second application is hosting the meeting, the shared content may be reflected as linked to the collaboration object as it is shared via the second application during the meeting. In other cases, where the second application is a collaboration enabled notebook application, planner application, or task application, for example, the shared content may still be reflected in near real-time as linked to the collaboration object provided by a third application hosting the meeting. For instance, the at least one recipient may share a link to content within the notebook application and the link may be automatically associated with the collaboration object provided by the third application hosting the meeting. That is, regardless of the application through which the content is shared, the shared content may be reflected across the other collaboration-enabled applications and user devices accessing the collaboration object.

At update operation 628, the collaboration object associated with the scheduled meeting provided by the first application of the organizer may automatically be updated with change(s) made to the collaboration object by the at least one recipient via the second application. In aspects, a change may be received as input to dynamic content when the at least one recipient accesses the collaboration object via a second application before, during, or after the meeting. In other aspects, a change may be content shared by the at least one recipient via the second application before, during, or after the meeting. The second application may be a collaborative platform, a notebook application, a planner application, or the like, for accessing the meeting associated with the meeting invitation generated by the first application. In aspects, the collaboration object may be updated across user devices and applications regardless of the application through which the change is received.

As should be appreciated, operations 602-628 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 7A:
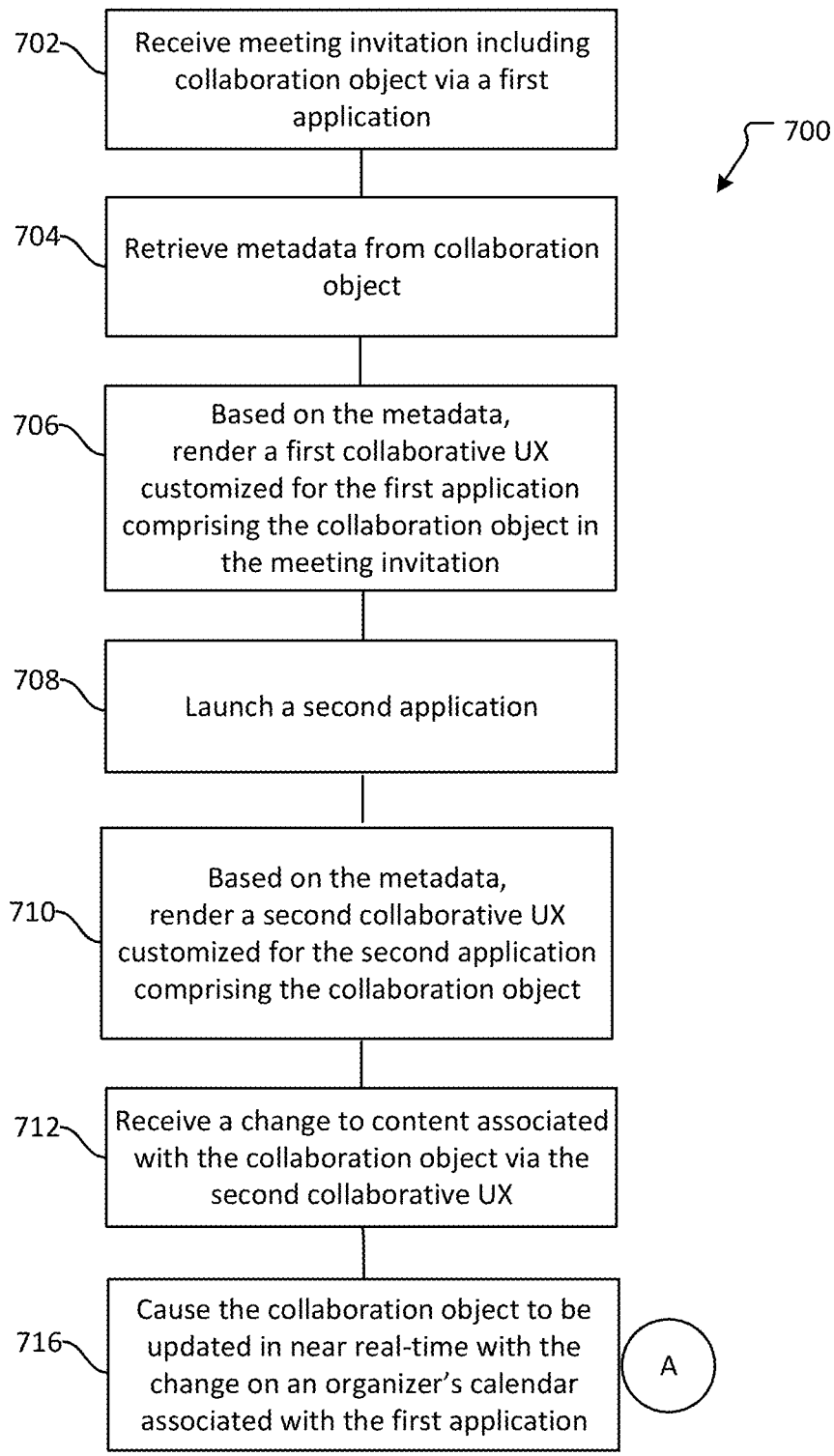
FIGS. 7A-B illustrate an example method for receiving a meeting invitation including a collaboration object, in accordance with aspects of the present disclosure.
Figure 7B:
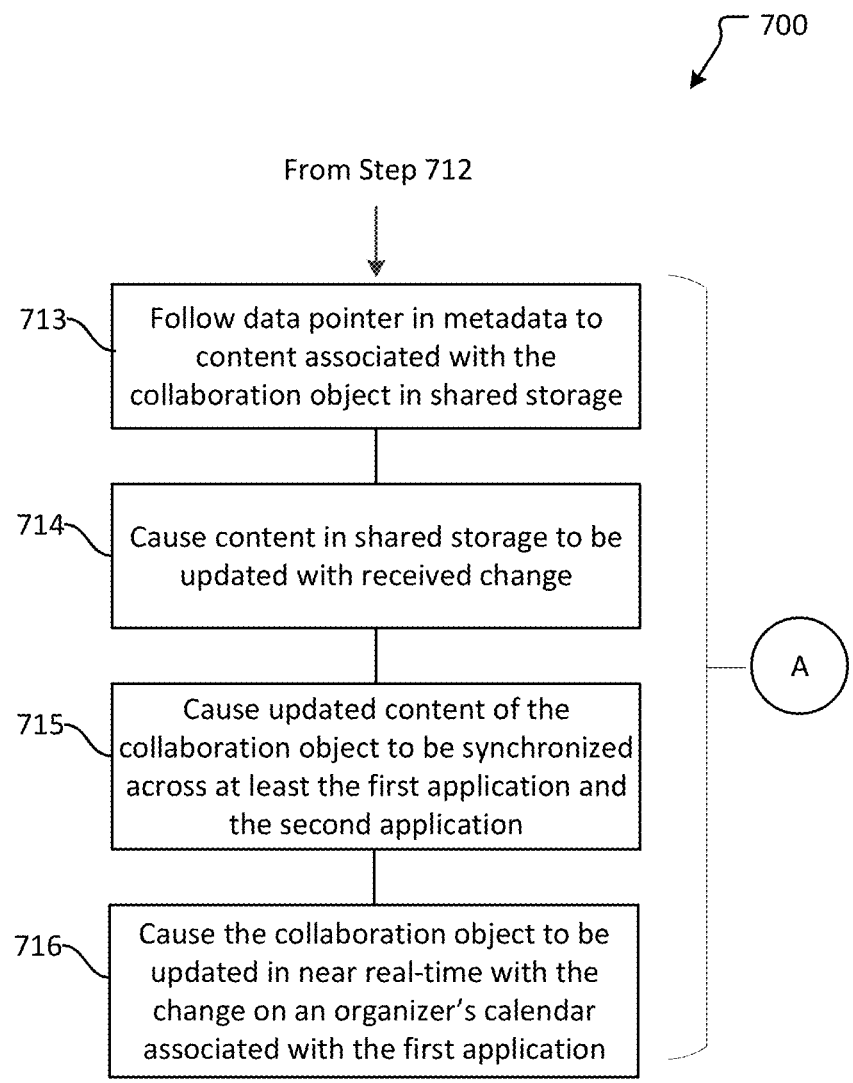

FIGS. 7A-B illustrate an example method for receiving a meeting invitation including a collaboration object, in accordance with aspects of the present disclosure.

A general order of the operations for the method 700 is shown in FIGS. 7A-B. The method 700 may include more or fewer steps and/or may progress in a different order of steps from those shown in FIGS. 7A-B. The method 700 can be executed as a set of computer-executable instructions executed by a computer system and encoded or stored on a computer readable medium. Further, the method 700 can be performed by gates or circuits associated with a processor, an ASIC, an FPGA, a SOC or other hardware device. Hereinafter, the method 700 shall be explained with reference to the systems, components, devices, user interfaces, modules, software, data structures, data characteristic representations, signaling diagrams, methods, etc., described in conjunction with FIGS. 1-6B and 8A-14B.

At receive meeting invitation operation 702, a meeting invitation may be received by a first application (e.g., calendar/messaging application) of at least one recipient (e.g., an invitee to a meeting). In aspects, the meeting invitation may include a collaboration object and associated metadata.

At retrieve operation 704, the metadata may be retrieved from the collaboration object by the first application (e.g., calendar/messaging application).

At first render operation 706, the first application of the invitee may follow pointers in the metadata to custom code and a code loader for rendering a first collaborative UX associated with the collaboration object. In aspects, the custom code may specific to particular interfaces or functionality of the first application, enabling the first collaborative UX to be customized for the first application. Additionally, the first application may follow a data pointer associated with the metadata to retrieve content associated with the collaboration object. In aspects, the content may include attached content (such as documents, images, whiteboard sessions, videos, presentations, and the like), a collaborative notebook document associated with the meeting, and/or dynamic content associated with the collaboration object. For example, dynamic content refers to content enabled to support concurrent editing and/or collaboration by a plurality of users.

At launch operation 708, a second application may be launched. For instance, the second application may be a collaborative platform for joining a meeting associated with the meeting invitation. In other aspects, the second application may be a planner application or a notebook application for viewing and/or interacting with the collaboration object associated with the meeting. In aspects, the second application may be launched before, during, or after the meeting.

At second render operation 710, the collaboration object may be accessed via the second application (e.g., a collaborative platform, planning application, notebook application, and the like) to render a second collaborative UX. In this case, the second application may retrieve the metadata associated with the collaboration object and follow pointers to custom code and a code loader for rendering the second collaborative UX. In aspects, the custom code may specific to particular interfaces or functionality of the second application, enabling the second collaborative UX to be customized for the second application. Additionally, the second application may follow the data pointer associated with the metadata to retrieve content associated with the collaboration object.

At receive change operation 712, a change may be received to the content associated with the collaboration object via the second collaborative UX. In an example, the change may include edits, additions, or deletions to dynamic content. For example, the at least one recipient may add an agenda item, a note, or an action item to the collaborative categories of the collaboration object via the second collaborative UX. Additionally or alternative, the at least one recipient may attach, share, or otherwise link static content with the meeting (e.g., by sharing content within a message thread). This static content may automatically be associated with the collaboration object. In other aspects, the change may involve deleting static content from the collaboration object (e.g., by deleting an attachment from the meeting). In aspects, the at least one recipient may make the change before, during, or after the meeting.

At cause update operation 716, the collaboration object associated with a scheduled meeting on the meeting organizer's calendar may be updated in near real-time with the received change. That is, in response to receiving the change to content associated with the collaboration object via the second collaborative UX rendered by the second application, the change may be synchronized across applications (e.g., at least the first application and the second application) and across user systems (e.g., of at least the meeting organizer and the at least one recipient) to cause the collaboration object for the meeting to be updated in near real-time on an organizer's calendar associated with the first application.

In aspects, cause operation 716 is detailed further with respect to FIG. 7B (as indicated by "A").

FIG. 7B illustrates an example method for receiving a meeting invitation including a collaboration object and further detailing cause operation 716 of FIG. 7A, in accordance with aspects of the present disclosure.

At follow operation 713, which may follow receive change operation 710, the second application may follow a pointer or other reference to content associated with the collaboration object in storage (e.g., associated with a data host). In some cases, the content may be dynamic content (e.g., content enabled for concurrent multi-user interaction) or static content (e.g., content attached or otherwise associated with a collaboration object that is not enabled for concurrent multi-user interaction).

At cause operation 714, the change may update the content associated with the collaboration object in the shared storage. As noted above, the change may comprise edits, additions, or deletions to dynamic content or sharing, attaching, linking, or deleting static content.

At cause synchronize operation 715, the updated content may be synchronized across different applications and different user devices such that the content associated with the collaboration object may reflect current content in near real-time. That is, an update to dynamic content (e.g., addition of an agenda item) and/or an update to static content (e.g., attachment of a revised document) may be reflected in the collaboration object across each of the different applications and user devices in near real-time.

At cause update operation 716, the collaboration object associated with a scheduled meeting on the meeting organizer's calendar may be updated with the received change. That is, in response to receiving the change to content associated with the second collaborative UX rendered by the second application, the change may be synchronized across applications (e.g., at least the first application and the second application) and across user systems (e.g., of at least the meeting organizer and the at least one recipient) to cause the collaboration object for the meeting to be updated on an organizer's calendar associated with the first application. In aspects, the meeting organizer's calendar may be updated with the received change in near real-time. That is, the meeting organizer's calendar may be updated with the received change at substantially (or nearly) the same time as the change is received by the second application. In aspects, substantially or nearly the same time may include a minimal time associated with synchronizing the change across the different applications and user devices based on resource availability, network bandwidth, processing speeds, and the like.

As should be appreciated, operations 702-716 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 8A:
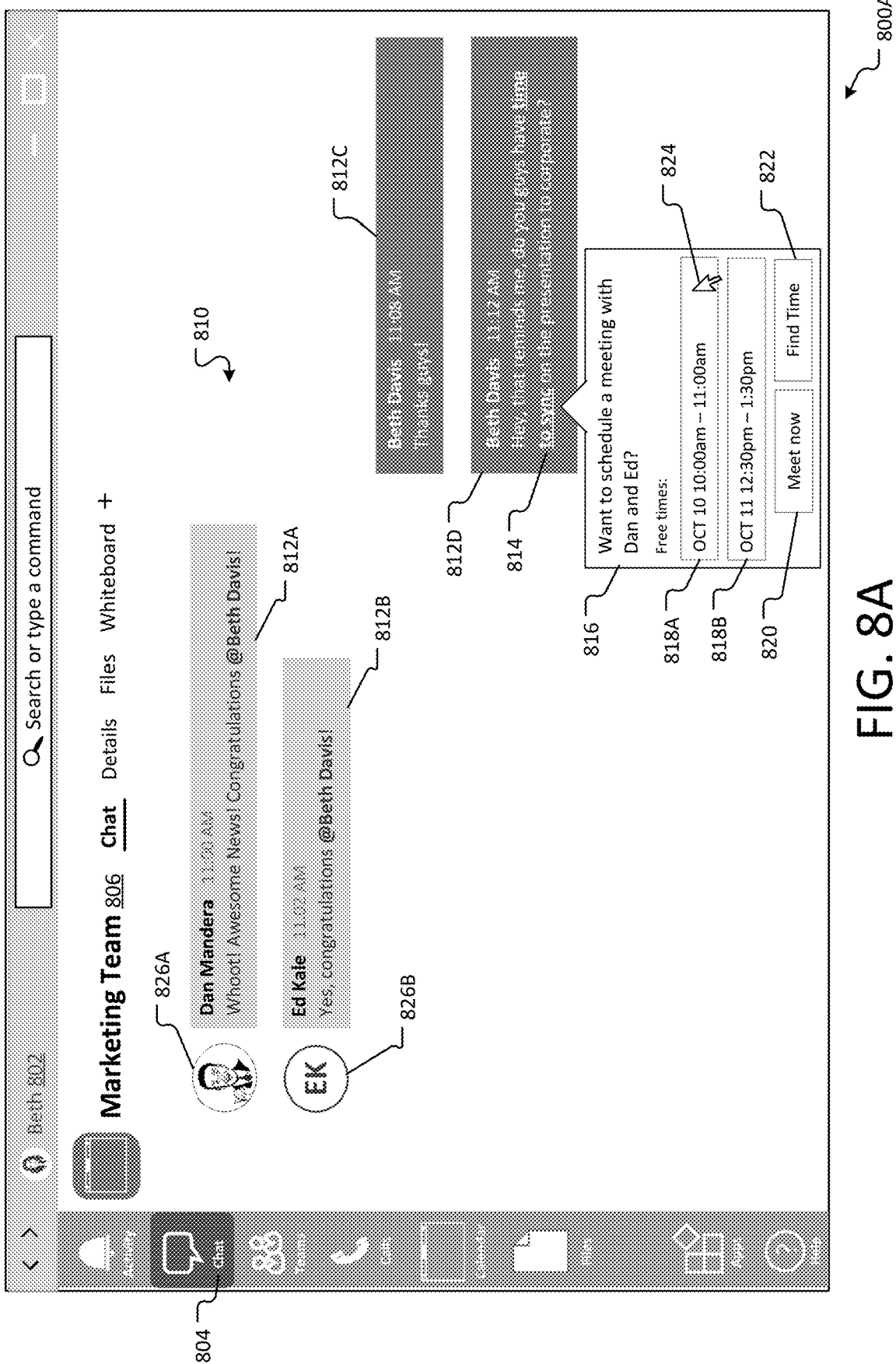
FIGS. 8A-B depict a user interface of a collaborative platform for identifying and implementing a user objective to schedule a meeting, in accordance with examples of the present disclosure.
Figure 8B:
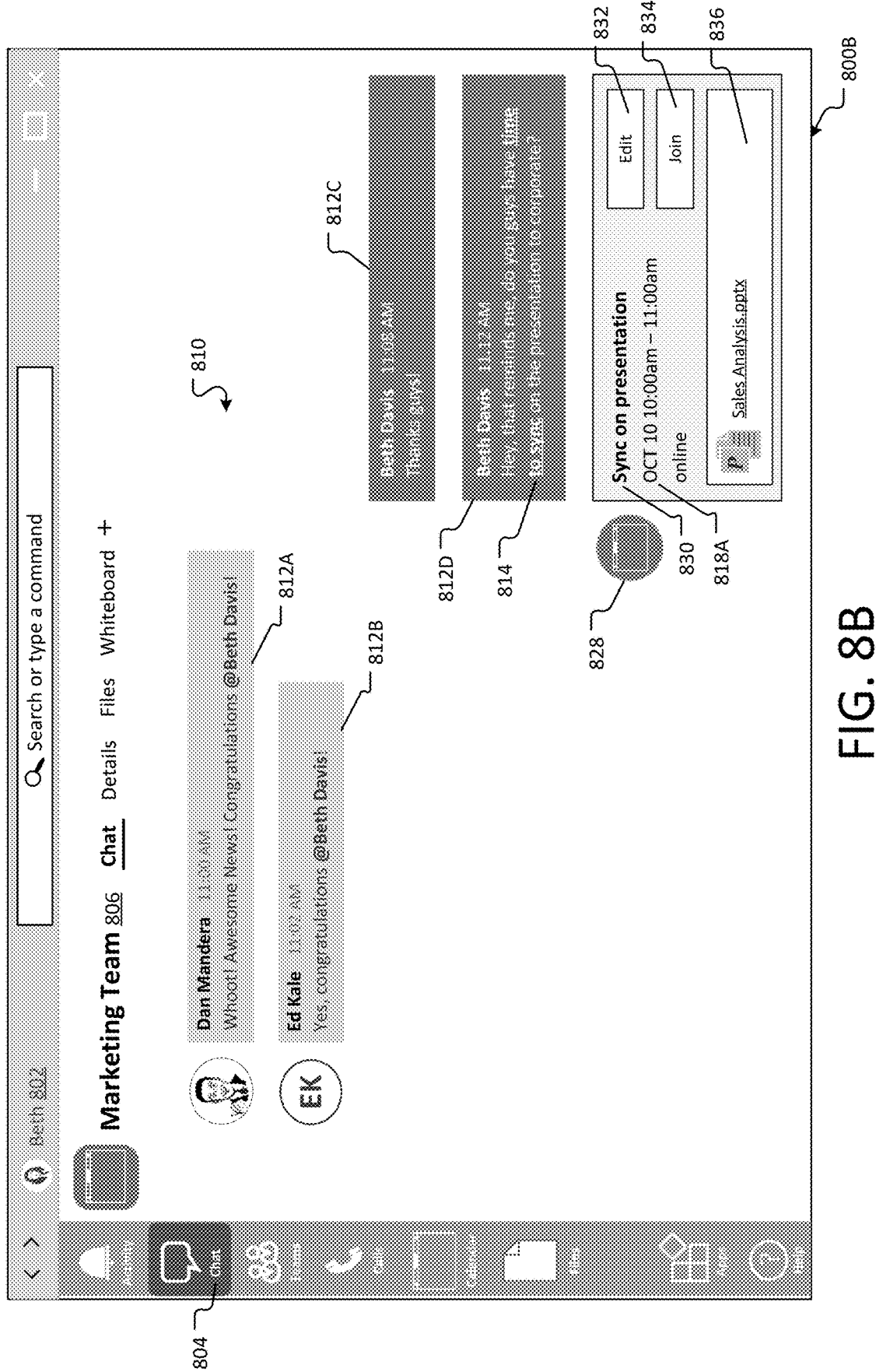

FIGS. 8A-B depict a user interface of a collaborative platform for identifying and implementing a user objective to schedule a meeting, in accordance with examples of the present disclosure.

FIG. 8A depicts a user interface 800A of a collaborative platform associated with a user 802. In aspects, user interface 800A of the collaborative platform displays a chat tab 804 associated with a collaboration team 806 (e.g., "Marketing Team"). A chat thread 810 involves members of collaboration team 806. A conversation (e.g., chat thread 810) involves a number of chats 812A-D between members of the team, including user 826A ("Dan"), user 826B ("Ed"), and user 802 ("Beth").

As illustrated by chat 812D, user 802 ("Beth Davis") asks other members if they "have time to sync" on a presentation. In aspects, the collaborative platform (or other associated application) may monitor user correspondence to detect a user objective or desire to schedule a meeting. User statements may range from explicit requests to meet to more implicit indications of a desire to connect or collaborate. For example, user statements or queries indicative of an intention to schedule a meeting may include but are not limited to: "Can we set a meeting?"; "Let's schedule something soon"; "How does your calendar look tomorrow?"; "What's your availability next week?"; "Can we sync up?"; "When are you free?"; "Let's get something on the calendar"; "How's your afternoon?"; and the like. In aspects, the system may parse various user statements to identify certain words and/or phrases, such as "meet," "free," "availability," "calendar," "when," "sync," "schedule," "let's chat," and the like. Based on natural language processing and/or machine learning techniques, for example, the system may be trained to recognize such words and/or phrases that indicate a user intention or objective to collaborate. In aspects, collaboration may involve an in-person meeting, a virtual meeting, a phone call, a video call, or the like.

In some cases, the system may determine that the user desires a meeting, e.g., based on a statement such as, "Let's get something on the calendar." In other cases, the system may determine that the user desires a phone call, e.g., based on a statement such as, "Do you have time to chat?" In still other cases, the system may detect a user intention to collaborate, but may not be able to determine a particular collaboration venue, e.g., based on a statement such as, "Can we sync up?" In aspects, the system may also be able to identify a topic of the collaboration, timing for the collaboration, required attendees, or other details (or parameters). For instance, in a chat thread between a first user, e.g., "Dan," and a second user, e.g., "Ed," Ed may state: "Can we chat about the presentation tomorrow?" Based on context (e.g., a chat between Dan and Ed) and the user statement, the system may determine that "Dan" is a required attendee, the topic of the desired collaboration is a "presentation," and the timing of desired collaboration is "tomorrow."

Figure 10A:
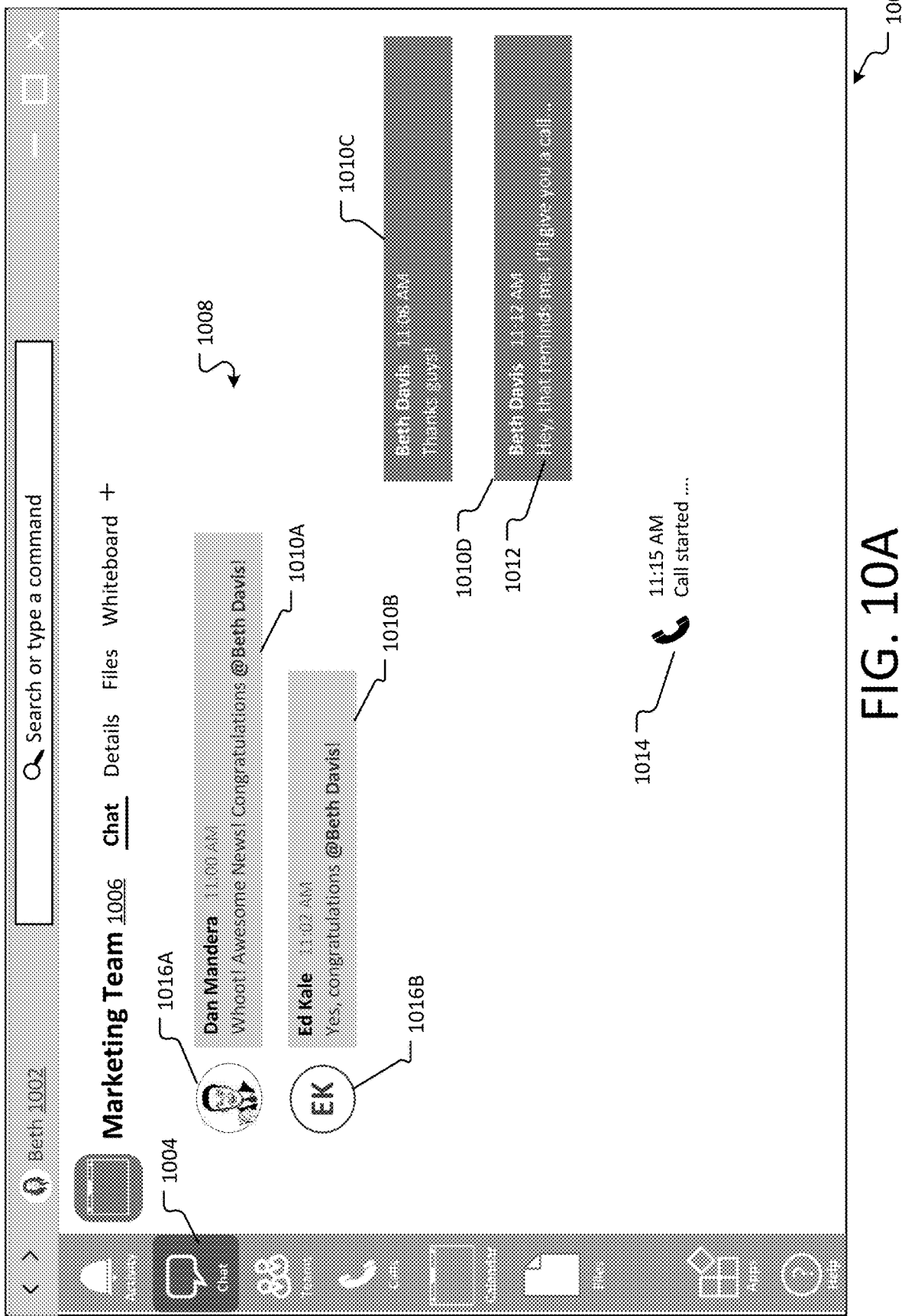
FIGS. 10A-C depict a user interface of a collaborative platform for detecting a user collaboration and automatically generating a collaboration object, in accordance with examples of the present disclosure.
Figure 10B:
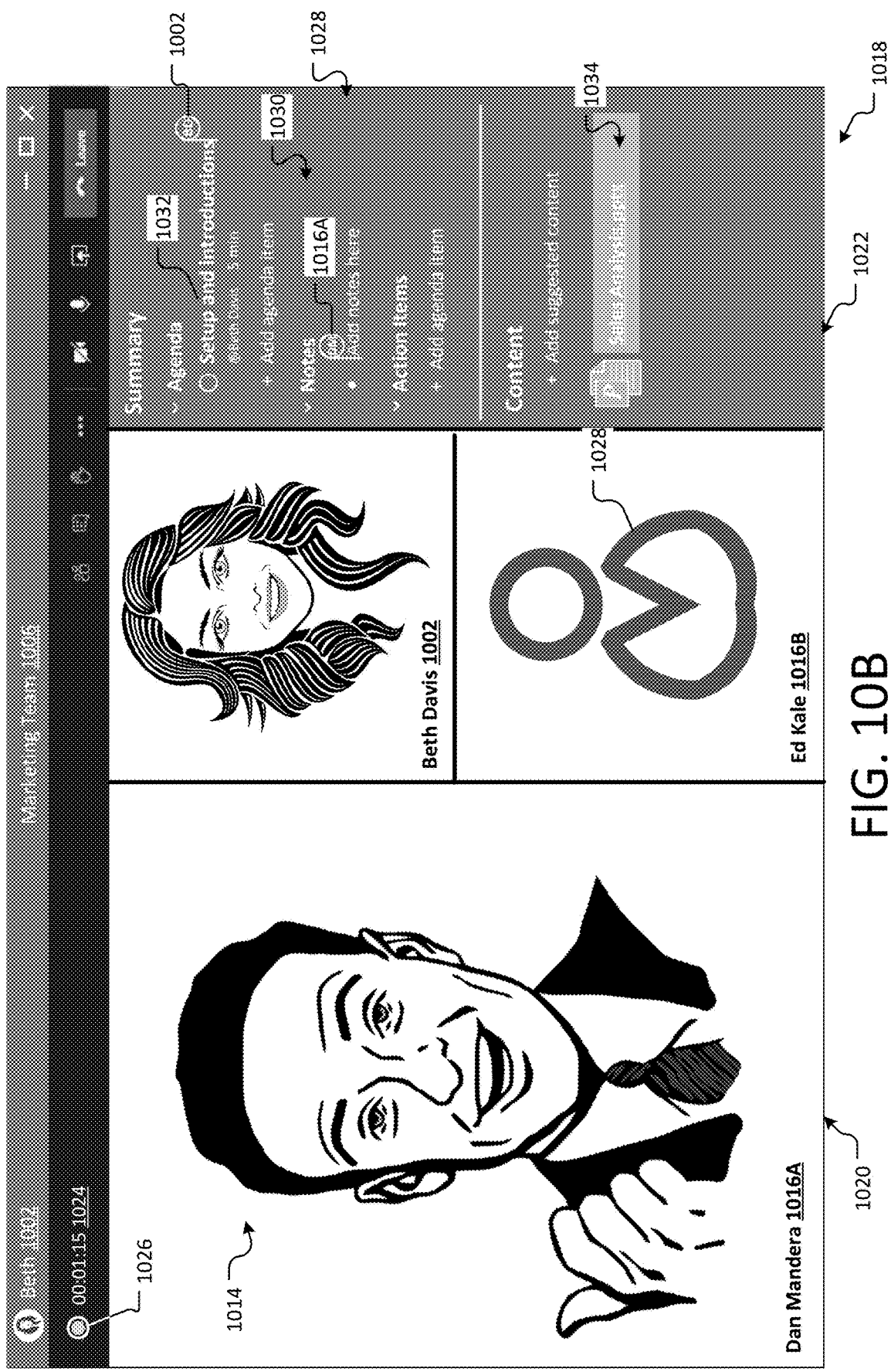
Figure 10C:
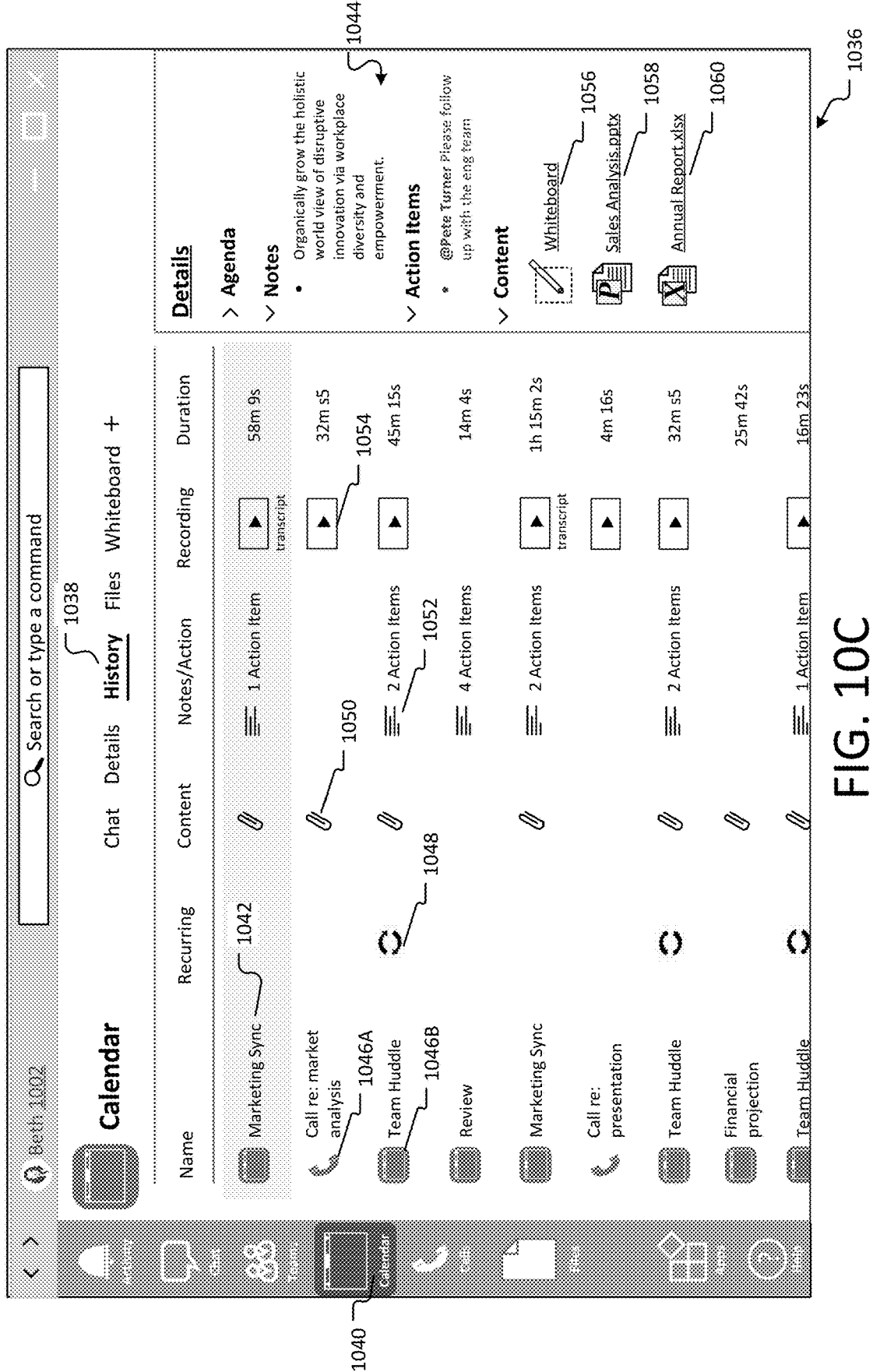

In the illustrated example, user 802 ("Beth Davis") poses query 814: "do you guys have time to sync on the presentation to corporate?" From the query 814, the system may determine that user 802 would like to meet with the other users in the chat thread, user 826A ("Dan") and user 826B ("Ed"). Additionally, the system may determine that user 802 wishes to collaborate regarding the "presentation to corporate." Based on these determinations, the system my issue prompt 816. Prompt 816 may be automatically populated with free times on Dan and Ed's schedules, such as proposed time 818A and proposed time 818B. Additionally, prompt 816 may provide control 820 to "meet now" and control 822 to "find time." In response to selection of control 820, a meeting between user 802 and users 826A-B may automatically be launched. FIGS. 10A-C further describe this example. In response to selection of control 822, user 802 may be directed to a meeting invitation template to find a time to schedule the meeting. See FIG. 2A. In response to selection 824 of either proposed time 818A or 818B, user 802 may be directed to a meeting invitation template prepopulated with the selected time. In some cases, the meeting invitation template may be prepopulated with the subject title, "Sync on presentation," based on a system determination of the meeting topic. The meeting invitation template may also comprise an object template. Examples of meeting invitation templates and object templates are illustrated with respect to FIGS. 2A-2D.

FIG. 8B depicts user interface 800B of the collaborative platform associated with user 802. As with FIG. 8A, user interface 800B of the collaborative platform displays chat tab 804 associated with collaboration team 806 (e.g., "Marketing Team"). Chat thread 810 involves chats 812A-D between members of the team.

In this case, in response to prompt 816 (not shown), user 802 scheduled meeting 828 at proposed time 818A. The meeting title 830 is "Sync on presentation," which may have been auto-populated by the system or manually input into the meeting invitation template by user 802 (see FIG. 2B, reference 224). In aspects, meeting 828 may comprise a collaboration object, as described above. In response to selecting control 832, either user 802 or invitees 826A-B may edit the collaboration object, e.g., by adding agenda items, notes, action items. These edits will automatically be reflected across user devices and across applications (e.g., within each user's calendar) in near real-time, as described above. As shown, presentation 836 is attached to the meeting 828 and can be accessed from the collaboration object before, during, or after the meeting. In response to selecting control 834, attendees can join the meeting from interface 800B of the collaborative platform.

FIGS. 9A-E depict different user interfaces of different applications for identifying and implementing a user objective to schedule a call, in accordance with examples of the present disclosure.

Figure 9A:
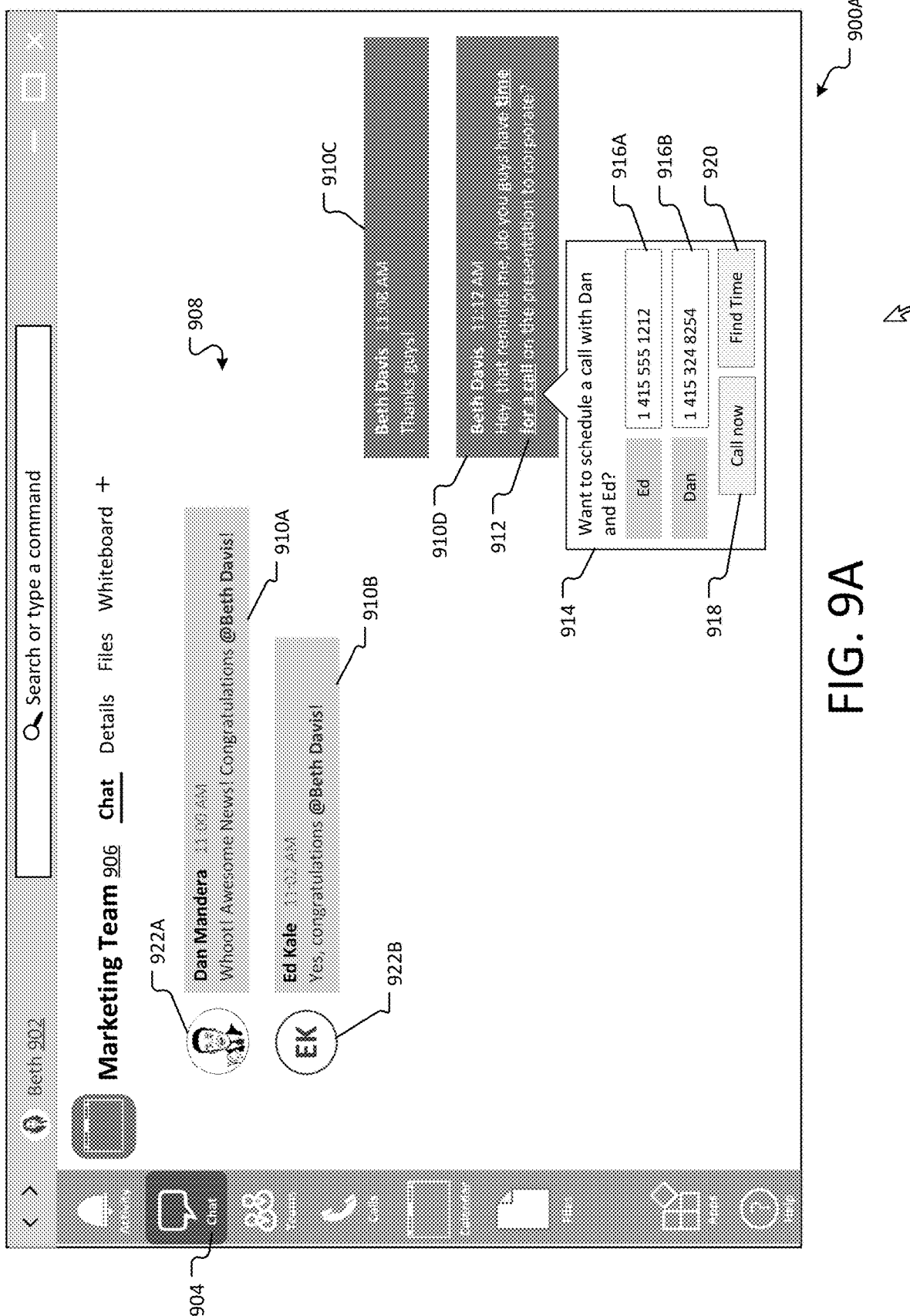

FIG. 9A depicts a user interface 900A of a collaborative platform associated with a user 902. In aspects, user interface 900A of the collaborative platform displays a chat tab 904 associated with a collaboration team 906 (e.g., "Marketing Team"). A chat thread 908 involves members of collaboration team 906. A conversation (e.g., chat thread 908) involves a number of chats 910A-D between members of the team, including user 922A ("Dan"), user 922B ("Ed"), and user 902 ("Beth").

As illustrated by chat 910D, user 902 ("Beth Davis") poses query 912: "do you guys have time for a call on the presentation to corporate?" From the query 912, the system may determine that user 902 would like to schedule a call with the other users in the chat thread, user 922A ("Dan") and user 922B ("Ed"). Additionally, the system may determine that user 902 wishes to collaborate regarding the "presentation to corporate." Based on these determinations, the system my issue prompt 914. Prompt 914 may be automatically populated with contact information (e.g., phone numbers, email addresses, @mentions) for Dan and Ed, such as phone numbers 916A-B. Additionally, prompt 914 may provide control 918 to "call now" and control 920 to "find time." In response to selection of control 918, user 902 may initiate a call with users 922A-B. FIGS. 10A-C further describe this example. In response to selection of control 920, user 902 may be directed to a call invitation template to find a time to schedule the call, as described further with respect to FIG. 9B. In response to selection of either or both phone numbers 916A-B, user 902 may be directed to a call invitation template prepopulated with the selected phone number(s).

FIG. 9B depicts a user interface 924 of a calendar/messaging application launched based on a selection to schedule a call. For instance, as described with reference to FIG. 9A, a user 902 may have made selections from prompt 914 (not shown), such as phone numbers 916A-B and/or control 920 ("find time"). The user interface 924 of the calendar/messaging application depicts a calendar interface associated with user 902 (e.g., "Beth Davis"). As illustrated, call invitation template 926 comprises one or more input fields and/or selections for receiving parameters associated with a proposed call. For instance, the call invitation template 926 may comprise a title field, a phone number field, a time/date field, a reminder selection, and the like. Based on system determinations and selections made from prompt 914 (not shown), the call invitation template 926 has been populated with a title 930, "Call re: presentation to corporate," and phone numbers 916A-B. As detailed above, based on query 912, the system may determine that the topic of the proposed call is the "presentation to corporate" and may prepopulate call invitation template 926 with title 930. User 902 may input (or select from a drop-down menu) the time/date 932 for the call.

The call invitation template 926 may further comprise an object template 928. Similar to object templates described above, object template 928 may include a description field 934 for inputting a call description and tool bar 936 having controls for attaching documents and/or images, including emojis, adjusting text formatting, and the like. As illustrated, a presentation 940 entitled "Sales Analysis" has been attached to the object template 928. The object template 928 is further prepopulated with content categories 938 that may be associated with a call, such as an agenda, notes, and action items. In aspects, the content categories 938 may be collaboration enabled and configured with fields for receiving content items (e.g., specific agenda items, notes, action items) associated with the proposed call.

Figure 9C:
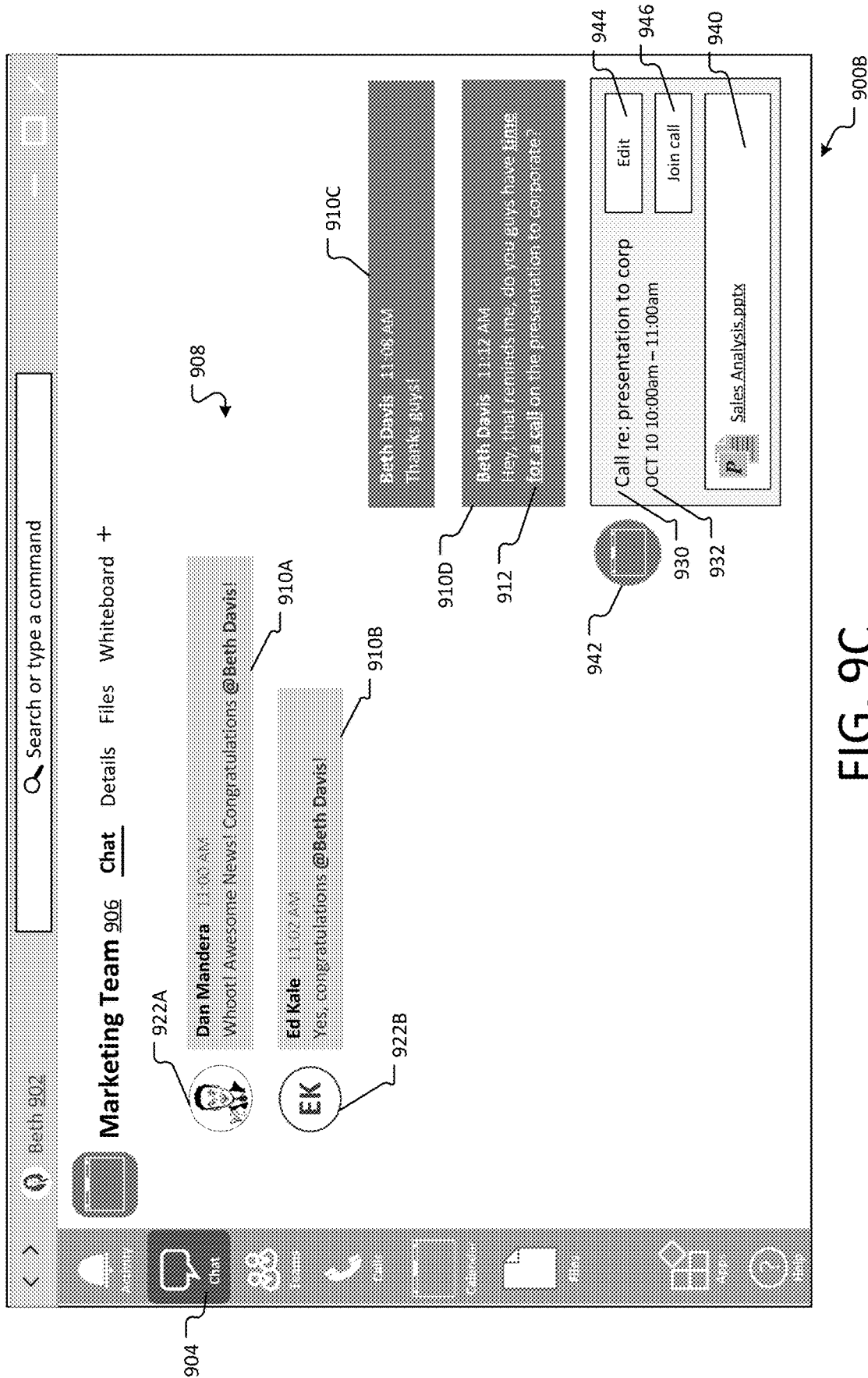

FIG. 9C depicts user interface 900B of the collaborative platform associated with user 902. As with FIG. 9A, user interface 800B of the collaborative platform displays chat tab 904 associated with collaboration team 906 (e.g., "Marketing Team"). Chat thread 908 involves chats 910A-D between members of the team.

In this case, in response to activating prompt 914 (not shown) and completing call invitation template 926 (not shown), user 902 scheduled call 942. Call 942 is scheduled for time/date 932 and comprises title 930 is "Call re: presentation to corp." As described above, title 930 may have been auto-populated by the system or manually input into the call invitation template 926 by user 902 (see FIG. 9B). In aspects, the title 930 may be shortened for the minimized representation of call 942 in chat thread 908. Call 942 may comprise an a collaboration object, as described above. In response to selecting control 944, either user 902 or invitees 922A-B may edit the collaboration object, e.g., by adding agenda items, notes, action items. These edits will automatically be reflected across user devices and across applications (e.g., within each user's calendar) in near real-time, as described above. As shown, presentation 940 is attached to the call 942 and can be accessed from the collaboration object before, during, or after the call. In response to selecting control 946, attendees can join the call (or call in) from interface 900B of the collaborative platform.

Figure 9D:
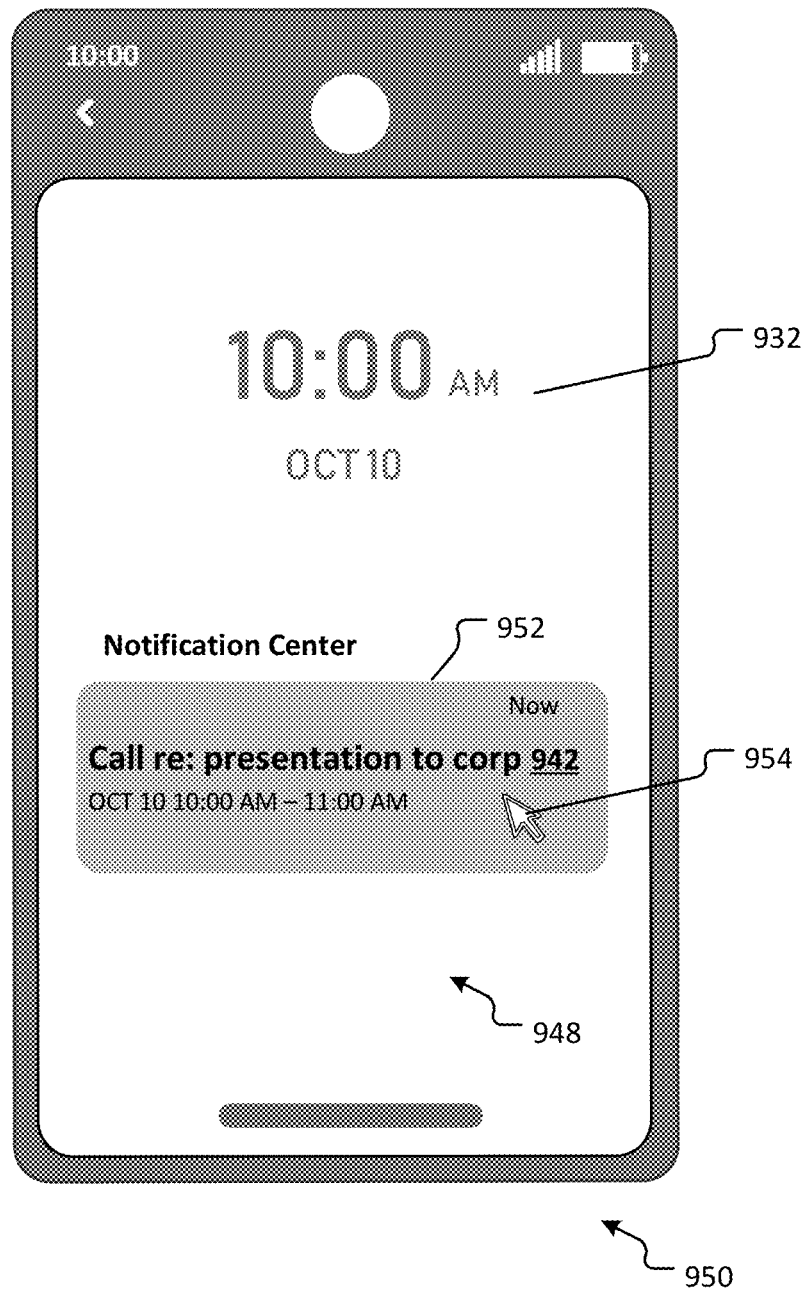

FIG. 9D depicts a user interface 948 of a mobile device 950. In aspects, when a scheduled call 942 is ready to begin at date/time 932, a notification 952 may be sent to devices associated with the selected phone numbers 916A-B (see FIG. 9B). In response to selection 954 of the notification 952, an attendee may join the call.

Figure 9E:
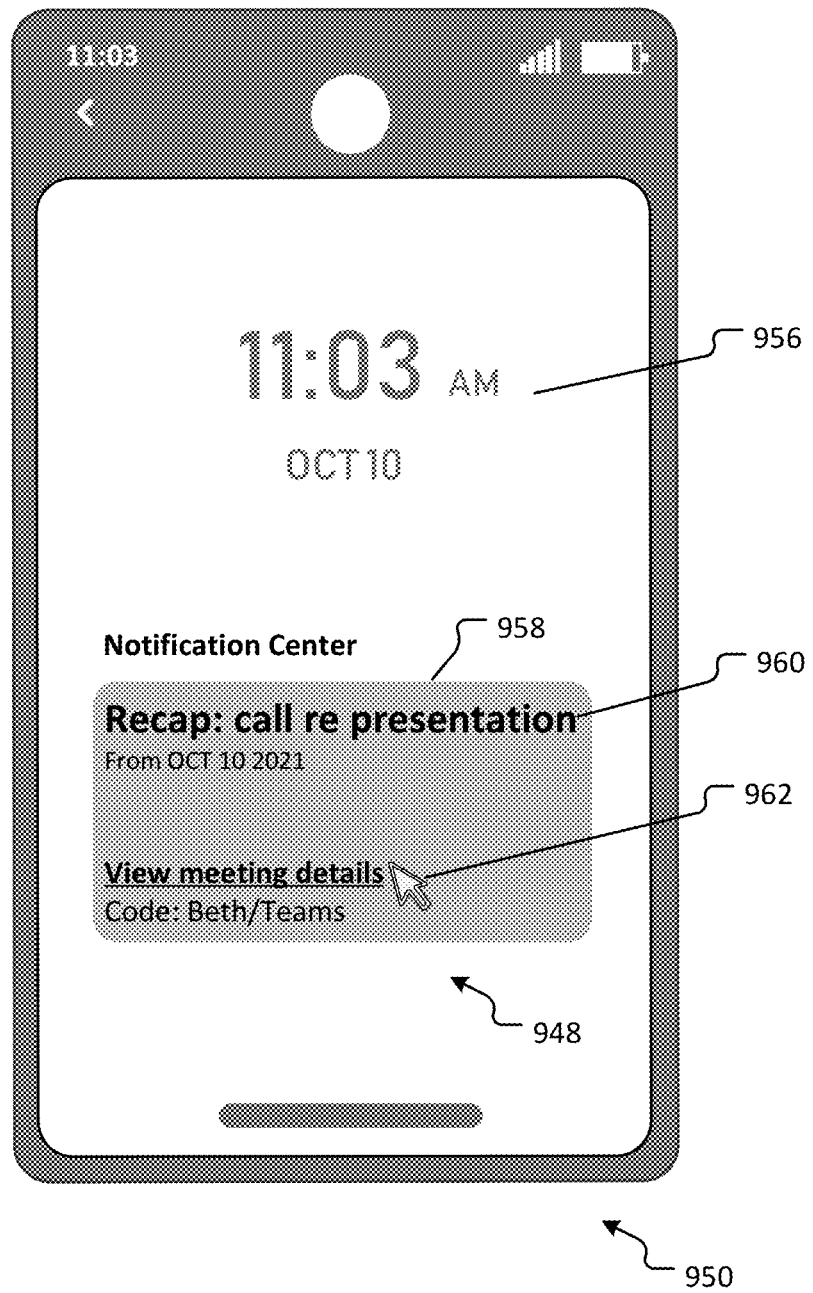

FIG. 9E depicts user interface 948 of mobile device 950. In aspects, at a time 956, after a scheduled call has ended, a notification 958 may be sent to devices associated with attendees. Notification 958 may include a link to a call recap 960. The call recap 960 may provide the same or similar information regarding the completed call 942 as collaboration object 516 depicted in FIG. 5A. For example, in response to selection 962, the attendee may gain access to a collaboration object corresponding to the completed call. In this way, attendees may continue to collaborate and access dynamic content (e.g., content categories 938 of FIG. 9B) or static content (e.g., presentation 940) after the call. For instance, attendees may mark an action item complete, attach a revised presentation, and the like, and these updates may be automatically reflected across applications and user devices in near real-time. Additionally, a call recording and/or transcript, and any content shared during the call, may automatically be linked to the collaboration object.

FIGS. 10A-C depict a user interface of a collaborative platform for detecting a user collaboration and automatically generating a collaboration object, in accordance with examples of the present disclosure.

FIG. 10A depicts a user interface 1000 of a collaborative platform associated with a user 1002. In aspects, user interface 1000 of the collaborative platform displays a chat tab 1004 associated with a collaboration team 1006 (e.g., "Marketing Team"). A chat thread 1008 involves members of collaboration team 1006. A conversation (e.g., chat thread 1008) involves a number of chats 1010A-D between members of the team, including user 1016A ("Dan"), user 1016B ("Ed"), and user 1002 ("Beth"). As illustrated by chat 1010D, user 1002 ("Beth Davis") makes a statement 1012: "Hey, that reminds me, I'll give you a call." In this case, rather than scheduling a meeting or a call, user 1002 simply calls 1014 the other members of the collaboration team 1006. While call 1014 is shown as a call made within a collaborative platform, other calls between collaborative team members may also be detected. For instance, based on a mapping of user phone numbers to user identities, user 1002 may call the other members of collaboration team 1006 using a cell phone. Based on detecting the impromptu call, the system may automatically launch a user interface and collaboration object for quickly organizing the call and memorializing any content or action items resulting from the impromptu call, as described with respect to FIG. 10B.

FIG. 10B depicts a user interface 1018 of a collaborative platform associated with user 1002. In aspects, when user 1002 calls the other members of the collaboration team 1006, the user interface 1018 may launch automatically. As illustrated, call 1014 is a video call which is just starting at time capture 1024 (e.g., 00:01:15). Although not shown, call 1014 may also be a voice call.

In main pane 1020, user interface 1018 displays video images of user 1016A ("Dan Mandera") and user 1002 ("Beth Davis") and a masked simulation of user 1016B ("Ed Kale"). In examples where call 1014 is a voice call, masked simulations of all users may be provided in main pane 1020. According to functionality of the collaborative platform, a recording 1026 of call 1014 has been initiated. Additionally, a collaboration object 1028 has been automatically generated in side pane 1022. That is, in response to user 1002 calling members of collaboration team 1006, the system detected the call and automatically provided the collaboration object 1028 to aid the users in organizing and memorializing the impromptu call 1014. In aspects, collaboration object 1028 is similar to the collaboration objects described above.

For example, collaboration object 1028 includes dynamic content categories 1030, including an agenda component, a note component, and an action item component. Although collaboration object 1028 was not created prior to the call 1014, providing the dynamic content categories 1030 enables participants to quickly and efficiently input an agenda to organize the impromptu call, as well as memorialize notes and action items. As illustrated by user 1002, who is adding agenda item 1032 to the dynamic content categories 1030, collaboration object 1028 is collaboration enabled within the side pane 1022 of user interface 1018. Similarly, user 1016A ("DM"), corresponding to attendee 1016A ("Dan Mandera"), is in the process of adding a note to the dynamic note category. That is, all of the users are able to see the concurrent entries of other users during the call 1014. Additionally, the collaboration object 1028 may be updated across other applications (e.g., calendar/messaging application, notebook application, planner application, etc.) during the call and thereafter in near real-time. In this way, an impromptu call may be automatically organized and results and action items for the impromptu call may be memorialized for future collaboration.

As further illustrated by FIG. 10B, suggestions for attaching content may be made to the attendees of the impromptu call. In some aspects, suggestions for content may be made based on data collected prior to initiation of the impromptu call. For instance, as illustrated by FIGS. 8A and 9A, users may be involved in a chat thread regarding a particular topic (e.g., a presentation to corporate) when the call is initiated. In other aspects, suggestions for content may be based on a current project assigned to the group, a revised document that has been shared among the group, and the like. As illustrated, presentation 1034 is provided as suggested content. In aspects, an attendee may click or otherwise activate presentation 1034 so as to link it to the collaboration object 1028. Additionally, as with the collaboration objects described above, any content shared or created during the call 1014 (e.g., videos, whiteboard session, mind maps, etc.) may automatically be linked to the collaboration object 1028. In this way, content associated with collaboration object 1028 may be available for collaboration and editing during an impromptu call to facilitate creating an agenda, taking notes, adding action items, and the like. The collaboration object 1028 may be persisted such that everything associated with the impromptu call can be found in one place (e.g., the collaboration object) and can be accessed during the meeting and afterwards from the collaborative platform or from a variety of other collaboration-enabled applications (e.g., calendar/messaging application, notebook application, planner application, task application, and the like).

FIG. 10C illustrates a user interface 1036 of a collaborative platform associated with user 1002. In aspects, user 1002 may access a history tab 1038 of the user's calendar 1040 from a collaborative platform. History tab 1038 may provide a listing of past meetings and/or calls. Alternatively, user 1002 may search the collaborative platform for past meetings and/or calls (e.g., based on title, date, attendees, and the like) and a similar list of results may be presented (not shown). In some cases, meetings and calls may be provided in the same listing, e.g., ordered by date and time; in other cases, separate listings of meetings and calls may be provided. User interface 1036 may further include abbreviated information about each result. For instance, icons 1046A-B may be provided for differentiating meeting from calls, icon 1048 may indicate that the meeting or call is recurring, icon 1050 may indicate whether the meeting or call was associated with content, icon 1052 may indicate whether (and how many) action items were associated with the meeting or call, and icon 1054 may indicate whether the meeting or call was recorded. In some aspects, a duration of the meeting or call may also be provided.

Additionally, in response to selecting a result, e.g., result 1042, additional details and/or content associated with the meeting or call may be provided. For instance, the collaboration object 1044 associated with the meeting or call may be provided. As with other collaboration objects described above (as well as interactive collaborative objects), the collaboration object 1044 may be collaboration enabled. That is, although the meeting or call has already occurred, users may continue to collaborate and add or remove content from the collaboration object. Any edits or changes made to dynamic content categories (e.g., agenda, notes, action items) may be reflected across any other application or user device associated with the meeting or call. As illustrated, result 1042 is also associated with static content, including a whiteboard session 1056, a presentation 1058, and a spreadsheet 1060. While this static content is accessible from collaboration object 1044, the static content may not be collaboration enabled. That is, if one user opens presentation 1058 and makes changes, these changes may not be reflected across other applications and user systems in near real-time (e.g., as the user is making the changes). However, if the user attaches the revised version of presentation 1058 to the collaboration object within user interface 1036, the collaboration object 1044 may be updated across applications and user devices to reflect attachment of the revised presentation 1058. Similarly, if the spreadsheet 1060 is removed from the collaboration object of 1044, the collaboration object 1044 may be updated across applications and user devices to reflect removal of the spreadsheet 1060.

Figure 11:
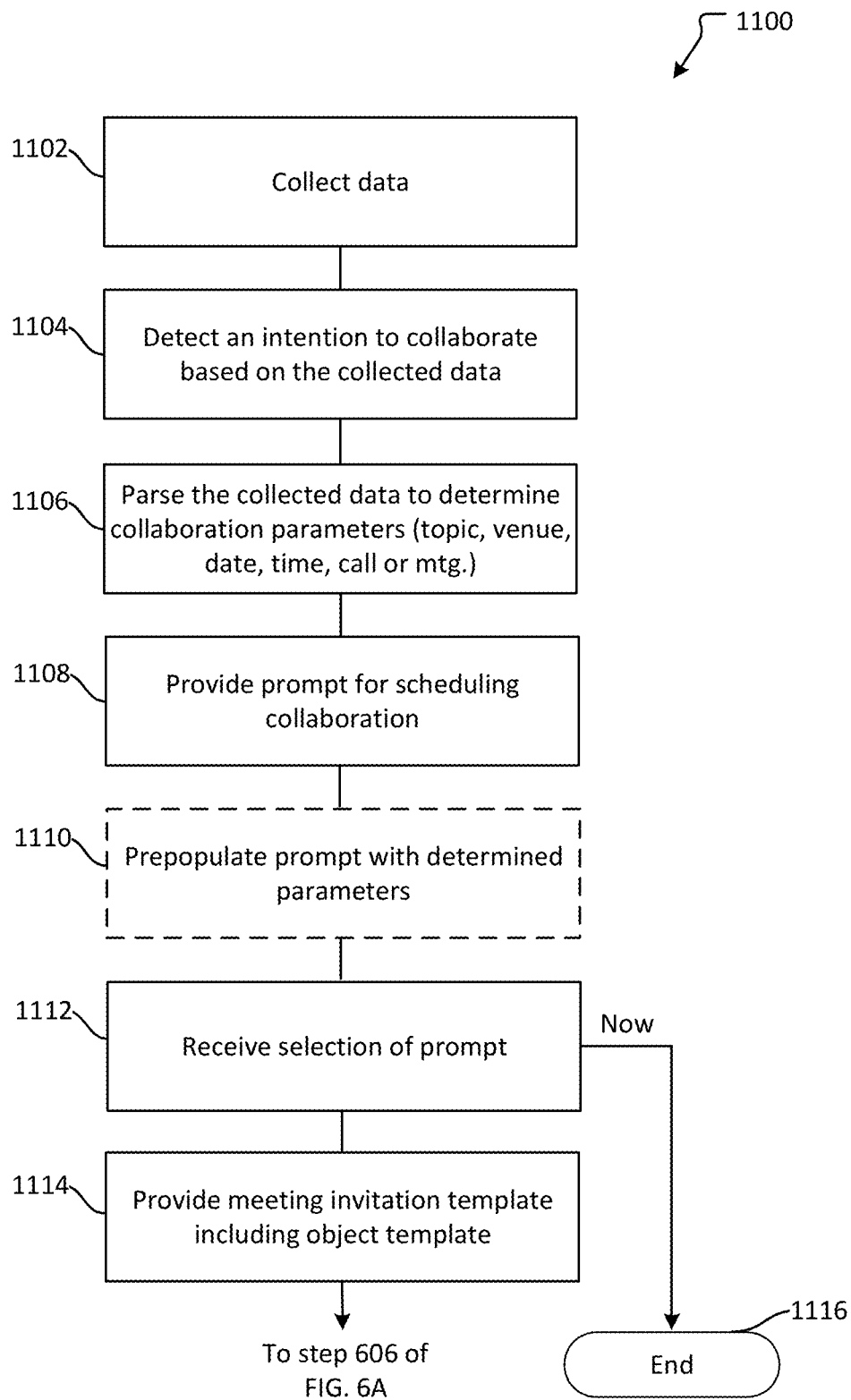
FIG. 11 illustrates an example method for detecting and implementing a user objective to schedule a collaboration, in accordance with aspects of the present disclosure.

FIG. 11 illustrates an example method for detecting and implementing a user objective to schedule a collaboration, in accordance with aspects of the present disclosure.

A general order of the operations for the method 1100 is shown in FIG. 11. The method 1100 may include more or fewer steps and/or may progress in a different order of steps from those shown in FIG. 11. The method 1100 can be executed as a set of computer-executable instructions executed by a computer system and encoded or stored on a computer readable medium. Further, the method 1100 can be performed by gates or circuits associated with a processor, an ASIC, an FPGA, a SOC or other hardware device. Hereinafter, the method 1100 shall be explained with reference to the systems, components, devices, user interfaces, modules, software, data structures, data characteristic representations, signaling diagrams, methods, etc., described in conjunction with FIGS. 1-10C and 12-14B.

At collection operation 1102, data may be collected to detect indications of an intention to collaborate. For instance, data may be collected from chat threads, SMS texts, email messages, and the like. Based on natural language processing and/or machine learning techniques, for example, the system may be trained to recognize words and/or phrases that indicate a user intention or objective to collaborate.

At detect intention operation 1104, an intention to collaborate may be detected based on the collected data. The intention to collaborate may be detected, for instance, based on explicit requests to meet to more implicit indications of a desire to connect or collaborate. For example, queries indicative of an intention to collaborate may include but are not limited to: "Can we set a meeting?"; "Let's schedule something soon"; "How does your calendar look tomorrow?"; "What's your availability next week?"; "Can we sync up?"; "When are you free?"; "Let's get something on the calendar"; "How's your afternoon?"; and the like. In aspects, the system may parse various data (e.g., verbal or written text) to identify certain words and/or phrases, such as "meet," "free," "availability," "calendar," "when," "sync," "schedule," "let's chat," and the like. Based on natural language processing and/or machine learning techniques, for example, the system may be trained to recognize such words and/or phrases that indicate a user intention or objective to collaborate. In aspects, collaboration may involve an in-person meeting, a virtual meeting, a phone call, a video call, or the like. In some cases, the system may determine that the user desires a meeting, e.g., based on a phrase such as, "Let's get something on the calendar." In other cases, the system may determine that the user desires a phone call, e.g., based on a phrase such as, "Do you have time to chat?" In still other cases, the system may detect a user intention to collaborate, but may not be able to determine a particular collaboration venue, e.g., based on a phrase such as, "Can we sync up?"

At parse operation 1106, collected data indicating an intention or objective to collaborate may be further parsed to determine parameters regarding the desired collaboration. In aspects, based on natural language processing and/or machine learning techniques, the system may be able to identify a venue, topic, timing, attendees, and the like, for an intended collaboration. For instance, in a chat thread between a first user and a second user, the first user may query: "Can we chat about the presentation tomorrow'?" Based on context (e.g., a chat between the first and second users) and the first user's query, the system may determine that the second user is a required attendee, the topic of the desired collaboration is a "presentation," and the timing of desired collaboration is "tomorrow." Additionally, based on the term "chat," the system may determine that the collaboration may be a phone call as opposed to an in-person meeting, for example.

At provide operation 1108, a prompt for scheduling a collaboration may be provided. Based on a determination of a venue for the collaboration, the prompt may suggest scheduling a meeting or a call, for instance. In some cases, free times on attendee calendars may be evaluated and the prompt may provide an indication of one or more free times. If the anticipated collaboration is a call, the prompt may provide the phone numbers of attendees. Additionally or alternatively, the prompt may provide selectable controls for "call now" or "meet now." In this case, rather than scheduling a collaboration, the user may be able to connect directly with anticipated attendees. Additionally or alternatively, the free times and/or phone numbers of the prompt may be selectable to initiate a meeting or call invitation.

At optional prepopulate operation 1110, additional parameters may be added to the prompt. For example, if the system determined that the topic of the anticipated collaboration is a presentation, the prompt may state: "Would you like to schedule a meeting with Bill regarding the presentation'?" or "Would you like to schedule a call to discuss the presentation'?" Additionally or alternatively, if the system determined timing for the anticipated collaboration, the prompt may state: "Would you like to schedule a meeting with Bill tomorrow'?" In this case, the prompt may also provide free times on the attendee's calendars for the next day. As should be appreciated, the prompt may provide more or less information for scheduling a collaboration based on determinations of user intentions.

At receive operation 1112, a selection of the prompt may be received. For instance, the user may click the prompt itself or a control provided by the prompt (e.g., a free time on attendee calendars). If the user selects a "meet now" or "call now" control, the method may end at operation 1116.

At provide operation 1114, in response to receiving a selection of the prompt, a meeting invitation template (or a call invitation template) may be provided for scheduling the collaboration. In aspects, the meeting invitation template may be prepopulated with parameters for the collaboration, such as a topic. Additionally, if the system determined that the topic was to discuss a presentation, for example, the presentation may be suggested as an attachment (or automatically attached) to the meeting invitation template. If a free time (or one or more phone numbers) were selected in the prompt, these selections may also be prepopulated in the meeting invitation template. As described above, the meeting invitation template may include an object template. An object template may include a predetermined structure for accepting content, such as fields for receiving meeting descriptions, a tool bar having controls for attaching documents and/or images, adjusting text formatting, and the like. The object template may further be prepopulated with content categories that may be associated with a meeting, such as an agenda, notes, and action items. In aspects, the content categories may be collaboration enabled and configured with fields for receiving content items (e.g., specific agenda items, notes, action items) associated with the proposed meeting. Following provide operation 1114, the method 1100 may progress in substantially a same manner as method 600 at receive content operation 606.

At end operation 1116, the method may be terminated if the user selects a "meet now" or "call now" control from the prompt.

As should be appreciated, operations 1102-1116 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 12:
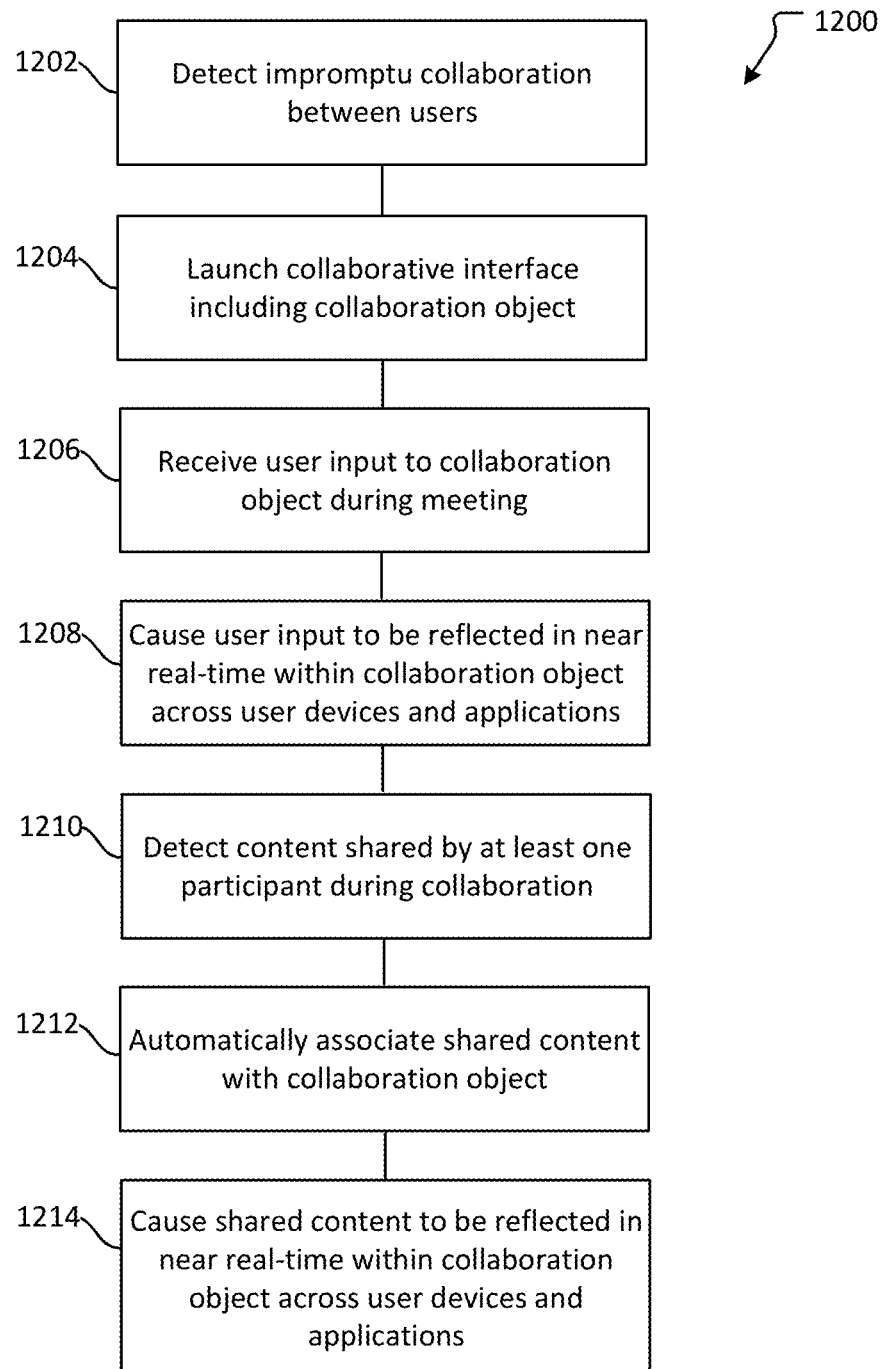
FIG. 12 illustrates an example method for detecting a user collaboration and automatically generating a collaboration object, in accordance with aspects of the present disclosure.

FIG. 12 illustrates an example method for detecting a user collaboration and automatically generating a collaboration object, in accordance with aspects of the present disclosure.

A general order of the operations for the method 1200 is shown in FIG. 12. The method 1200 may include more or fewer steps and/or may progress in a different order of steps from those shown in FIG. 12. The method 1200 can be executed as a set of computer-executable instructions executed by a computer system and encoded or stored on a computer readable medium. Further, the method 1200 can be performed by gates or circuits associated with a processor, an ASIC, an FPGA, a SOC or other hardware device. Hereinafter, the method 1200 shall be explained with reference to the systems, components, devices, user interfaces, modules, software, data structures, data characteristic representations, signaling diagrams, methods, etc., described in conjunction with FIGS. 1-11 and 13-14B.

At detect call operation 1202, an impromptu collaboration between at least two users may be detected. For instance, data indicative of a call between users or data indicative of textual interactions such as a channel thread, an email thread, or a chat thread may be detected. In aspects, a call may be Internet protocol (IP)-based and may be made within a collaborative platform, but other calls between collaborative team members may also be detected. For instance, based on a mapping of user phone numbers to user identities, a call using one or more cell phones between members of a collaboration team may be detected. In further aspects, a a channel thread, an email thread, or a chat thread that centers around a new project or topic may be detected.

At launch operation 1204, in response to detecting the impromptu collaboration, a collaborative platform or interface for hosting the collaboration may be launched. For example, the collaborative platform may provide video functionality such that participants may view one another during the collaboration. The collaborative platform may further automatically provide a collaboration object for facilitating the impromptu meeting. As described above, a collaboration object may be the same or similar to a collaboration object. The collaboration object may be in the form of a structured framework including meeting components for receiving and organizing content, including an agenda component, a note component, and an action item component, for instance. The collaboration object may comprise a portable interface having functionality for concurrent multi-user interaction with the content (e.g., dynamic content). Additionally, static content may be attached, shared, or otherwise linked to the collaboration object (either manually by participants or automatically by the system). In some aspects, the collaboration object may be provided via a collaborative UX customized for the collaborative platform.

At receive input operation 1206, input to the collaboration object may be received. For instance, one or more collaboration participants may input content via the collaborative platform into dynamic content categories associated with the collaboration object, such as an agenda item, a note, or an action item. In aspects, although the collaboration was not pre-schedule but occurred ad hoc, other collaboration enabled applications may be update to reflect the collaboration. That is, the calendars of the participants may automatically be updated with a meeting including the current collaboration object at time "now." In this case, input may be received to the collaboration object from another application (e.g., a calendar/messaging application).

At reflect operation 1208, the input received from one or more participants may be reflected in near real-time across user devices and applications. For example, the input of the agenda item, note, or action item may be reflected in the collaboration object on the devices of other participants. The input may be reflected across the user devices at substantially (or nearly) the same time as it is received by the participant. In some examples, the input may be received and reflected in the collaboration object provided by the collaborative platform during the meeting. In other examples, input may be received to another collaboration enabled application, for example, but the input may still be reflected in near real-time in the collaboration object provided by collaborative platform hosting the meeting. That is, regardless of the application that receives the input to the collaboration object, the input may be reflected across the other collaboration-enabled applications and user devices accessing the collaboration object.

At detect operation 1210, a participant may share content via the collaborative platform during the meeting. Sharing content may involve sharing a presentation (e.g., via the video capabilities of the second application) with the meeting participants. Sharing content may also include sharing a link to content (e.g., to a video or website) within a chat thread (within the collaborative platform or another collaboration-enabled application) during the meeting. In aspects, the content shared by the participant may be detected by the collaborative platform (or the another collaboration-enabled application).

At associate operation 1212, the shared content may be automatically associated (e.g., linked or attached) to the collaboration object. For example, if a presentation is shared during the meeting, the presentation may automatically be associated with the collaboration object (e.g., as a link or an attachment). In another example, if a link to content is shared during the meeting, the link may be associated with collaboration object. In yet another example, when a link to content is shared, the link may be followed and the content may be retrieved and associated with the collaboration object.

At reflect operation 1214, the content shared by the participant may be reflected in near real-time across user devices and applications. For example, the shared content may be reflected in the collaboration object within the collaborative platform on the devices of the other participants. The content may be reflected across the user devices at substantially (or nearly) the same time as it is shared by the participant. Additionally, the shared content may be reflected in near real-time as linked to the collaboration object within other collaboration-enabled applications, e.g., a notebook application, calendar/messaging application, and the like. For instance, the participant may share a link to content within a notebook application and the link may automatically be associated with the collaboration object provided by the collaborative platform in near real-time. That is, regardless of the application through which the content is shared, the shared content may be reflected across the other collaboration-enabled applications and user devices accessing the collaboration object.

As should be appreciated, operations 1202-1214 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 13:
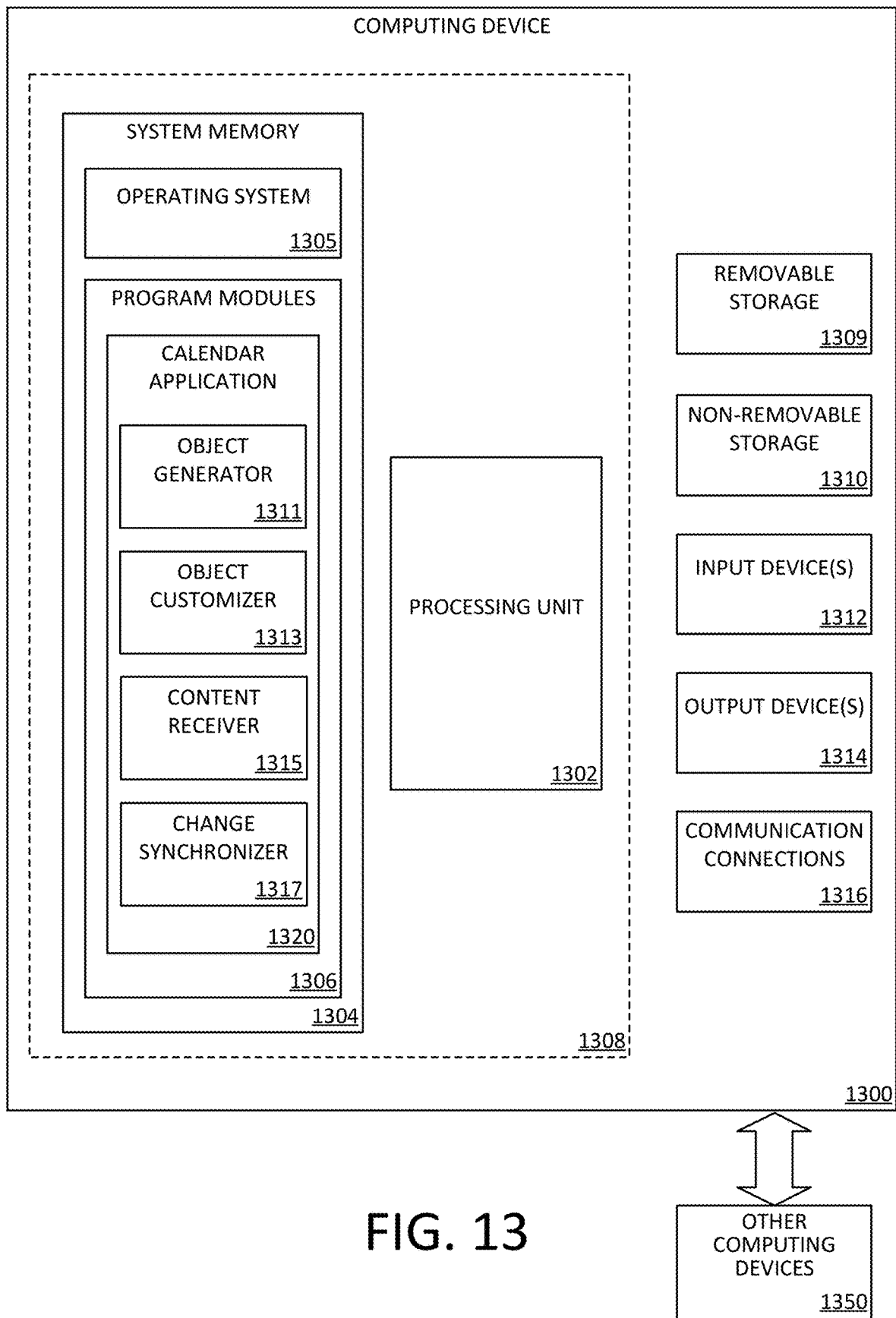
FIG. 13 is a block diagram illustrating physical components (e.g., hardware) of a computing device with which aspects of the disclosure may be practiced.
Figure 14A:
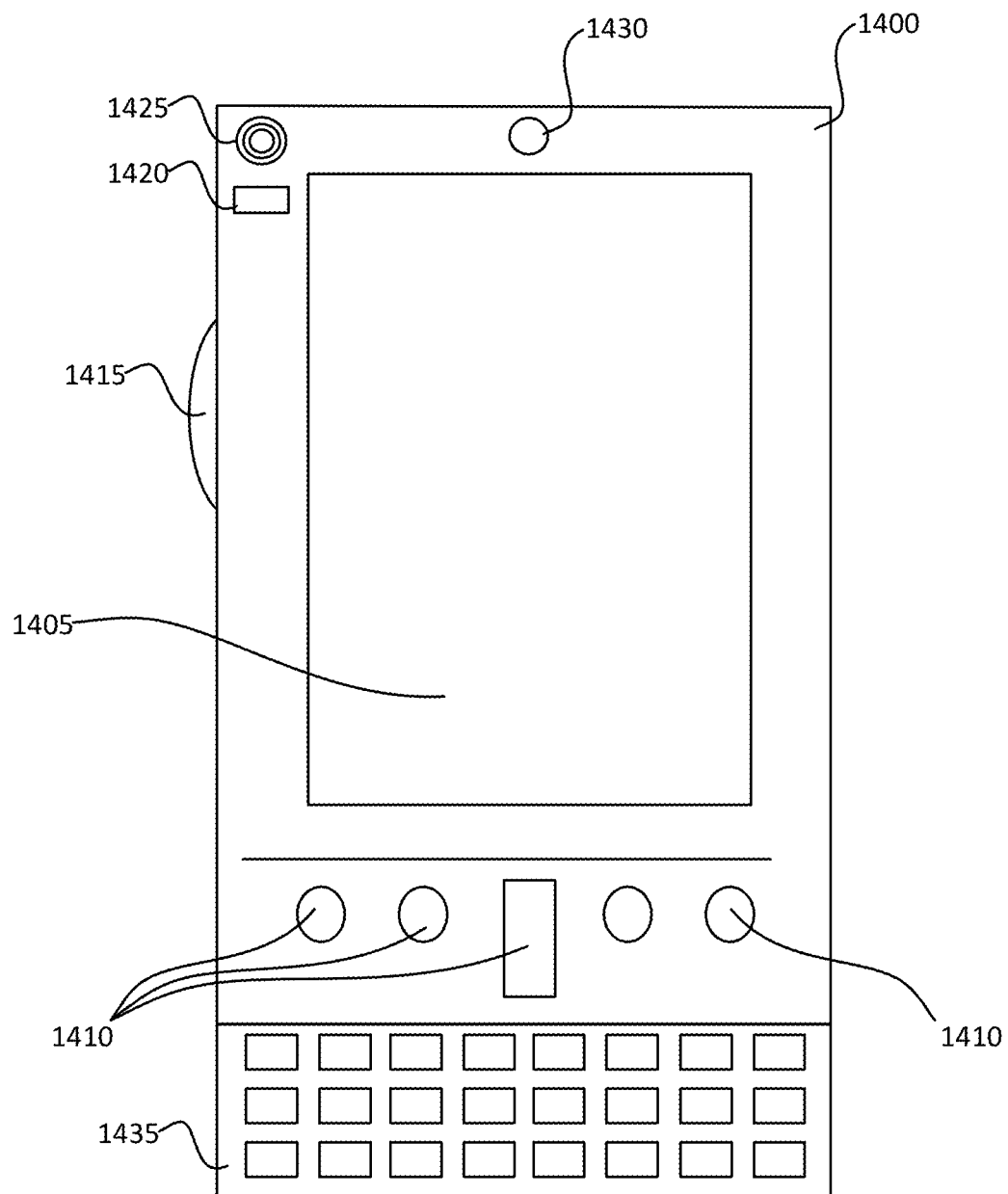
FIGS. 14A-B illustrate a mobile computing device with which embodiments of the disclosure may be practiced.
Figure 14B:
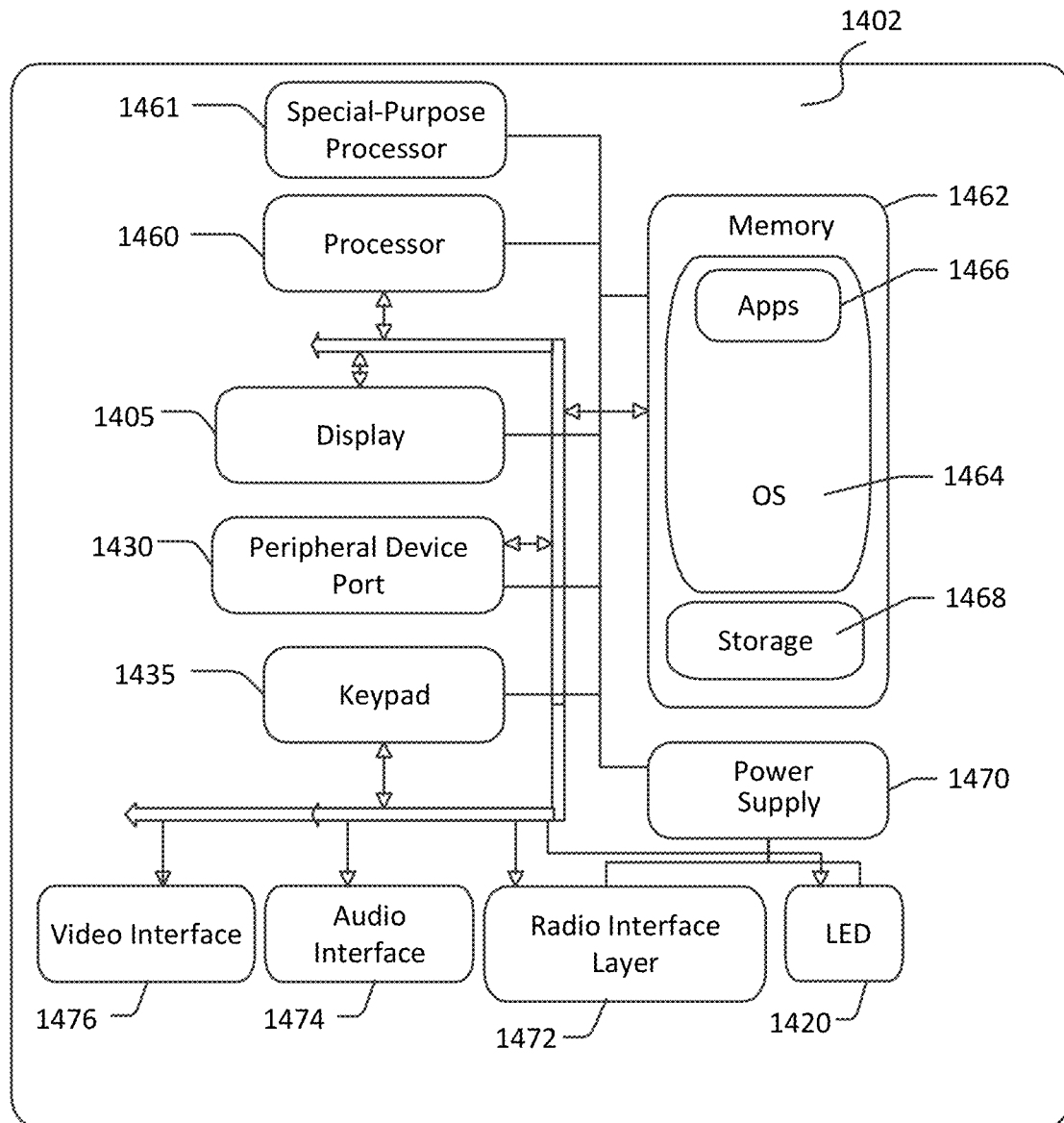

FIGS. 13-14B and the associated descriptions provide a discussion of a variety of operating environments in which aspects of the disclosure may be practiced. However, the devices and systems illustrated and discussed with respect to FIGS. 13-14B are for purposes of example and illustration and are not limiting of a vast number of computing device configurations that may be utilized for practicing aspects of the disclosure, described herein FIG. 13 is a block diagram illustrating physical components (e.g., hardware) of a computing device 1300 with which aspects of the disclosure may be practiced. The computing device components described below may have computer executable instructions for implementing one or more collaboration-enabled applications 1320 on a computing device, including computer executable instructions for the one or more collaboration-enabled applications 1320 that can be executed to employ the methods disclosed herein. In a basic configuration, the computing device 1300 may include at least one processing unit 1302 and a system memory 1304. Depending on the configuration and type of computing device, the system memory 1304 may comprise, but is not limited to, volatile storage (e.g., random access memory), non-volatile storage (e.g., read-only memory), flash memory, or any combination of such memories. The system memory 1304 may include an operating system 1305 and one or more program modules 1306 suitable for running the one or more collaboration-enabled applications 1320, such as object generator 1311, object customizer 1313, content receiver 1315, or change synchronizer 1317. The operating system 1305, for example, may be suitable for controlling the operation of the computing device 1300. Furthermore, embodiments of the disclosure may be practiced in conjunction with a graphics library, other operating systems, or any other application program and is not limited to any particular application or system. This basic configuration is illustrated in FIG. 13 by those components within a dashed line 1313. The computing device 1300 may have additional features or functionality. For example, the computing device 1300 may also include additional data storage devices (removable and/or non-removable) such as, for example, magnetic disks, optical disks, or tape. Such additional storage is illustrated in FIG. 13 by a removable storage device 1309 and a non-removable storage device 1310.

As stated above, a number of program modules and data files may be stored in the system memory 1304. While executing on the processing unit 1302, the program modules 1306 (e.g., the one or more collaboration-enabled applications 1320) may perform processes including, but not limited to, the aspects, as described herein. Other program modules that may be used in accordance with aspects of the present disclosure, and in particular for providing a messaging application interface, may include object generator 1311, object customizer 1313, content receiver 1315, or change synchronizer 1317, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 13 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1300 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1300 may also have one or more input device(s) 1312 such as a keyboard, a mouse, a pen, a sound or voice input device, a touch or swipe input device, etc. The output device(s) 1314 such as a display, speakers, a printer, etc. may also be included. The aforementioned devices are examples and others may be used. The computing device 1300 may include one or more communication connections 1316 allowing communications with other computing devices 1350. Examples of suitable communication connections 1316 include, but are not limited to, radio frequency (RF) transmitter, receiver, and/or transceiver circuitry; universal serial bus (USB), parallel, and/or serial ports.

The term computer readable media may include computer storage media. Computer storage media may include volatile and nonvolatile, removable and non-removable media implemented in any method or technology for storage of information, such as computer readable instructions, data structures, or program modules. The system memory 1304, the removable storage device 1309, and the non-removable storage device 1310 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1300. Any such computer storage media may be part of the computing device 1300. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 14A and 14B illustrate a mobile computing device 1400, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 14A, one aspect of a mobile computing device 1400 for implementing the aspects is illustrated. In a basic configuration, the mobile computing device 1400 is a handheld computer having both input elements and output elements. The mobile computing device 1400 typically includes a display 1405 and one or more input buttons 1410 that allow the user to enter information into the mobile computing device 1400. The display 1405 of the mobile computing device 1400 may also function as an input device (e.g., a touch screen display). If included, an optional side input element 1415 allows further user input. The side input element 1415 may be a rotary switch, a button, or any other type of manual input element. In alternative aspects, mobile computing device 1400 may incorporate more or less input elements. For example, the display 1405 may not be a touch screen in some embodiments. In yet another alternative embodiment, the mobile computing device 1400 is a portable phone system, such as a cellular phone. The mobile computing device 1400 may also include an optional keypad 1435. Optional keypad 1435 may be a physical keypad or a "soft" keypad generated on the touch screen display. In various embodiments, the output elements include the display 1405 for showing a graphical user interface (GUI), a visual indicator 1420 (e.g., a light emitting diode), and/or an audio transducer 1425 (e.g., a speaker). In some aspects, the mobile computing device 1400 incorporates a vibration transducer for providing the user with tactile feedback. In yet another aspect, the mobile computing device 1400 incorporates input and/or output ports, such as an audio input (e.g., a microphone jack), an audio output (e.g., a headphone jack), and a video output (e.g., a HDMI port) for sending signals to or receiving signals from an external device.

FIG. 14B is a block diagram illustrating the architecture of one aspect of a mobile computing device. That is, the mobile computing device 1400 can incorporate a system (e.g., an architecture) 1402 to implement some aspects. In one embodiment, the system 1402 is implemented as a "smart phone" capable of running one or more applications (e.g., browser, e-mail, calendaring, contact managers, messaging clients, games, and media clients/players). In some aspects, the system 1402 is integrated as a computing device, such as an integrated personal digital assistant (PDA) and wireless phone.

One or more application programs 1466 may be loaded into the memory 1462 and run on or in association with the operating system 1464. Examples of the application programs include phone dialer programs, e-mail programs, personal information management (PIM) programs, word processing programs, spreadsheet programs, Internet browser programs, messaging programs, and so forth. The system 1402 also includes a non-volatile storage area 1468 within the memory 1462. The non-volatile storage area 1468 may be used to store persistent information that should not be lost if the system 1402 is powered down. The application programs 1466 may use and store information in the non-volatile storage area 1468, such as e-mail or other messages used by an e-mail application, and the like. A synchronization application (not shown) also resides on the system 1402 and is programmed to interact with a corresponding synchronization application resident on a host computer to keep the information stored in the non-volatile storage area 1468 synchronized with corresponding information stored at the host computer. As should be appreciated, other applications may be loaded into the memory 1462 and run on the mobile computing device 1400, including the instructions for providing various collaboration-enabled applications as described herein (e.g., object generator, object customizer, content receiver, or change synchronizer, etc.).

The system 1402 has a power supply 1470, which may be implemented as one or more batteries. The power supply 1470 might further include an external power source, such as an AC adapter or a powered docking cradle that supplements or recharges the batteries.

The system 1402 may also include a radio interface layer 1472 that performs the function of transmitting and receiving radio frequency communications. The radio interface layer 1472 facilitates wireless connectivity between the system 1402 and the "outside world," via a communications carrier or service provider. Transmissions to and from the radio interface layer 1472 are conducted under control of the operating system 1464. In other words, communications received by the radio interface layer 1472 may be disseminated to the application programs 1466 via the operating system 1464, and vice versa.

The visual indicator 1420 may be used to provide visual notifications, and/or an audio interface 1474 may be used for producing audible notifications via the audio transducer 1425. In the illustrated embodiment, the visual indicator 1420 is a light emitting diode (LED) and the audio transducer 1425 is a speaker. These devices may be directly coupled to the power supply 1470 so that when activated, they remain on for a duration dictated by the notification mechanism even though the processor 1460 and other components might shut down for conserving battery power. The LED may be programmed to remain on indefinitely until the user takes action to indicate the powered-on status of the device. The audio interface 1474 is used to provide audible signals to and receive audible signals from the user. For example, in addition to being coupled to the audio transducer 1425, the audio interface 1474 may also be coupled to a microphone to receive audible input, such as to facilitate a telephone conversation. In accordance with embodiments of the present disclosure, the microphone may also serve as an audio sensor to facilitate control of notifications, as will be described below. The system 1402 may further include a video interface 1476 that enables an operation of an on-board camera 1430 to record still images, video stream, and the like.

A mobile computing device 1400 implementing the system 1402 may have additional features or functionality. For example, the mobile computing device 1400 may also include additional data storage devices (removable and/or non-removable) such as, magnetic disks, optical disks, or tape. Such additional storage is illustrated in FIG. 14B by the non-volatile storage area 1468.

Data/information generated or captured by the mobile computing device 1400 and stored via the system 1402 may be stored locally on the mobile computing device 1400, as described above, or the data may be stored on any number of storage media that may be accessed by the device via the radio interface layer 1472 or via a wired connection between the mobile computing device 1400 and a separate computing device associated with the mobile computing device 1400, for example, a server computer in a distributed computing network, such as the Internet. As should be appreciated such data/information may be accessed via the mobile computing device 1400 via the radio interface layer 1472 or via a distributed computing network. Similarly, such data/information may be readily transferred between computing devices for storage and use according to well-known data/information transfer and storage means, including electronic mail and collaborative data/information sharing systems.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
    at least one processing unit; and
    at least one memory storing computer-executable instructions that, when executed by the at least one processor, cause the at least one processor to perform operations, comprising:
        detect an intention to collaborate;
        automatically generate a prompt for scheduling a collaboration;
        in response to a selection, via a first application of a first application type, automatically generate a meeting invitation comprising a collaboration object, wherein the first application type is a calendar application type;
        receive content to the collaboration object from a first user via the first application of the first application type, wherein the collaboration object comprises a portable interface providing functionality for concurrent multi-user interaction with the content, wherein the collaboration object is configured to be hosted by a plurality of different application types, and wherein the portable interface is configured to be customizable for the plurality of different application types based on metadata associated with the collaboration object;
        cause the meeting invitation including the collaboration object to be sent to at least a second user via a second application of a second application type; and
        cause the collaboration object to be automatically updated at a first device associated with the first user via the first application of the first application type at substantially the same time as a change to the content is received at a second device associated with the second user via the second application of the second application type, wherein the first application type is different than the second application type.

2. The system of claim 1, the computer-executable instructions when executed causing the at least one processor to perform further operations, comprising:
    parse data indicative of the intention to collaborate;
    determine one or more parameters associated with the intention to collaborate; and
    prepopulate the meeting invitation with the one or more determined parameters.

3. The system of claim 2, the computer-executable instructions when executed causing the at least one processor to perform further operations, comprising:
    based on the one or more determined parameters associated with the intention to collaborate, suggest content for inclusion with the collaboration object.

4. The system of claim 2, the computer-executable instructions when executed causing the at least one processor to perform further operations, comprising:
    based on the determined parameters, automatically associate one or more documents with the collaboration object.

5. The system of claim 1, wherein the prompt comprises selectable controls for automatically generating the meeting invitation.

6. The system of claim 1, wherein the prompt comprises selectable controls for automatically initiating the meeting.

7. The system of claim 1, wherein concurrent multi-user interactions with the content are reflected in the collaboration object in near real-time across at least the first application of the first application type and the second application of the second application type.

8. The system of claim 1, wherein concurrent multi-user interactions with the content are reflected in the collaboration object in near real-time across at least the first device associated with the first user and the second device associated with the second user.

9. The system of claim 1, wherein the collaboration object is automatically updated with the change in near real-time.

10. The system of claim 1, the computer-executable instructions when executed causing the at least one processor to perform further operations, comprising:
    based on the metadata, render a collaborative user experience (UX) comprising the collaboration object.

11. The system of claim 10, wherein the metadata comprises information for customizing the collaborative UX for at least the first application of the first application type and the second application of the second application type.

12. A method for generating a collaboration object, comprising:

detecting an impromptu collaboration between at least two participants;

automatically launching a collaboration object via a first application of a first application type, wherein the collaboration object comprises a portable interface providing functionality for concurrent multi-user interaction, wherein the collaboration object is configured to be hosted by a plurality of different application types, and wherein the portable interface is configured to be customizable for the plurality of different application types based on metadata associated with the collaboration object;

receiving user input to the collaboration object by a first participant via the first application of the first application type at a first user device;

automatically causing the user input to the collaboration object hosted by the first application of the first application type to be reflected in near real-time in the collaboration object hosted by a second application of a second application type at a second user device associated with a second participant, wherein the first application type is different than the second application type, and wherein one of the first application type or the second application type is a collaborative platform type;

detecting content shared by the second participant during the collaboration;

automatically causing the shared content to be reflected in near real-time in the collaboration object hosted by the first application of the first application type; and persisting the collaboration object to enable concurrent multi-user interaction with the collaboration object after the collaboration.

13. The method of claim 12, wherein the collaboration object hosted by the first application of the first application type is provided via a first collaborative user experience (UX), and wherein the collaborative object hosted by the second application of the second application type is provided via a second collaborative UX.

14. The method of claim 13, wherein concurrent multi-user interaction with the persisted collaboration object comprises accessing the persisted collaboration object from a plurality of applications.

15. The method of claim 13, further comprising:
receiving user input to the collaboration object by the first participant via the first application of the first application type, wherein the user input to the collaboration object is at least one of an agenda item, a note, or an action item.

16. The method of claim 13, wherein the shared content is at least one of a presentation, a document, a spreadsheet, a link to content, a video, an image, a whiteboard session, or a mind map.

17. A computer storage device storing computer-executable instructions that when executed cause at least one processor to perform operations, comprising:

detecting an impromptu collaboration between at least two participants;

automatically launching a collaboration object hosted by a first application of a first application type associated with a first participant, wherein the collaboration object comprises a portable interface providing functionality for concurrent multi-user interaction, wherein the collaboration object is configured to be hosted by a plurality of different application types, and wherein the portable interface is configured to be customizable for the plurality of different application types based on metadata associated with the collaboration object;

detecting content shared by a second participant via a second application of a second application type during the collaboration;

automatically causing the shared content to be reflected in near real-time in the collaboration object across at least the first application of the first application type and the second application of the second application type, wherein the first application type is different than the second application type, and wherein one of the first application type or the second application type is a collaborative platform type; and persisting the collaboration object to enable concurrent multi-user interaction with the collaboration object via at least the first application of the first application type and the second application of the second application type after the collaboration.

18. The computer storage device of claim 17, wherein the shared content is at least one of a presentation, a document, a spreadsheet, a link to content, a video, an image, a whiteboard session, or a mind map.

19. The computer storage device of claim 17, the computer-executable instructions when executed cause the at least one processor to perform further operations, comprising:
receiving user input to the collaboration object by the first participant via the first application of the first application type, wherein the user input to the collaboration object is at least one of an agenda item, a note, or an action item.

20. The computer storage device of claim 17, wherein the collaboration object hosted by the first application of the first application type is provided via a first collaborative user experience (UX), and wherein the collaborative object hosted by the second application of the second application type is provided via a second collaborative UX.

* * * * *